(12) United States Patent
Kitami et al.

(10) Patent No.: US 8,725,433 B2
(45) Date of Patent: *May 13, 2014

(54) SIGNAL PROCESSING METHOD, SIGNAL PROCESSING APPARATUS, AND CORIOLIS FLOWMETER

(75) Inventors: Hirokazu Kitami, Tokyo (JP); Hideki Shimada, Tokyo (JP)

(73) Assignee: Oval Corporation, Tokyo (JP)

( * ) Notice: Subject to any disclaimer, the term of this patent is extended or adjusted under 35 U.S.C. 154(b) by 555 days.

This patent is subject to a terminal disclaimer.

(21) Appl. No.: 12/957,727

(22) Filed: Dec. 1, 2010

(65) Prior Publication Data

US 2011/0203389 A1    Aug. 25, 2011

(30) Foreign Application Priority Data

Feb. 19, 2010   (JP) .................................. 2010/035225

(51) Int. Cl.
*G01F 1/00* (2006.01)
*G01F 1/84* (2006.01)

(52) U.S. Cl.
USPC ........................................ 702/45; 73/861.356

(58) Field of Classification Search
USPC ......... 702/45, 33, 41, 50, 54, 56, 81, 84, 127, 702/137–142, 182–183, 189; 73/1.16, 1.37, 73/1.57, 1.59, 1.82–1.83, 570, 579, 584, 73/662, 861, 861.18, 861.351, 73/861.354–861.357

See application file for complete search history.

(56) References Cited

U.S. PATENT DOCUMENTS

| | | | | |
|---|---|---|---|---|
| 5,831,178 A | * | 11/1998 | Yoshimura et al. | ....... 73/861.357 |
| 2008/0252283 A1 | | 10/2008 | McAnally et al. | |
| 2011/0011187 A1 | * | 1/2011 | Kitami et al. | ............ 73/861.356 |
| 2011/0016989 A1 | * | 1/2011 | Kitami et al. | ............ 73/861.356 |
| 2012/0059601 A1 | * | 3/2012 | Kitami et al. | ................... 702/45 |

FOREIGN PATENT DOCUMENTS

EP    2 290 332    3/2011

OTHER PUBLICATIONS

Zamora et al., An FPGA Implementation of a Digital Coriolis Mass Flow Metering Drive System, Jul. 2008, IEEE Transactions on Industrial Electronics, vol. 55, No. 7, pp. 2820-2831.*
Extended European Search Report issued Jun. 6, 2011 in corresponding European Patent Application No. 10015386.5.
Communication pursuant to Article 94(3) EPC issued Aug. 28, 2012 in corresponding European Patent Application No. 10015386.5.

* cited by examiner

*Primary Examiner* — Toan Le
(74) *Attorney, Agent, or Firm* — Wenderoth, Lind & Ponack, L.L.P.

(57) ABSTRACT

A signal processing method, a signal processing apparatus, and a Coriolis flowmeter are capable of always performing measurement with constant precision and performing phase measurement with high filtering performance and a small amount of computation even when a temperature of a fluid to be measured changes, air bubbles are mixed into the fluid to be measured, or the fluid to be measured rapidly changes from a gas to a liquid. The Coriolis flowmeter detects at least one of a phase difference and a vibration frequency proportional to a Coriolis force acting on at least one flow tube or a pair of flow tubes.

8 Claims, 32 Drawing Sheets

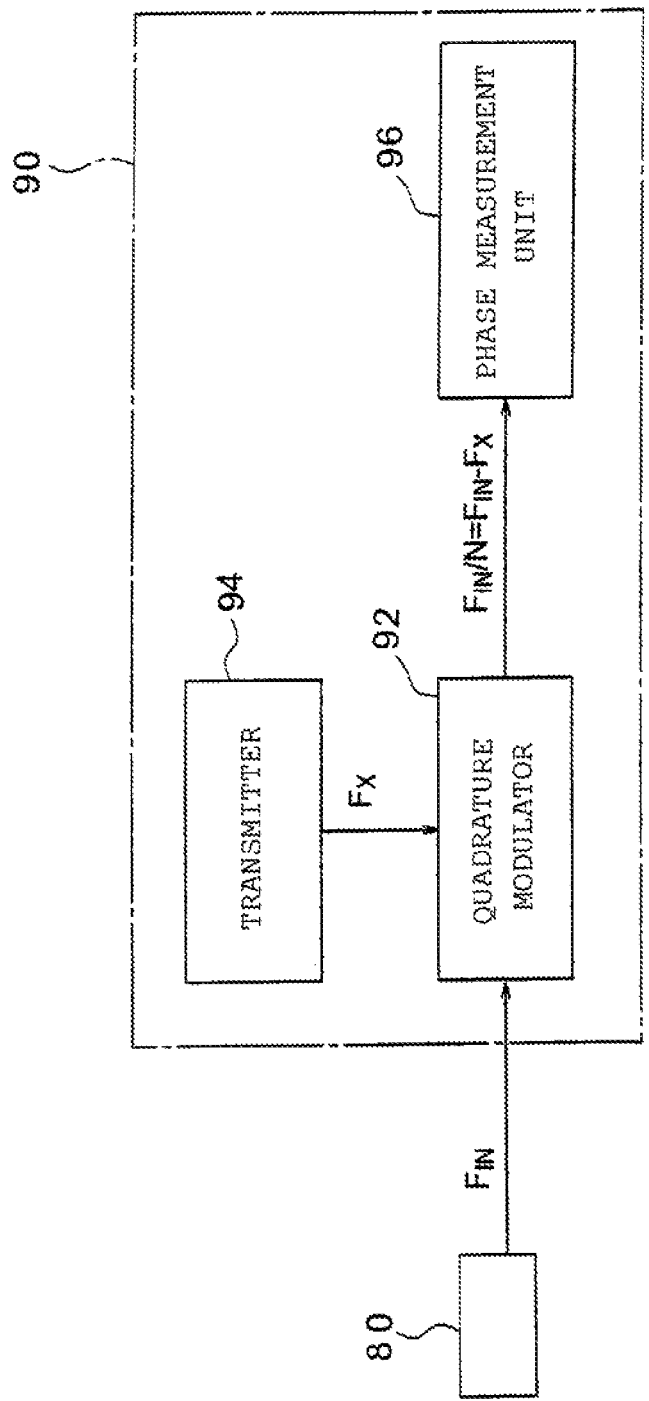

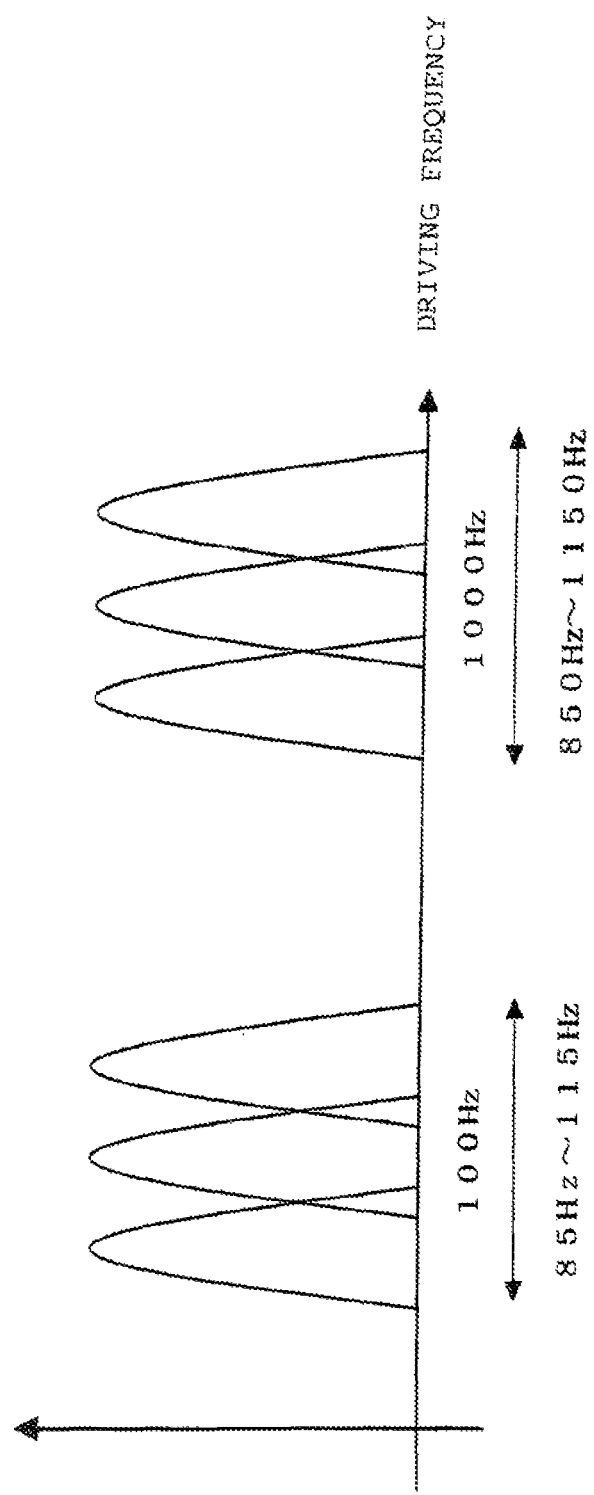

SIGNAL PROCESSING METHOD, SIGNAL PROCESSING APPARATUS, AND CORIOLIS FLOWMETER

TECHNICAL FIELD

The present invention relates to a Coriolis flowmeter for detecting a phase difference and/or a vibration frequency proportional to a Coriolis force acting on a flow tube to obtain a mass flow rate and/or density of a fluid to be measured.

BACKGROUND ART

A Coriolis flowmeter is a mass flowmeter based on a point that a Coriolis force acting on a flow tube (hereinafter, flow tube to be vibrated is referred to as flow tube) is proportional to a mass flow rate in a case where the flow tube through which a fluid to be measured flows is supported at both ends and vibration is applied about a support point in a direction perpendicular to a flow direction of the flow tube. The Coriolis flowmeter is well known and a shape of a flow tube in the Coriolis flowmeter is broadly divided into a straight-tube type and a curved-tube-type.

The Coriolis flowmeter is a mass flowmeter for detecting a phase difference signal proportional to a mass flow rate in symmetrical positions between both end support portions and central portion of a measurement tube in a case where the measurement tube through which a fluid to be measured flows is supported at both ends and the central portion of the supported measurement tube is alternately driven in a direction perpendicular to a support line. The phase difference signal is the quantity proportional to the mass flow rate. When a driving frequency is maintained constant, the phase difference signal may be detected as a time difference signal in the observation positions of the measurement tube.

When the alternate driving frequency of the measurement tube is made equal to the natural frequency of the measurement tube, a constant driving frequency corresponding to a density of the fluid to be measured is obtained, and hence the measurement tube may be driven with small driving energy. Therefore, recently, the measurement tube is generally driven at the natural frequency and the phase difference signal is detected as the time difference signal.

The straight-tube type Coriolis flowmeter has a structure in which, in a case where vibration is applied in a direction perpendicular to a straight tube axis of a central portion of a straight tube supported at both ends, a displacement difference of the straight tube which is caused by a Coriolis force, that is, a phase difference signal is obtained between the support portion and central portion of the straight tube, and a mass flow rate is detected based on the phase difference signal. The straight-tube type Coriolis flowmeter as described above has a simple, compact, and tough structure. However, the Coriolis flowmeter also has a problem that high detection sensitivity cannot be obtained.

In contrast to this, the curved-tube-type Coriolis flowmeter is superior to the straight-tube type Coriolis flowmeter in the point that a shape for effectively taking out the Coriolis force may be selected. The mass flow rate may be actually detected with high sensitivity.

A combination of a coil and a magnet are generally used as driving means for driving the flow tube. The coil and the magnet are preferably attached to positions which are not offset in the vibration direction of the flow tube because a positional relationship deviation between the coil and the magnet is minimized. Therefore, in a case of a curved-tube-type Coriolis flowmeter including two parallel flow tubes, the two parallel flow tubes are attached so as to sandwich the coil and the magnet. Therefore, a design is made so that the two opposed flow tubes are separated from each other at an interval to sandwich at least the coil and the magnet.

Of Coriolis flowmeters including two flow tubes located in parallel planes, a Coriolis flowmeter having a large diameter or a Coriolis flowmeter having high flow tube rigidity is required to increase power of driving means, and hence it is necessary to sandwich large driving means between the two flow tubes. Therefore, a design is made so that an interval between the flow tubes is necessarily widened even in a fixed end portion which is a base portion of the flow tubes.

As illustrated in FIG. 28, a Coriolis flowmeter 1 which is generally known and includes U-shaped measurement tubes includes a detector 4 for two U-shaped measurement tubes 2 and 3, and a converter 5.

The detector 4 for the measurement tubes 2 and 3 includes a vibrator 6 for resonance-vibrating the measurement tubes 2 and 3, a left velocity sensor 7 for detecting a vibration velocity generated on a left side of the measurement tubes 2 and 3 vibrated by the vibrator 6, a right velocity sensor 8 for detecting a vibration velocity generated on a right side of the measurement tubes 2 and 3 vibrated by the vibrator 6, and a temperature sensor 9 for detecting a temperature of a fluid to be measured, which flows through the measurement tubes 2 and 3 at the detection of the vibration velocity. The vibrator 6, the left velocity sensor 7, the right velocity sensor 8, and the temperature sensor 9 are connected to the converter 5.

The fluid to be measured, which flows through the measurement tubes 2 and 3 of the Coriolis flowmeter 1, flows from the right side of the measurement tubes 2 and 3 (side on which right velocity sensor 8 is provided) to the left side thereof (side on which left velocity sensor 7 is provided).

Therefore, a velocity signal detected by the right velocity sensor 8 is an inlet-side velocity signal of the fluid to be measured flowing into the measurement tubes 2 and 3. A velocity signal detected by the left velocity sensor 7 is an outlet-side velocity signal of the fluid to be measured flowing from the measurement tubes 2 and 3.

Each of the left velocity sensor 7 and the right velocity sensor 8 which detect the vibration velocities may be an acceleration sensor.

The converter 5 of the Coriolis flowmeter has a block structure as illustrated in FIG. 29.

The converter 5 of the Coriolis flowmeter includes a drive control section 10, a phase measurement section 11, and a temperature measurement section 12.

That is, the converter 5 of the Coriolis flowmeter has an input and output port 15. A drive signal output terminal 16 included in the drive control section 10 is provided in the input and output port 15. The drive control section 10 outputs a predetermined mode signal, from the drive signal output terminal 16 to the vibrator 6 attached to the measurement tubes 2 and 3 to resonance-vibrate the measurement tubes 2 and 3.

The drive signal output terminal 16 is connected to a drive circuit 18 through an amplifier 17. The drive circuit 18 generates a drive signal for resonance-vibrating the measurement tubes 2 and 3 and outputs the drive signal to the amplifier 17. The amplifier amplifies the input drive signal and outputs the drive signal to the drive signal output terminal 16. The drive signal output from the amplifier 17 is output from the drive signal output terminal 16 to the vibrator 6.

A left velocity signal input terminal 19 to which a detection signal of the vibration velocity generated on the left side of the measurement tubes 2 and 3 vibrated by the vibrator 6 is input is provided in the input and output port 15. The left velocity signal input terminal 19 is included in the phase measurement section 11.

A right velocity signal input terminal 20 to which a detection signal of the vibration velocity generated on the right side of the measurement tubes 2 and 3 vibrated by the vibrator 6 is input is provided in the input and output port 15. The right velocity signal input terminal 20 is included in the phase measurement section 11.

The phase measurement section 11 performs A/D conversion on the vibration signals of the pair of velocity sensors in the case where the predetermined mode signal is output from the drive signal output terminal 16 to the vibrator 6 attached to the measurement tubes 2 and 3 to vibrate the measurement tubes 2 and 3 by the vibrator 6, to thereby perform digital conversion processing, and then obtains a phase difference between the converted signals.

The left velocity signal input terminal 19 is connected to an input terminal of an amplifier 21. An output terminal of the amplifier 21 is connected to an A/D converter 22. The A/D converter 22 converts, into a digital value, an analog signal obtained by amplifying the vibration signal output from the left velocity signal input terminal 19 by the amplifier 21.

The A/D converter 22 is connected to a computing device 23.

Further, the right velocity signal input terminal 20 is connected to an input terminal of an amplifier 24. An output terminal of the amplifier 24 is connected to an A/D converter 25. The A/D converter 25 converts, into a digital value, an analog signal obtained by amplifying the vibration signal output from the right velocity signal input terminal 20 by the amplifier 24.

Further, the digital signal output from the A/D converter 25 is input to the computing device 23.

Further, a temperature signal input terminal 26 included in the temperature measurement section 11 to which a detection value from the temperature sensor 9 is input is provided in the input and output port 15. The temperature measurement section 12 performs tube temperature compensation based on the detection temperature obtained by the temperature sensor 9 which is provided in the measurement tubes 2 and 3 and detects an internal temperature of the measurement tubes 2 and 3.

A resistance type temperature sensor is generally used as the temperature sensor 9 to measure a resistance value, to thereby calculate a temperature.

The temperature signal input terminal 26 is connected to a temperature measurement circuit 27. The temperature measurement circuit 27 calculates the internal temperature of the measurement tubes 2 and 3 based on the resistance value output from the temperature sensor 9. The internal temperature of the measurement tubes 2 and 3 which is calculated by the temperature measurement circuit 27 is input to the computing device 23.

In the phase measurement method using the Coriolis flowmeter 1 as described above, vibration is applied in a primary mode, to the measurement tubes 2 and 3, from the vibrator 6 attached to the measurement tubes 2 and 3. When the fluid to be measured flows into the measurement tubes 2 and 3 while the vibration is applied, a phase mode is produced in the measurement tubes 2 and 3.

Therefore, the signal (inlet-side velocity signal) from the right velocity sensor 8 and the signal (outlet-side velocity signal) from the left velocity sensor 7 in the Coriolis flowmeter 1 are output as a form in which the two signals are superimposed on each other. A signal output as the form in which the two signals are superimposed on each other includes not only a flow rate signal but also a large number of unnecessary noise components. In addition, a frequency is changed depending on, for example, a change in density of the fluid to be measured.

Therefore, it is necessary to remove an unnecessary signal from the signals from the right velocity sensor 8 and the left velocity sensor 7. However, it is very difficult to remove the unnecessary signal from the signals from the right velocity sensor 8 and the left velocity sensor 7 to calculate the phase.

Further, the Coriolis flowmeter 1 is often required to have very-high-precision measurement and high-speed response. In order to satisfy such requirements, a computing device having very-complex computation and high-processing performance is necessary, and hence the Coriolis flowmeter 1 itself is very expensive.

Thus, the Coriolis flowmeter 1 requires an established phase difference measurement method using both an optimum filter always fit to a measurement frequency and a high-speed computing method.

In conventional phase difference measurement methods of calculating a flow rate, a filter processing method of removing noise is divided into a method using an analog filter and a method using a digital filter.

The method using the analog filter may be relatively inexpensive (see, for example, Patent Document 1 and Patent Document 2). However, Patent Document 1 and Patent Document 2 have a limit to improve the performance of the filter, and hence, there is a problem that the filter is not sufficient for the Coriolis flowmeter.

In recent years, a large number of Coriolis flowmeters using digital signal processing have been developed, and the method using the digital filter has been developed as the filter processing method of removing noise in the conventional phase difference measurement methods of calculating the flow rate.

Examples of conventional types of the Coriolis flowmeters using digital signal processing include a method of measuring a phase using a Fourier transform (see, for example, Patent Document 3) and a method of selecting an optimum table fit to an input frequency from filter tables including a notch filter and a band-pass filter to measure a phase (see, for example, Patent Document 4 and Patent Document 5).

<<Phase Measurement Method Using Fourier Transform>>

A converter of the Coriolis flowmeter based on the phase measurement method using the Fourier transform has a block structure as illustrated in FIG. 30.

In FIG. 30, the left velocity signal input terminal 19 provided in the input and output port 15 to which the detection signal of the vibration velocity (outlet-side velocity signal) which is generated on the left side of the measurement tubes 2 and 3 vibrated by the vibrator 6 and which is detected by the left velocity sensor 7 is input is connected to a low-pass filter 30. The low-pass filter 30 is a circuit for extracting, through a frequency filter, only a low-frequency left velocity signal (outlet-side velocity signal) from the left velocity signal (outlet-side velocity signal) output from the left velocity sensor 7 detecting the vibration velocity generated on the left side of the measurement tubes 2 and 3 in the case where the measurement tubes 2 and 3 are vibrated by the vibrator 6.

The low-pass filter 30 is connected to an A/D converter 31. The A/D converter 31 converts, into a digital signal, the left velocity signal which is the analog signal output from the low-pass filter 30. The left velocity signal obtained as the digital signal by conversion by the A/D converter 31 is input to a phase difference measurement unit 32.

The A/D converter 31 is connected to a timing generator 33. The timing generator 33 generates a timing of sampling M-times (M is natural number) the input frequency.

On the other hand, the right velocity signal input terminal 20 provided in the input and output port 15 to which the detection signal of the vibration velocity (inlet-side velocity signal) which is generated on the right side of the measurement tubes 2 and 3 vibrated by the vibrator 6 and which is detected by the right velocity sensor 8 is input is connected to a low-pass filter 34. The low-pass filter 34 is a circuit for extracting, through a frequency filter, only a low-frequency right velocity signal (inlet-side velocity signal) from the right velocity signal (inlet-side velocity signal) output from the right velocity sensor 8 detecting the vibration velocity generated on the right side of the measurement tubes 2 and 3 in the case where the measurement tubes 2 and 3 are vibrated by the vibrator 6.

The low-pass filter 34 is connected to an A/D converter 35. The A/D converter 35 converts, into a digital signal, the right velocity signal which is the analog signal output from the low-pass filter 34. The right velocity signal obtained as the digital signal by conversion by the A/D converter 35 is input to the phase difference measurement unit 32.

Further, the A/D converter 35 is connected to the timing generator 33. The timing generator 33 generates a timing of sampling M-times (M is natural number) the input frequency.

Further, the right velocity signal input terminal 20 provided in the input and output port 15 to which the detection signal of the vibration velocity (inlet-side velocity signal) which is generated on the right side of the measurement tubes 2 and 3 vibrated by the vibrator 6 and which is detected by the right velocity sensor 8 is input is connected to a frequency measurement unit 36. The frequency measurement unit 36 measures the frequency of the detection signal of the vibration velocity (inlet-side velocity signal) which is generated on the right side of the measurement tubes 2 and 3 vibrated by the vibrator 6 and which is detected by the right velocity sensor 8.

The frequency measurement unit 36 is connected to the timing generator 33. The frequency measured by the frequency measurement unit 36 is output to the timing generator 33. The timing of sampling M-times (M is natural number) the input frequency is generated by the timing generator 33 and output to the A/D converters 31 and 35.

The phase difference measurement unit 32, the timing generator 33, and the frequency measurement unit 36 are included in a phase measurement computing device 40.

In the phase measurement method using the Fourier transform as illustrated in FIG. 30, the input signal (inlet-side velocity signal) from the right velocity sensor 8 is first input to the frequency measurement unit 36 to measure a frequency. The frequency measured by the frequency measurement unit 36 is input to the timing generator 33. The timing of sampling M-times (M is natural number) the input frequency is generated by the timing generator 33 and input to the A/D converters 31 and 35.

Further, the detection signal of the vibration velocity (outlet-side velocity signal) which is generated on the left side of the measurement tubes 2 and 3 and obtained as the digital signal by conversion by the A/D converter 31 and the detection signal of the vibration velocity (inlet-side velocity signal) which is generated on the right side of the measurement tubes 2 and 3 and obtained as the digital signal by conversion by the A/D converter 35 are input to the phase difference measurement unit 32. The detection signals are Fourier-transformed by a discrete Fourier transform unit incorporated in the phase difference measurement unit 32 and a phase difference is computed based on a ratio between a real component and imaginary component of the converted signals.

<<Phase Measurement Method Using Digital Filter>>

Converters of the Coriolis flowmeter based on the phase measurement method using the digital filter are described with reference to block structural diagrams illustrated in FIGS. 31 and 32.

Frequency selection means such as a notch filter or a band-pass filter is used as the digital filter. An S/N ratio of an input signal is improved using the frequency selection means such as the notch filter or the band-pass filter.

FIG. 31 illustrates a block structure of a converter of the Coriolis flowmeter using the notch filter as the digital filter.

The input and output port 15, the left velocity signal input terminal 19, the right velocity signal input terminal 20, the low-pass filters 30 and 34, and the A/D converters 31 and 35 as illustrated in FIG. 31 have the same structures as the input and output port 15, the left velocity signal input terminal 19, the right velocity signal input terminal 20, the low-pass filters 30 and 34, and the A/D converters 31 and 35 as illustrated in FIG. 30, respectively.

In FIG. 31, the A/D converter 31 is connected to a notch filter 51. The notch filter 51 selects a frequency based on the left velocity signal which is obtained as the digital signal by conversion by the A/D converter 31, so as to improve an S/N ratio of an input signal to be output.

The notch filter 51 is connected to a phase measurement unit 52. The phase measurement unit 52 measures a phase of the left velocity signal which is obtained as the digital signal by conversion and which is improved in S/N ratio by the notch filter 51.

Further, the notch filter 51 is connected to a frequency measurement unit 53. The frequency measurement unit 53 measures a frequency of the left velocity signal which is obtained as the digital signal by conversion and which is improved in S/N ratio by the notch filter 51.

The frequency measured by the frequency measurement unit 53 is input to the notch filter 51.

Further, the A/D converter 35 is connected to a notch filter 54. The notch filter 54 selects a frequency based on the left velocity signal which is obtained as the digital signal by conversion by the A/D converter 31, so as to improve an S/N ratio of an input signal to be output.

The notch filter 54 is connected to the phase measurement unit 52. The phase measurement unit 52 measures a phase of the right velocity signal which is obtained as the digital signal by conversion and which is improved in S/N ratio by the notch filter 54.

Further, the frequency measured by the frequency measurement unit 53 is input to the notch filter 54.

In FIG. 31, a clock 55 is used for synchronization, and input to the A/D converters 31 and 35 to synchronize the A/D converter 31 and the A/D converter 35 with each other.

The notch filters 51 and 54, the phase measurement unit 52, the frequency measurement unit 53, and the clock 55 are included in a phase measurement computing device 50.

FIG. 32 illustrates a block structure of a converter of the Coriolis flowmeter using the band-pass filter (BPF) as the digital filter.

The input and output port 15, the left velocity signal input terminal 19, the right velocity signal input terminal 20, the low-pass filters 30 and 34, and the A/D converters 31 and 35 as illustrated in FIG. 32 have the same structures as the input and output port 15, the left velocity signal input terminal 19, the right velocity signal input terminal 20, the low-pass filters 30 and 34, and the A/D converters 31 and 35 as illustrated in FIG. 31, respectively.

In FIG. 32, the A/D converter 31 is connected to a band-pass filter (BPF) 61. The band-pass filter 61 is a circuit for extracting, through a frequency filter, only a left velocity signal having a set frequency (outlet-side velocity signal) from the left velocity signal (outlet-side velocity signal) which is output from the left velocity sensor 7 detecting the vibration velocity generated on the left side of the measurement tubes 2 and 3 and which is obtained as the digital signal by conversion by the A/D converter 31 in the case where the measurement tubes 2 and 3 are vibrated by the vibrator 6.

The band-pass filter 61 is connected to a phase measurement unit 62. The phase measurement unit 62 measures a phase of the left velocity signal which is obtained as the digital signal by conversion and which is improved in S/N ratio by the band-pass filter 61.

Further, the band-pass filter 61 is connected to a frequency measurement unit 63. The frequency measurement unit 63 measures a frequency of the left velocity signal which is obtained as the digital signal by conversion by the A/D converter 31 and which is improved in S/N ratio by the band-pass filter 61.

The frequency measured by the frequency measurement unit 63 is input to the band-pass filter 61.

Further, the A/D converter 35 is connected to a band-pass filter 64. The band-pass filter 64 is a circuit for extracting, through a frequency filter, only a right velocity signal having a set frequency (inlet-side velocity signal) from the right velocity signal (inlet-side velocity signal) which is output from the right velocity sensor 8 detecting the vibration velocity generated on the right side of the measurement tubes 2 and 3 and which is obtained as the digital signal by conversion by the A/D converter 35 in the case where the measurement tubes 2 and 3 are vibrated by the vibrator 6.

The band-pass filter 64 is connected to the phase measurement unit 62. The phase measurement unit 62 measures a phase of the left velocity signal which is obtained as the digital signal by conversion and which is improved in S/N ratio by the band-pass filter 64.

The band-pass filter 64 is connected to the frequency measurement unit 63. The frequency measured by the frequency measurement unit 63 is input to the band-pass filter 64.

In FIG. 32, a clock 65 is used for synchronization, and a clock signal from the clock 65 is input to the A/D converters 31 and 35 to synchronize the A/D converter 31 and the A/D converter 35 with each other.

The band-pass filters 61 and 64, the phase measurement unit 62, the frequency measurement unit 63, and the clock 65 are included in a phase measurement computing device 60.

PRIOR ART DOCUMENT

Patent Document

[Patent Document 1] JP 02-66410 A
[Patent Document 2] JP 10-503017 A
[Patent Document 3] JP 2799243 B
[Patent Document 4] JP 2930430 B
[Patent Document 5] JP 3219122 B

SUMMARY OF THE INVENTION

Problems to be Solved by the Invention

In the phase measurement method using the Fourier transform as described in Patent Document 3, when the input frequency of the input detection signal of the vibration velocity is constant, a phase measurement method having very-high-frequency selectivity may be performed because the Fourier transform is used for frequency selection.

However, in the method using the Fourier transform as described in Patent Document 3, when the input frequency of the input detection signal of the vibration velocity is changed according to a density or a temperature, it is necessary to change the transform method or the sampling rate. Therefore, the computing cycle or the computing method is changed, and hence a measurement value is varied and thus unstabilized.

In addition, in the method using the Fourier transform as described in Patent Document 3, when the input frequency of the input detection signal of the vibration velocity is changed according to the density or the temperature, it is necessary to accurately synchronize the sampling rate with the input frequency of the input vibration velocity signal, and hence a design is very complicated.

Therefore, there is a problem that, when the temperature of the fluid to be measured is rapidly changed or the density is rapidly changed by mixing air bubbles into the fluid, the measurement precision is extremely reduced.

Further, the method using the Fourier transform as described in Patent Document 3 has a problem that the number of computing processings becomes very large because of the execution of the Fourier transform.

In the methods of selecting the optimum table fit to the input frequency from the filter tables including the notch filter and the band-pass filter to measure the phase as described in Patent Document 4 and Patent Document 5, when the sampling rate is held, the design may be simplified.

However, as in the method using the Fourier transform as described in Patent Document 3, the phase measurement methods using the digital filter as described in Patent Document 4 and Patent Document 5 require a very large number of filter tables corresponding to changed input frequencies, and hence have a problem that memory consumption of a computing device is large.

In addition, the phase measurement methods using the digital filter as described in Patent Document 4 and Patent Document 5 have a problem that it is difficult to select the optimum filter in a case where the input frequency rapidly changes.

Further, the phase measurement methods using the digital filter as described in Patent Document 4 and Patent Document 5 have a problem that a vary large number of computations is required to improve frequency selection performance.

The phase measurement methods using the digital filter as described in Patent Document 4 and Patent Document 5 have the following problems.

(1) The method cannot follow the change in input frequency at high precision. That is, it is very difficult to realize measurement in a case where the density of the fluid to be measured rapidly changes because of air bubble mixing.

(2) In order to improve the frequency selection performance, a very large number of computations are required. Therefore, it is difficult to realize high-speed response, and hence the method is unsuitable for batch processing for a short period of time.

(3) The memory consumption of the computing device is large, and hence the design is complicated. Therefore, a circuit structure and design are complicated and very disadvantageous in cost.

When all the factors are considered, in any of the conventional phase measurement methods including the digital filter processing, a noise of a frequency band other than the tube frequencies of the measurement tubes 2 and 3 is removed, and hence the switching of the filter table, the change of the computing method, and the change of the sampling rate are required to always follow the tube frequencies of the measurement tubes 2 and 3. Therefore, there is a problem that it is necessary to perform computation which is very complicated and lacks high-speed performance.

Thus, when the measurement tubes 2 and 3 are vibrated by the vibrator 6, it is very likely to generate a computing error in each variation of the input frequencies of the vibration velocity signals which are detected by the right velocity sensor 8 for detecting the vibration velocity generated on the right side of the measurement tubes 2 and 3 and the left velocity sensor 7 for detecting the vibration velocity generated on the left side of the measurement tubes 2 and 3, and hence there is a problem that measurement precision is very low.

An object of the present invention is to provide a signal processing method, a signal processing apparatus, and a Coriolis flowmeter, in which even when a temperature of a fluid to be measured changes, even when air bubbles are mixed into the fluid to be measured, or even when the fluid to be measured rapidly changes from a gas to a liquid, measurement may be always performed with constant precision, phase measurement with high filtering performance is realized, and a computing processing amount may be reduced to an extremely small amount.

A signal processing method, which is provided so as to solve the above-mentioned problems, is a signal processing method for a Coriolis flowmeter in which at least one flow tube or a pair of flow tubes which is included in a measurement flow tube is alternately driven by causing a vibrator to be actuated by a driving device to vibrate the at least one flow tube or the pair of flow tubes, and at least one of a phase difference and a vibration frequency proportional to a Coriolis force acting on the at least one flow tube or the pair of flow tubes is detected by velocity sensors or acceleration sensors which are a pair of vibration detection sensors provided on a left-hand side and a right-hand side of the at least one flow tube or the pair of flow tubes, to thereby obtain at least one of a mass flow rate and a density of a fluid to be measured, the signal processing method comprising:

a first step of converting an analog signal, which is output from each of the pair of vibration detection sensors, to a digital vibration frequency signal;

a second step of measuring the vibration frequency of the at least one flow tube or the pair of flow tubes;

a third step of generating a control signal for always controlling a frequency of the digital vibration frequency signal obtained through the conversion in the first step to be 1/N of the frequency thereof based on the digital vibration frequency signal output from one of the pair of vibration detection sensors, which is measured in the second step; and a fourth step of subjecting the digital vibration frequency signal obtained through the conversion in the first step to orthogonal conversion by using the control signal generated in the third step, to thereby obtain a frequency signal that has a frequency thereof set to 1/N of the frequency of the digital vibration frequency signal obtained through the conversion in the first step, whereby the phase difference between detection signals from the pair of vibration detection sensors is detected by using the frequency signal obtained through the orthogonal conversion in the fourth step, which has the frequency thereof set to 1/N of the frequency of the digital vibration frequency signal.

A signal processing method, which is provided so as to solve the above-mentioned problems, is a signal processing method for a Coriolis flowmeter in which at least one flow tube or a pair of flow tubes which is included in a measurement flow tube is alternately driven by causing a vibrator to be actuated by a driving device to vibrate the at least one flow tube or the pair of flow tubes, and at least one of a phase difference and a vibration frequency proportional to a Coriolis force acting on the at least one flow tube or the pair of flow tubes is detected by a pair of velocity sensors or a pair of acceleration sensors which are vibration detection sensors, to thereby obtain at least one of a mass flow rate and a density of a fluid to be measured, the signal processing method comprising:

measuring the vibration frequency of the at least one flow tube or the pair of flow tubes;

transmitting a control signal based on the measured vibration frequency;

performing composite frequency conversion based on the transmitted control signal on each of two flow rate signals obtained through A/D conversion on input signals having the at least one of the phase difference and the vibration frequency proportional to the Coriolis force acting on the at least one flow tube or the pair of flow tubes, which are detected by the pair of velocity sensors or the pair of acceleration sensors, so that resultant signals always have a constant frequency; and measuring a phase from each of converted composite frequency signals obtained through the composite frequency conversion, to thereby obtain a phase difference signal component.

A signal processing method, which is provided so as to solve the above-mentioned problems, is a signal processing apparatus for a Coriolis flowmeter in which at least one flow tube or a pair of flow tubes which is included in a measurement flow tube is alternately driven by causing a vibrator to be actuated by a driving device to vibrate the at least one flow tube or the pair of flow tubes, and at least one of a phase difference and a vibration frequency proportional to a Coriolis force acting on the at least one flow tube or the pair of flow tubes is detected by velocity sensors or acceleration sensors which are a pair of vibration detection sensors provided on a left-hand side and a right-hand side of the at least one flow tube or the pair of flow tubes, to thereby obtain at least one of a mass flow rate and a density of a fluid to be measured, the signal processing apparatus comprising:

A/D converters for converting analog signals, which are output from the pair of vibration detection sensors, to digital signals, respectively;

a frequency measurement unit for measuring a vibration frequency $\theta$ of the at least one flow tube or the pair of flow tubes;

a transmitter for generating a frequency signal having a frequency thereof set to $\theta(1-1/N)$ of a frequency of a digital frequency signal output from the frequency measurement unit; and a pair of orthogonal frequency converters for converting, based on the frequency signal generated by the transmitter, frequencies of two of the digital signals corresponding to the pair of vibration detection sensors, which are output from the A/D converters, respectively, and generating digital signals having frequencies thereof set to 1/N of frequencies of the two of the digital signals, respectively, whereby the phase difference is obtained by using the digital signals generated by the pair of orthogonal frequency converters.

A signal processing apparatus, which is provided so as to solve the above-mentioned problems, is a signal processing apparatus for a Coriolis flowmeter in which at least one flow tube or a pair of flow tubes which is included in a measurement flow tube is alternately driven by causing a vibrator to be actuated by a driving device to vibrate the at least one flow tube or the pair of flow tubes, and at least one of a phase difference and a vibration frequency proportional to a Coriolis force acting on the at least one flow tube or the pair of flow tubes is detected by velocity sensors or acceleration sensors which are vibration detection sensors, to thereby obtain at least one of a mass flow rate and a density of a fluid to be measured, the signal processing apparatus comprising:

a frequency measurement unit for measuring a frequency of the at least one flow tube or the pair of flow tubes;

a transmitter for outputting and transmitting a desired frequency signal based on the frequency measured by the frequency measurement unit;

frequency conversion sections for performing frequency conversion by conducting one of addition and subtraction between an output frequency of the transmitter and respective input signals having the at least one of the phase difference and the vibration frequency proportional to the Coriolis force acting on the at least one flow tube or the pair of flow tubes, which are detected by the velocity sensors or the acceleration sensors, to thereby always obtain constant frequency values; and a phase difference measurement section for measuring the phase difference between frequency signals detected by the velocity sensors or the acceleration sensors, which are obtained through the frequency conversion by the frequency conversion sections.

A signal processing apparatus, which is provided so as to solve the above-mentioned problems, is a signal processing apparatus for a Coriolis flowmeter in which at least one flow tube or a pair of flow tubes which is included in a measurement flow tube is alternately driven by causing a vibrator to be actuated by a driving device to vibrate the at least one flow tube or the pair of flow tubes, and at least one of a phase difference and a vibration frequency proportional to a Coriolis force acting on the at least one flow tube or the pair of flow tubes is detected by velocity sensors or acceleration sensors which are vibration detection sensors, to thereby obtain at least one of a mass flow rate and a density of a fluid to be measured, the signal processing apparatus comprising:

a frequency measurement unit for measuring a frequency of the at least one flow tube or the pair of flow tubes;

a transmitter for outputting and transmitting a desired frequency signal based on the frequency measured by the frequency measurement unit;

a first frequency conversion section for performing frequency conversion by conducting one of addition and subtraction between an output frequency output from the transmitter and an input signal frequency obtained by converting a signal of one sensor of a pair of the vibration detection sensors into a digital signal by a first A/D converter, to thereby always obtain a constant frequency value;

a second frequency conversion section for performing frequency conversion by conducting one of addition and subtraction between the output frequency output from the transmitter and an input signal frequency obtained by converting a signal output from another sensor of the pair of the vibration detection sensors to a digital signal by a second A/D converter, to thereby always obtain a constant frequency value; and a phase difference measurement section for measuring the phase difference between a first frequency signal, which is obtained through the frequency conversion by and output from the first frequency conversion section, and a second frequency signal, which is obtained through the frequency conversion by and output from the second frequency conversion section.

A Coriolis flowmeter, which is provided so as to solve the above-mentioned problems, is a signal processing apparatus for a Coriolis flowmeter in which at least one flow tube or a pair of flow tubes which is included in a measurement flow tube is alternately driven by causing a vibrator to be actuated by a driving device to vibrate the at least one flow tube or the pair of flow tubes, and at least one of a phase difference and a vibration frequency proportional to a Coriolis force acting on the at least one flow tube or the pair of flow tubes is detected by a pair of velocity sensors or a pair of acceleration sensors which are vibration detection sensors, to thereby obtain at least one of a mass flow rate and a density of a fluid to be measured, the signal processing apparatus comprising:

a frequency measurement unit for measuring a frequency of the at least one flow tube or the pair of flow tubes;

a transmitter for outputting and transmitting a desired frequency signal based on the frequency measured by the frequency measurement unit;

a first frequency conversion section for shifting in frequency, to a constant frequency signal, an input signal frequency obtained by converting a signal of one velocity sensor of a pair of the vibration detection sensors into a digital signal by a first A/D converter and output from the first A/D converter, based on an output frequency output from the transmitter to move the input signal frequency to another frequency band;

a second frequency conversion section for shifting in frequency, to a constant frequency signal, an input signal frequency obtained by converting a signal of another velocity sensor of the pair of the vibration detection sensors into a digital signal by a second A/D converter and output from the second A/D converter, based on the output frequency output from the transmitter to move the input signal frequency to another frequency band; and a phase difference measurement section for measuring the phase difference between a first frequency signal, which is obtained as the constant frequency signal through the shifting by and output from the first frequency conversion section, and a second frequency signal, which is obtained as the constant frequency signal through the shifting by and output from the second frequency conversion section.

A Coriolis flowmeter, which is provided so as to solve the above-mentioned problems, is a Coriolis flowmeter in which at least one flow tube or a pair of flow tubes which is included in a measurement flow tube is alternately driven by causing a vibrator to be actuated by a driving device to vibrate the at least one flow tube or the pair of flow tubes, and at least one of a phase difference and a vibration frequency proportional to a Coriolis force acting on the at least one flow tube or the pair of flow tubes is detected by vibration detection sensors, to thereby obtain at least one of a mass flow rate and a density of a fluid to be measured, the Coriolis flowmeter comprising a signal processing apparatus comprising:

A/D converters for converting analog signals, which are output from a pair of the vibration detection sensors, to digital signals, respectively;

a frequency measurement unit for measuring a vibration frequency angle $\theta$ of the at least one flow tube or the pair of flow tubes;

a transmitter for generating a frequency signal having a frequency thereof set to θ(1−1/N) of a frequency of a digital frequency signal output from the frequency measurement unit; and a pair of orthogonal frequency converters for converting, based on the frequency signal generated by the transmitter, frequencies of two of the digital signals corresponding to the pair of the vibration detection sensors, which are output from the A/D converters, respectively, and generating digital signals having frequencies thereof set to 1/N of frequencies of the two of the digital signals, respectively, whereby the phase difference is obtained by using the digital signals generated by the pair of orthogonal frequency converters.

A Coriolis flowmeter, which is provided so as to solve the above-mentioned problems, is a Coriolis flowmeter in which at least one flow tube or a pair of flow tubes which is included in a measurement flow tube is alternately driven by causing a vibrator to be actuated by a driving device to vibrate the at least one flow tube or the pair of flow tubes, and at least one of a phase difference and a vibration frequency proportional to a Coriolis force acting on the at least one flow tube or the pair of flow tubes is detected by velocity sensors or acceleration sensors which are vibration detection sensors, to thereby obtain at least one of a mass flow rate and a density of a fluid to be measured, the Coriolis flowmeter comprising a signal processing apparatus comprising:

a frequency measurement unit for measuring a frequency of the at least one flow tube or the pair of flow tubes;

a transmitter for transmitting and outputting a desired frequency signal based on the frequency measured by the frequency measurement unit;

a first frequency conversion section for shifting in frequency, to a constant frequency signal, an input signal frequency obtained by converting a signal of one velocity sensor of a pair of the vibration detection sensors into a digital signal by a first A/D converter and output from the first A/D converter, based on an output frequency output from the transmitter to move the input signal frequency to another frequency band;

a second frequency conversion section for shifting in frequency, to a constant frequency signal, an input signal frequency obtained by converting a signal of another velocity sensor of the pair of the vibration detection sensors into a digital signal by a second A/D converter and output from the second A/D converter, based on the output frequency output from the transmitter to move the input signal frequency to another frequency band; and a phase difference measurement section for measuring the phase difference between a first frequency signal, which is obtained as the constant frequency signal through the shifting by and output from the first frequency conversion section, and a second frequency signal, which is obtained as the constant frequency signal through the shifting by and output from the second frequency conversion section, whereby the phase difference between the first frequency signal, which is obtained as the constant frequency signal through the shifting by and output from the first frequency conversion section, and the second frequency signal, which is obtained as the constant frequency signal through the shifting by and output from the second frequency conversion section, is obtained.

Effect of the Invention

The measurement tube of the Coriolis flowmeter has various shapes. For example, there are a curved tube and a straight tube. There is a type driven in any of various modes including a primary mode and a secondary mode, as a mode for driving the measurement tube.

As is well known, the driving frequency band obtained from the measurement tube is several ten Hz to several kHz. For example, when the measurement tube using a U-shaped tube is vibrated in the primary mode, the frequency is approximately 100 Hz. When the measurement tube having a straight shape is vibrated in the primary mode, approximately 500 Hz to 1,000 Hz is realized.

However, it is very difficult to perform the phase measurement of the Coriolis flowmeter by always the same processing over the frequency band of several ten Hz to several kHz in a single flowmeter converter. Therefore, it is necessary to separately design several types.

According to the signal processing method in the present invention, the essential problems as described above may be removed by advantageous signal processing based on an identification algorithm. Even in the case of the change in temperature of the fluid to be measured, the mixing of air bubbles, or the rapid change of the fluid to be measured from the gas to the liquid, the stable measurement may be always performed with constant precision. The phase measurement with high filtering performance is advantageous, and hence high performance may be provided.

According to the signal processing apparatus in the present invention, even when the temperature of the fluid to be measured changes, even when air bubbles are mixed into the fluid to be measured, or even when the fluid to be measured rapidly changes from a gas to a liquid, the stable measurement may be always performed with constant precision, and the phase measurement with high filtering performance may be realized with a small computing processing amount.

According to a Coriolis flowmeter in the present invention, even when the temperature of the fluid to be measured changes, even when air bubbles are mixed into the fluid to be measured, or even when the fluid to be measured rapidly changes from a gas to a liquid, the stable measurement may be always performed with constant precision, and the phase measurement with high filtering performance may be realized with a small computing processing amount.

BRIEF DESCRIPTION OF THE DRAWINGS

FIG. 1 A block diagram illustrating a principle of a signal processing method and apparatus according to the present invention.

FIG. 21 A diagram illustrating an output signal from a transmitter illustrated in FIG. 18.

DETAILED DESCRIPTION OF THE INVENTION

It is an object of the present invention to be able to always perform measurement with constant precision, to realize phase measurement with high filtering performance, and to be able to reduce a computing processing amount to an extremely small amount. Even when a temperature of a fluid to be measured changes, even when air bubbles are mixed into the fluid to be measured, or even when the fluid to be measured rapidly changes from a gas to a liquid, the object may be realized.

Embodiment 1

Figure 13:
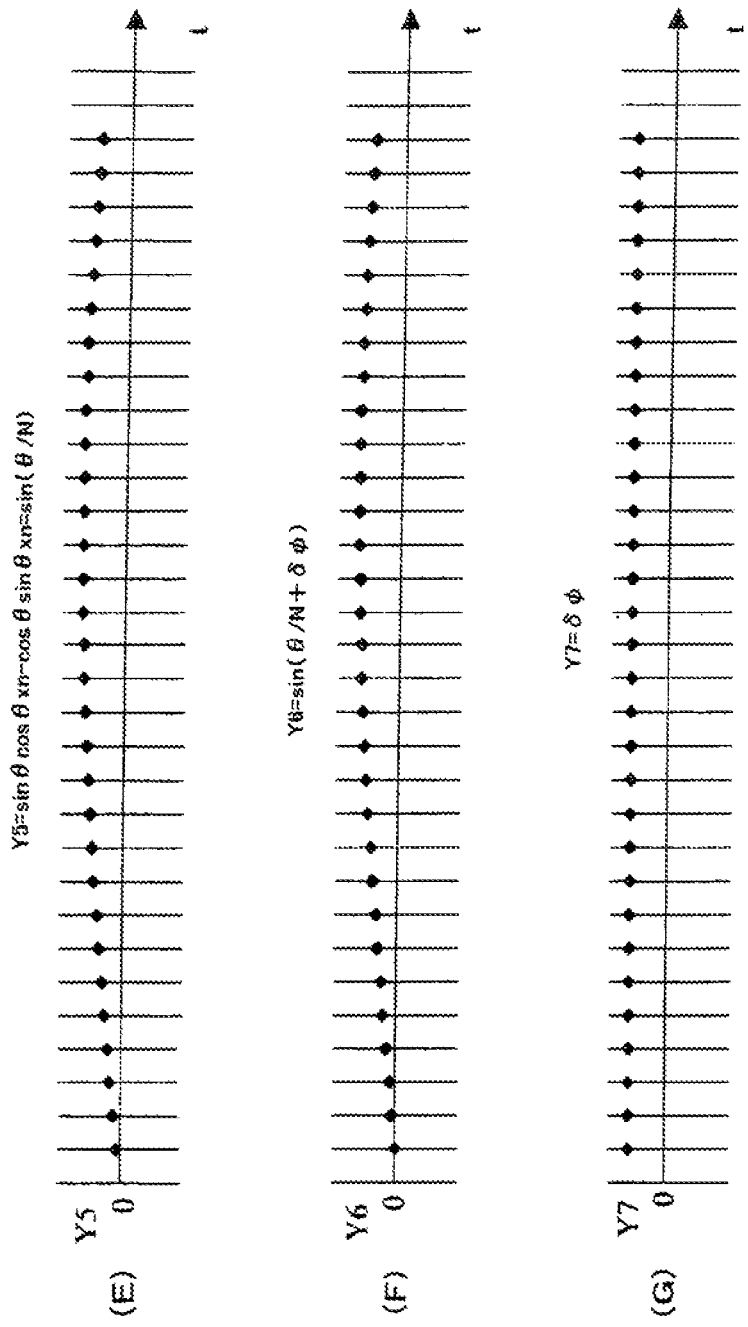
FIG. 13 Diagrams illustrating timing charts for the specific structure of the signal processing apparatus illustrated in FIG. 5.

Hereinafter, Embodiment 1 of a mode for carrying out the present invention is described with reference to FIGS. 1 and 13.

Figure 3:
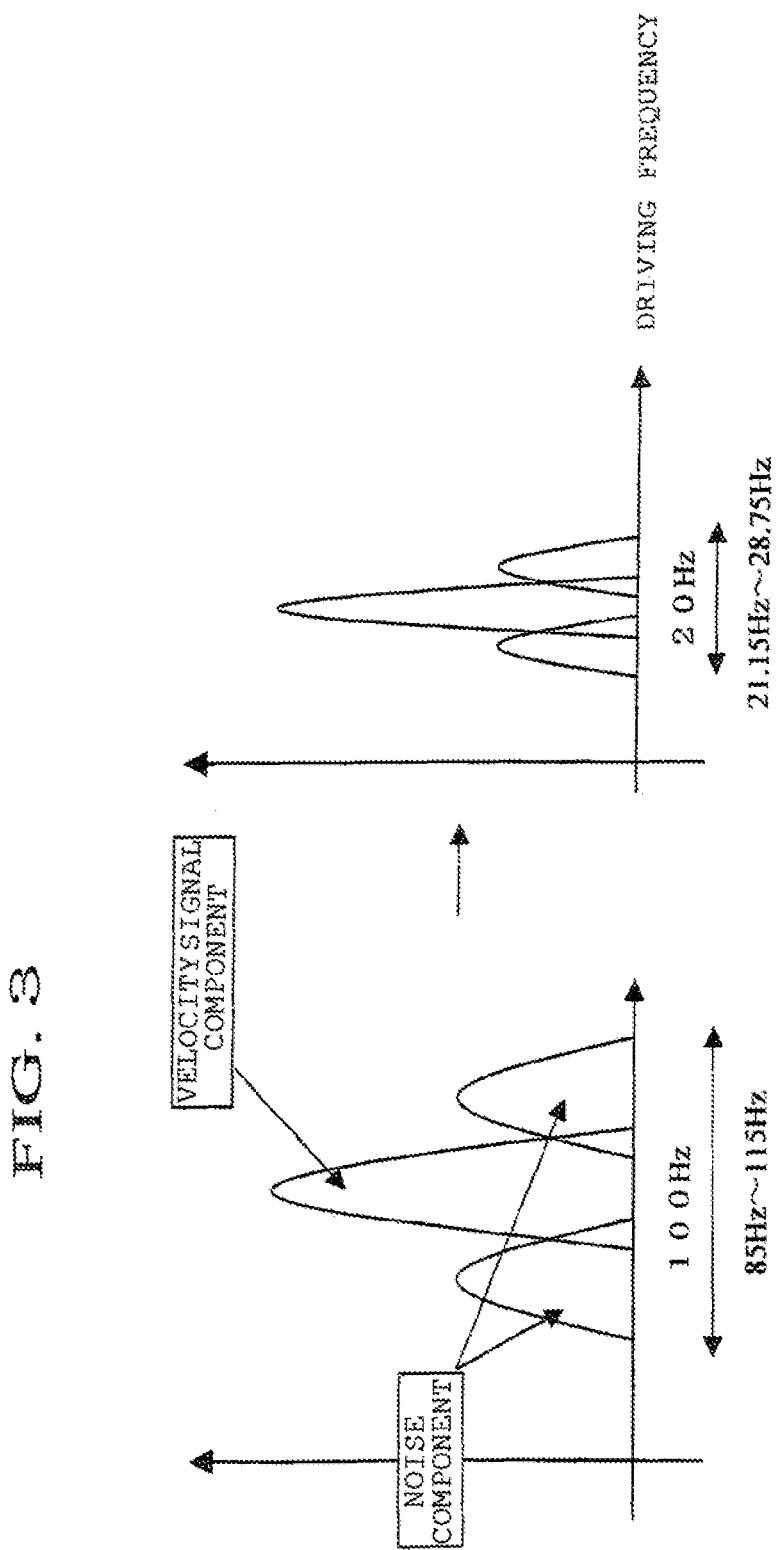
FIG. 3 A diagram illustrating a frequency waveform in a case where the driving frequency of the Coriolis flowmeter of which the driving frequency is 100 Hz is divided.
Figure 4:
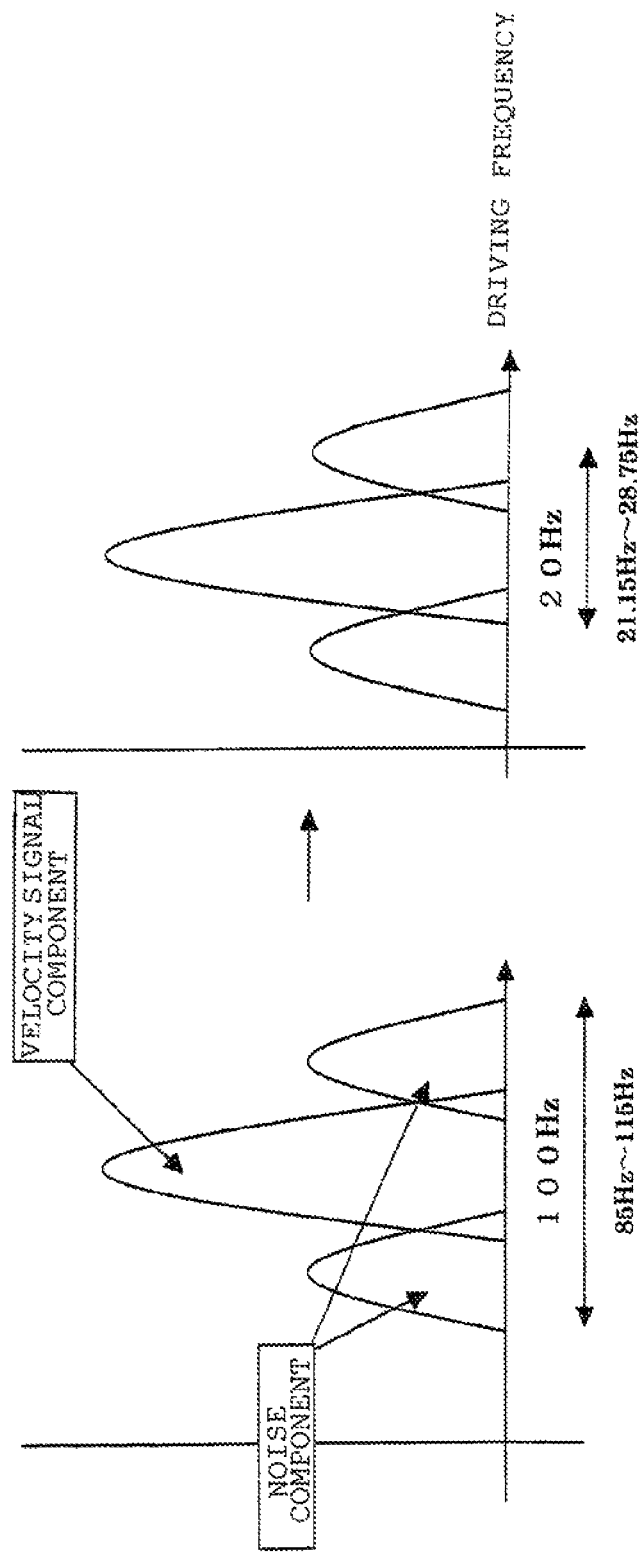
FIG. 4 A diagram illustrating a frequency waveform in a case where the driving frequency of the Coriolis flowmeter of which the driving frequency is 100 Hz is shifted.
Figure 5:
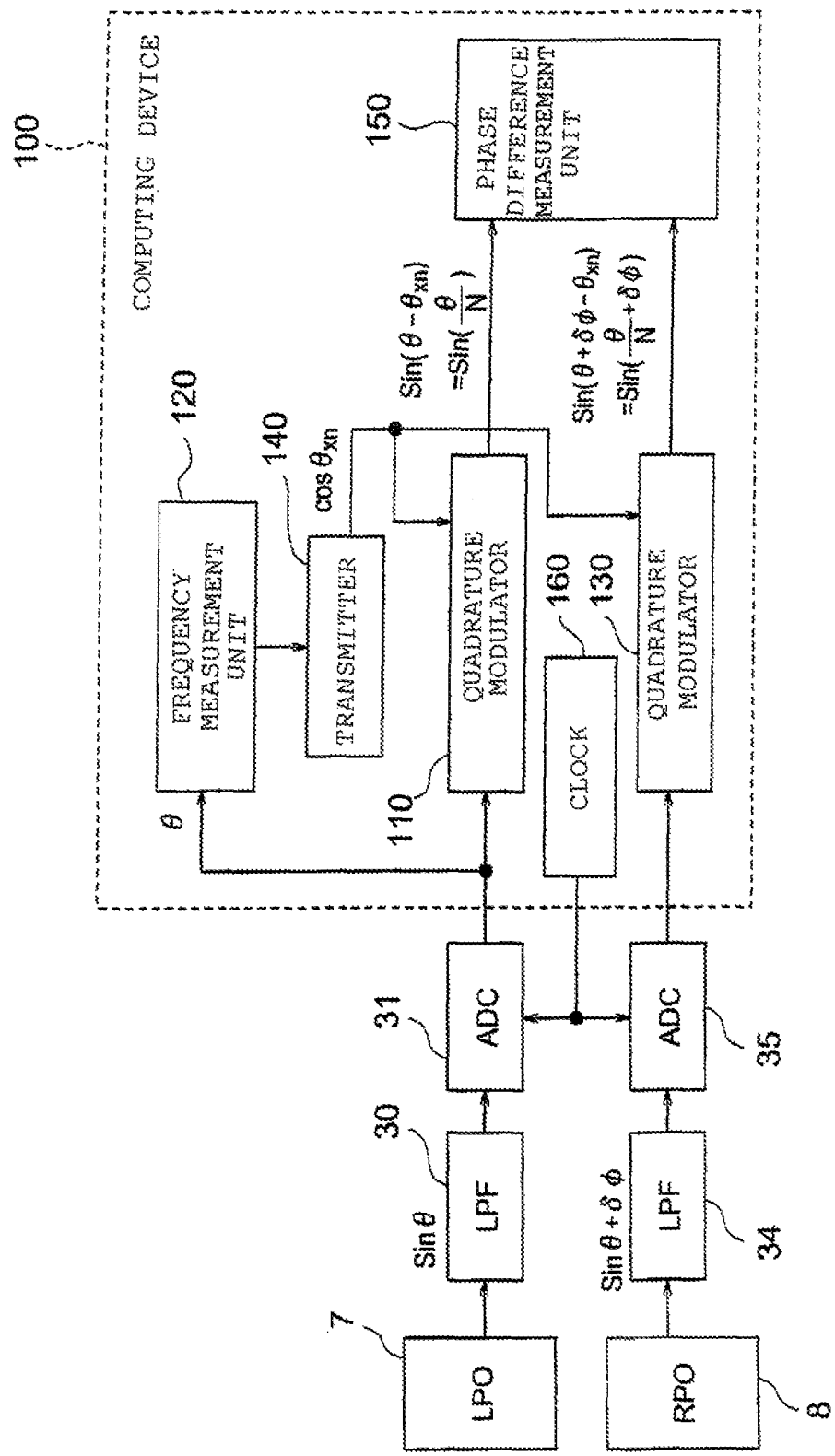
FIG. 5 A specific structural diagram illustrating the signal processing apparatus illustrated in FIG. 1.
Figure 6:
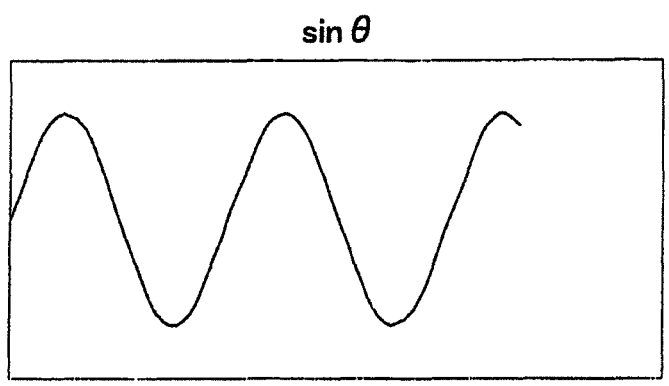
FIG. 6 A diagram illustrating a detection signal of a vibration velocity which is generated on a left side of measurement tubes and output from a low-pass filter illustrated in FIG. 5.
Figure 7:
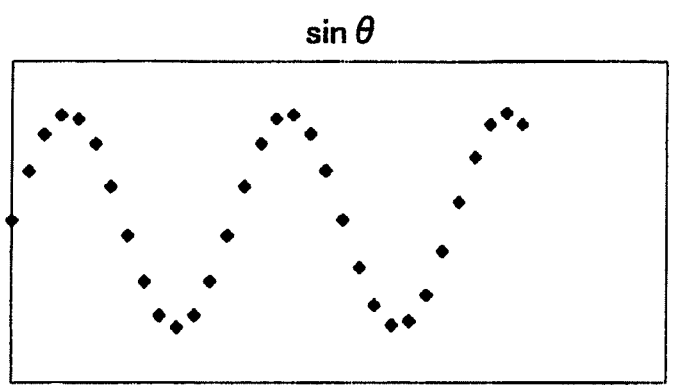
FIG. 7 A diagram illustrating a signal obtained as a digital signal by sampling, at arbitrary constant intervals, the signal illustrated in FIG. 6, which is output from an A/D converter illustrated in FIG. 5.
Figure 8:
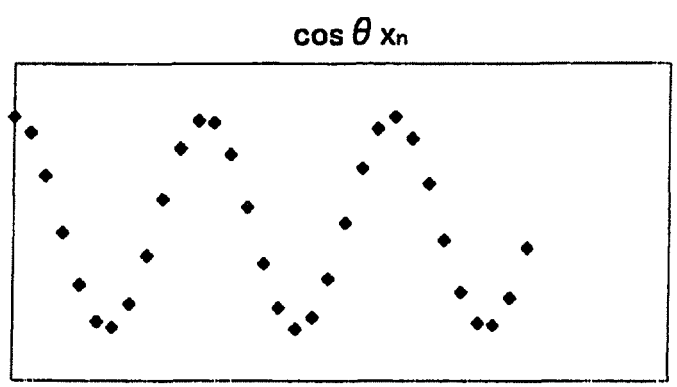
FIG. 8 A diagram illustrating a transmission frequency signal (θXn) output from a transmitter illustrated in FIG. 5.
Figure 9:
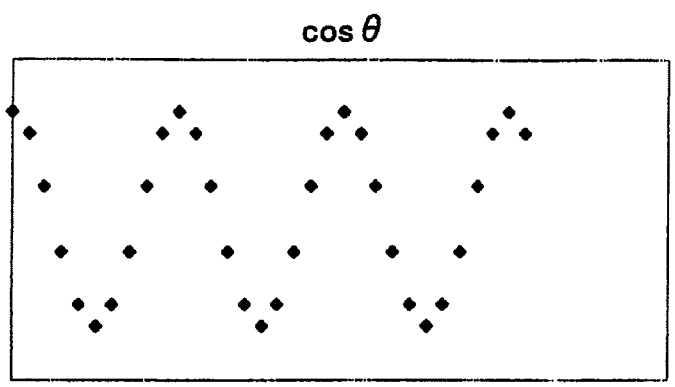
FIG. 9 A diagram illustrating a 90-degree shift signal of an output signal (cos θ) which is output from the A/D converter and generated in an inner portion of a quadrature modulator illustrated in FIG. 5.
Figure 10:
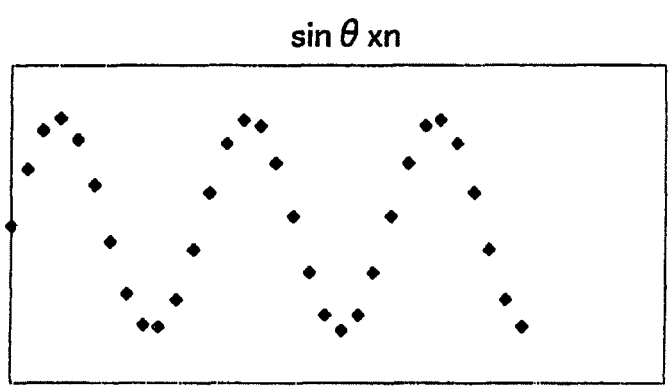
FIG. 10 A diagram illustrating a 90-degree shift signal of an output signal (cos θXn) which is output from the transmitter and generated in the inner portion of the quadrature modulator illustrated in FIG. 5.
Figure 11:
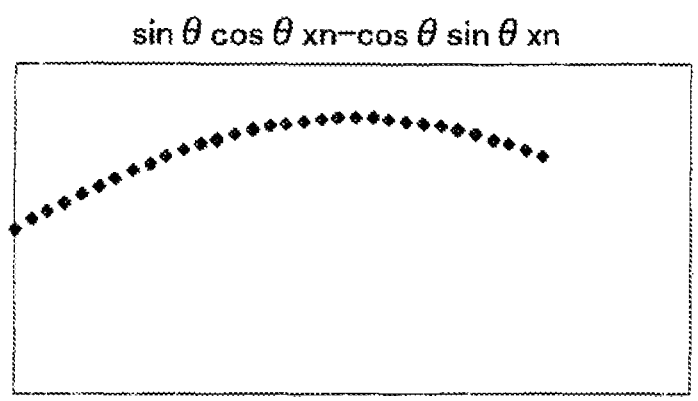
FIG. 11 A diagram illustrating a signal obtained by quadrature frequency conversion by the quadrature modulator illustrated in FIG. 5.
Figure 12:
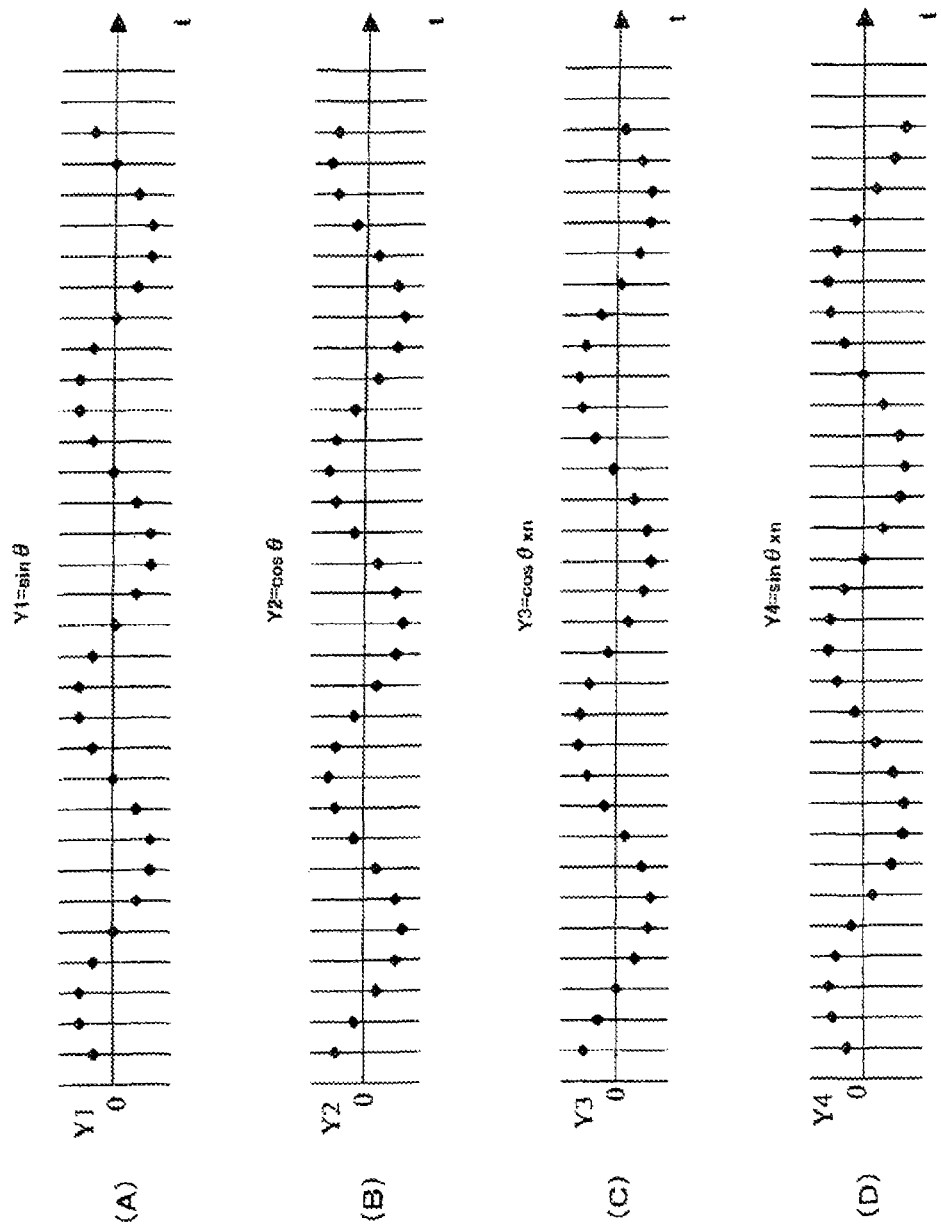
FIG. 12 Diagrams illustrating timing charts for the specific structure of the signal processing apparatus illustrated in FIG. 5.
Figure 2:
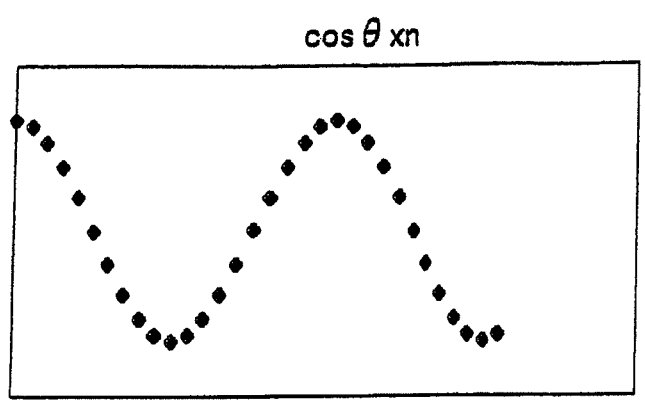
FIG. 2 A diagram illustrating a frequency waveform of a Coriolis flowmeter of which a driving frequency is 100 Hz and a frequency waveform of a Coriolis flowmeter of which a driving frequency is 1,000 Hz in the signal processing apparatus illustrated in FIG. 1.

FIG. 1 illustrates a principle of a signal processing method and apparatus according to the present invention. FIG. 2 illustrates a frequency waveform of a Coriolis flowmeter of which a driving frequency is 100 Hz and a frequency waveform of a Coriolis flowmeter of which a driving frequency is 1,000 Hz. FIG. 3 illustrates a frequency waveform in a case where the driving frequency of the Coriolis flowmeter of which the driving frequency is 100 Hz is divided. FIG. 4 illustrates a frequency waveform in a case where the driving frequency of the Coriolis flowmeter of which the driving frequency is 100 Hz is shifted. FIG. 5 is a specific structural diagram illustrating the signal processing apparatus illustrated in FIG. 1. FIG. 6 is a diagram illustrating a detection signal of a vibration velocity which is generated on a left side of measurement tubes and output from a low-pass filter illustrated in FIG. 5. FIG. 7 illustrates a signal obtained as a digital signal by sampling, at arbitrary constant intervals, the signal illustrated in FIG. 6, which is output from an A/D converter illustrated in FIG. 5. FIG. 8 illustrates a transmission frequency signal (θXn) output from a transmitter illustrated in FIG. 5. FIG. 9 illustrates a 90-degree shift signal of an output signal (cos θ) which is output from the A/D converter and generated in an inner portion of a quadrature modulator illustrated in FIG. 5. FIG. 10 illustrates a 90-degree shift signal of an output signal (cos θXn) which is output from the transmitter and generated in the inner portion of the quadrature modulator illustrated in FIG. 5. FIG. 11 illustrates a signal obtained by quadrature frequency conversion by the quadrature modulator illustrated in FIG. 5. FIG. 12 are diagrams illustrating timing charts for the specific structure of the signal processing apparatus illustrated in FIG. 5. FIG. 13 are diagrams illustrating timing charts for the specific structure of the signal processing apparatus illustrated in FIG. 5.

FIG. 1 is a diagram illustrating the principle of the signal processing method and apparatus according to the present invention.

Figure 28:
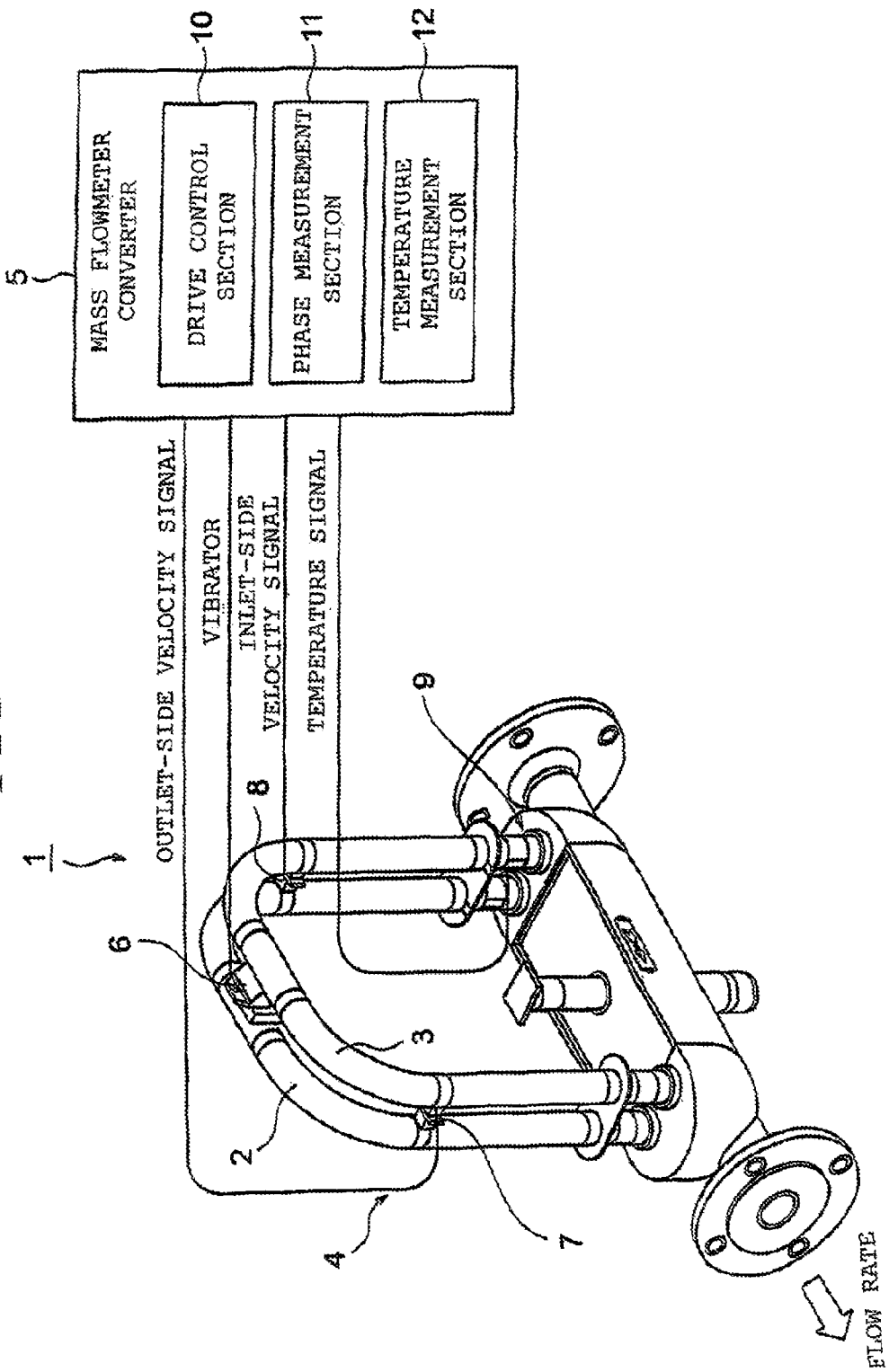
FIG. 28 A structural diagram illustrating a general Coriolis flowmeter to which the present invention is applied.
Figure 29:
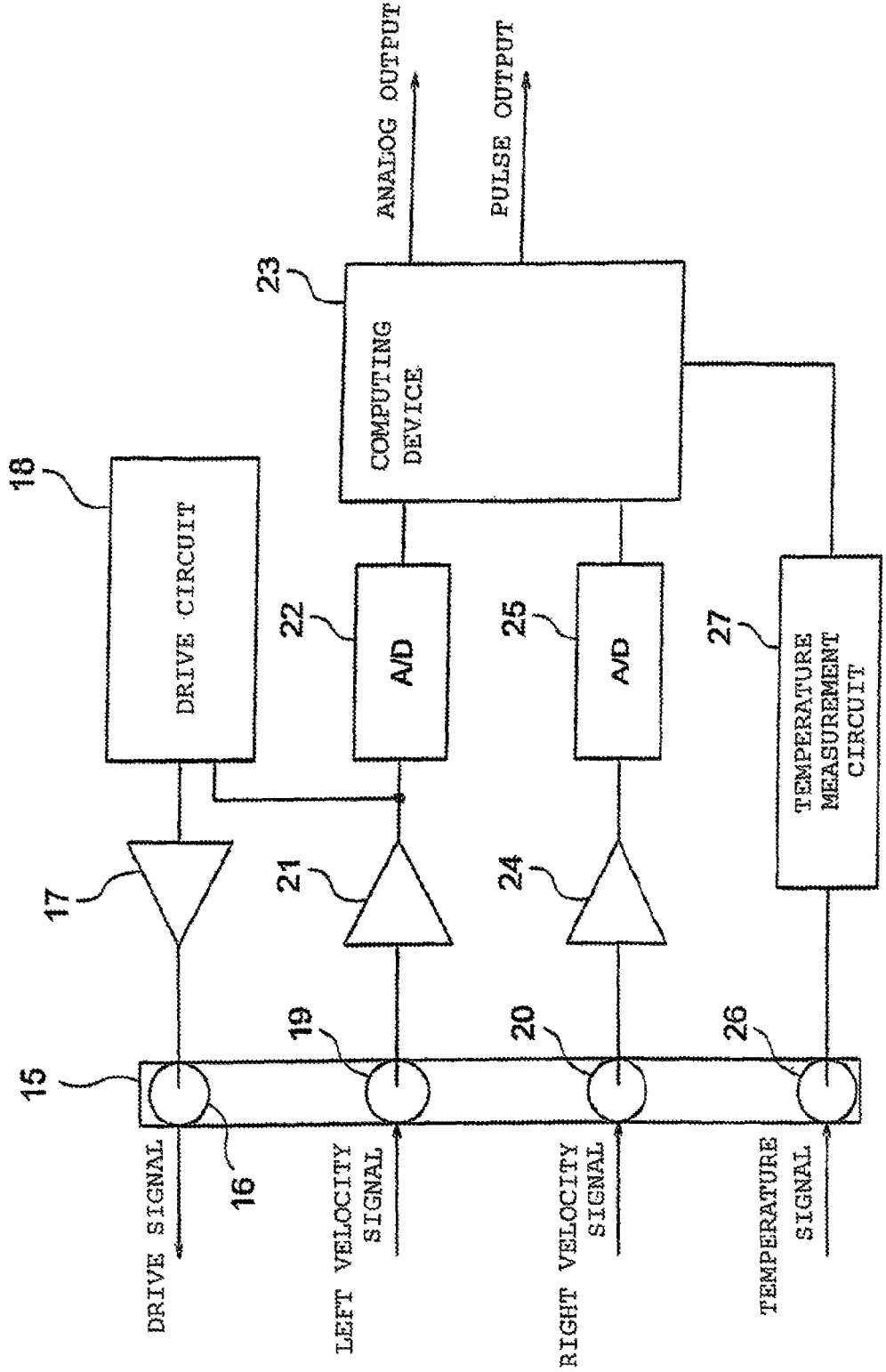
FIG. 29 A block structural diagram illustrating a Coriolis flowmeter converter of the Coriolis flowmeter illustrated in FIG. 28.
Figure 30:
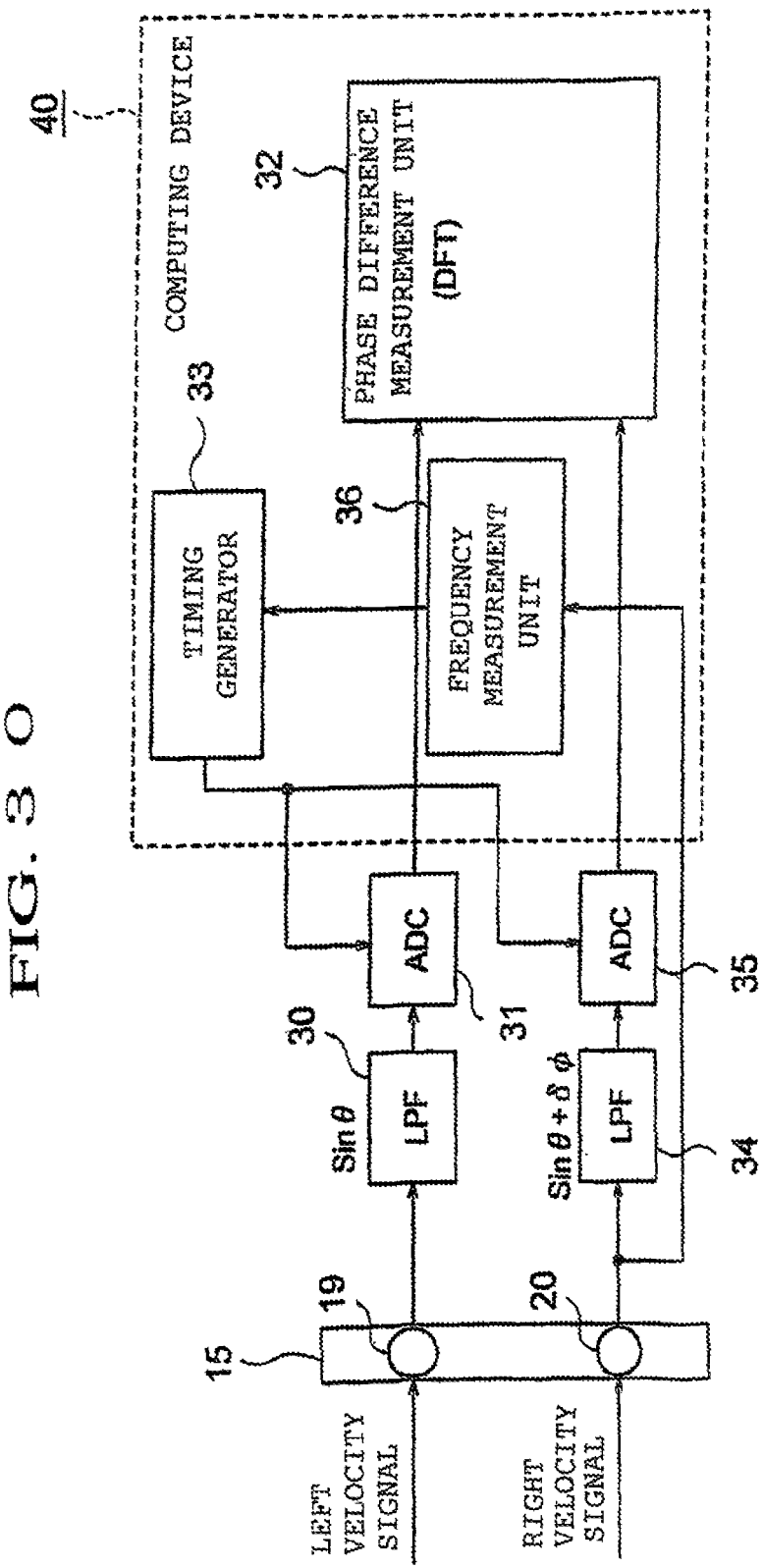
FIG. 30 A block diagram illustrating a phase measurement method using Fourier transform for the Coriolis flowmeter converter illustrated in FIG. 29.
Figure 31:
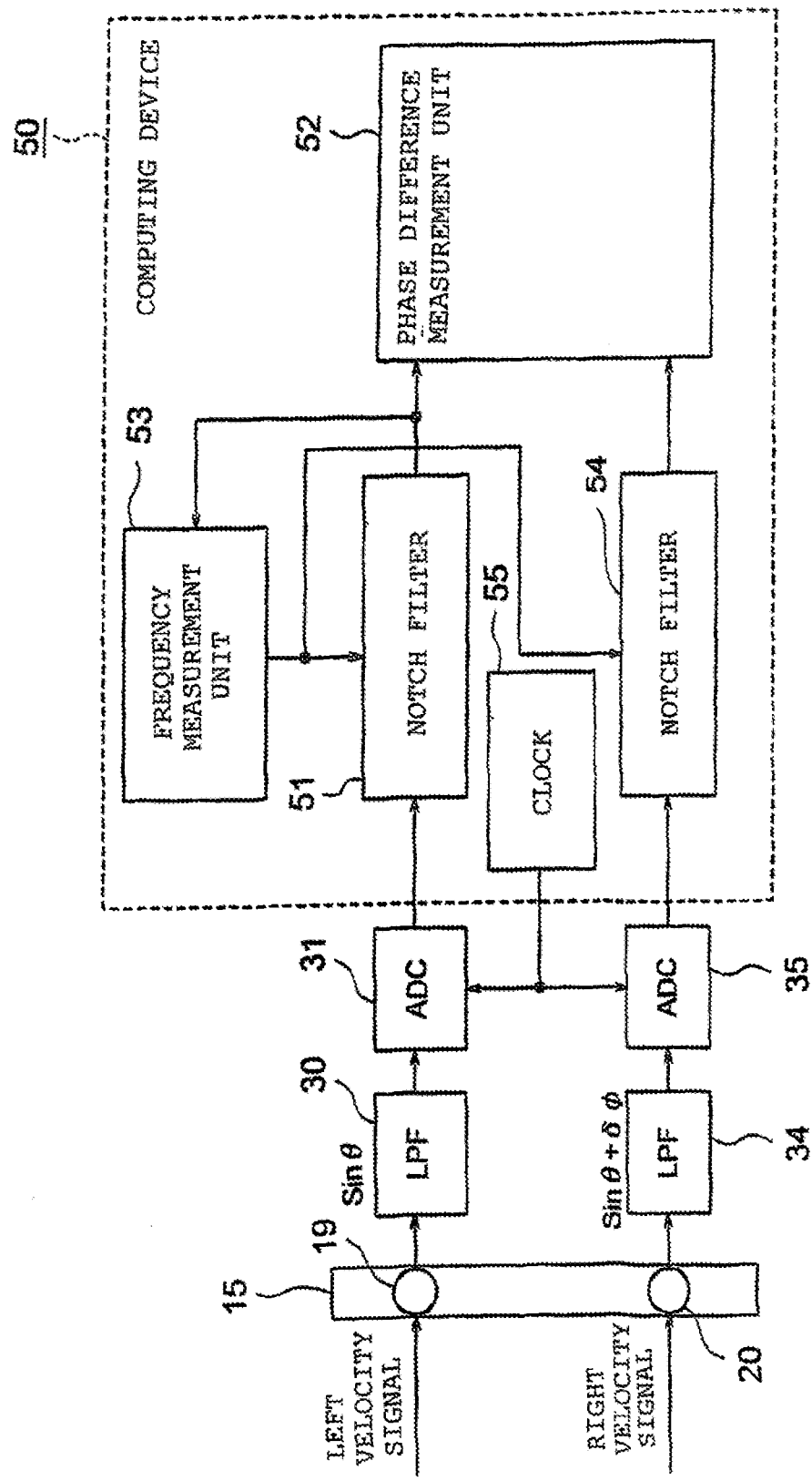
FIG. 31 A block diagram illustrating a phase measurement method using notch filters for the Coriolis flowmeter converter illustrated in FIG. 29.
Figure 32:
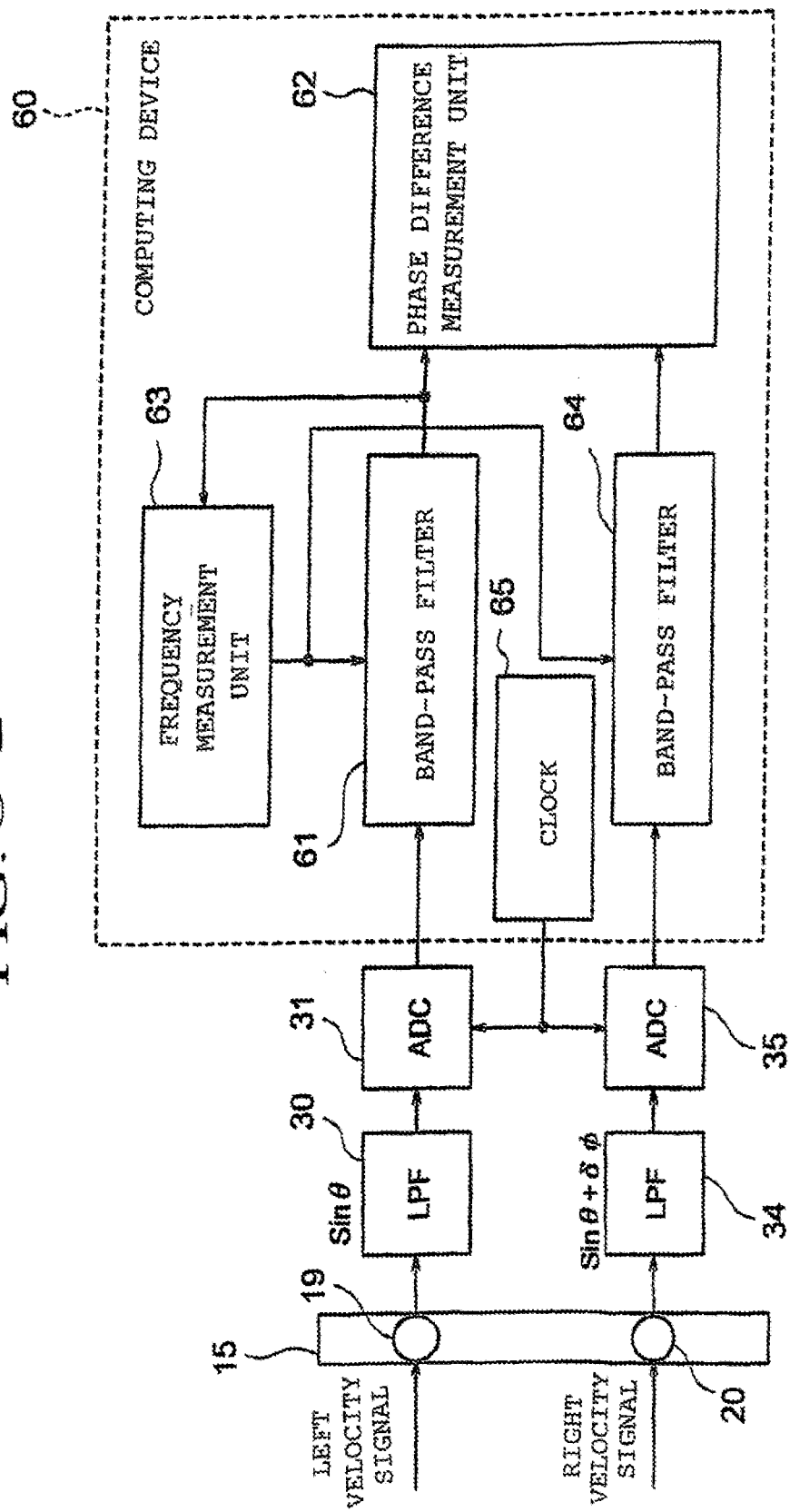
FIG. 32 A block diagram illustrating a phase measurement method using band-pass filters for the Coriolis flowmeter converter illustrated in FIG. 29.

In FIG. 1, when measurement tubes 2 and 3 are vibrated by a vibrator 6, vibration velocities generated in the measurement tubes 2 and 3 are detected by a vibration velocity sensor 80. The detected vibration velocities are computed and processed by a vibration velocity signal computing device 90. The vibration velocity sensor 80 corresponds to the left velocity sensor 7 and the right velocity sensor 8 of FIG. 28.

The vibration velocity signal computing device 90 includes a quadrature modulator 92, a transmitter 94, and a phase measurement unit 96.

The quadrature modulator 92 performs quadrature modulation on the vibration velocities which are generated in the measurement tubes 2 and 3 and detected by the vibration velocity sensor 80 when the measurement tubes 2 and 3 are vibrated by the vibrator 6. A signal from the transmitter 94 is input to the quadrature modulator 92.

Then, signals obtained by quadrature modulation by the quadrature modulator 92 are input to the phase measurement section 96 provided in a subsequent stage of the quadrature modulator 92. The phase measurement section 96 performs A/D conversion on the velocity signals from the vibration velocity sensor 80, to thereby perform digital conversion processing, and then obtains a phase difference therebetween.

According to the signal processing method and apparatus illustrated in FIG. 1, the input signal is subjected to 1/N quadrature frequency conversion and the phase measurement is performed after the frequency conversion, and hence an input frequency band is reduced to 1/N and stable phase measurement may be performed.

As described above, according to the present invention, the phase and velocity signal input from the sensor is converted into the 1/N (N is arbitrary number) frequency by frequency conversion and the phase difference after conversion is measured. Therefore, the filter having the same band is always used to realize the present invention. Even when the frequency of the phase and velocity signal is changed by a change in density or temperature of the fluid to be measured, the flow rate may be measured without almost affecting calculation precision or computing interval.

For example, in the Coriolis flowmeter of which the driving frequency is 100 Hz as illustrated in FIG. 2, when a filter frequency band is set to a range of 95 Hz to 105 Hz, it is likely to shift the driving frequency outside the filter frequency band by the change in density or temperature. Therefore, filter tables for frequency bands around the filter frequency band, for example, a table for a range of 85 Hz to 95 Hz and a table for a range of 105 Hz to 115 Hz are required. When the filter frequency band is widened, the number of tables is reduced. However, a measurement waveform becomes a noisy phase and velocity signal, and hence measurement precision is significantly degraded.

When a phase and velocity signal of the Coriolis flowmeter of which the driving frequency is 1,000 Hz is to be measured, it is necessary to change a sampling rate and a filter table, and hence the calculation precision or the computing interval changes.

In the Coriolis flowmeter of which the driving frequency is 100 Hz in signal processing according to the present invention, as illustrated in FIG. 3, for example, when a value of N is set to 4 in a case where a frequency of a phase and velocity signal input from the sensor is 100 Hz, the frequency is converted into 100/4 Hz, that is, 25 Hz. After the frequency conversion, the phase and velocity signal is filtered and then phase calculation is performed.

In a case where the used filter band is a band of approximately 20 Hz to 30 Hz, even when the driving frequency is changed by the change in density or temperature, the same filter table may be always used outside a band of 80 Hz to 120 Hz. Therefore, the measurement may be always made at stable calculation precision and computing interval.

Further, in the Coriolis flowmeter of which the driving frequency is 1,000 Hz, when the value of N is set to 40, the flow rate may be measured based on completely the same filter band as in the Coriolis flowmeter of which the driving frequency is 100 Hz.

Further, in the present invention, as illustrated in FIG. 4, the method of performing the 1/N conversion on the phase and velocity signal includes a method of frequency shifting the input frequency without being divided. In the case of the Coriolis flowmeter as illustrated in FIG. 4, the input frequency is frequency shifted without being divided, and hence there is a feature that the flow rate may be calculated without loss of a filtering effect.

For example, when the input signal is subjected to 1/N frequency division as in the case of the Coriolis flowmeter illustrated in FIG. 3, a noise component is also subjected to 1/N frequency division. Therefore, even when a filtering band is narrowed, the effect cannot be much expected.

Thus, when the phase and velocity signal is subjected to 1/N conversion by frequency shifting as in the case of the Coriolis flowmeter illustrated in FIG. 4, the noise component is simultaneously shifted in frequency, but the filter band may be reduced to 1/N, and hence very effective filtering may be achieved as compared with before frequency shifting.

FIG. 5 illustrates the specific structure of the signal processing apparatus illustrated in FIG. 1.

In FIG. 5, a left pick-off (LPO) 7 (corresponding to left velocity sensor 7) is connected to a low-pass filter 30. That is, during vibration using the vibrator 6, when a detection signal of a vibration velocity (outlet-side velocity signal) which is generated on the left side of the measurement tubes 2 and 3 is detected by the left pick-off 7, the detection signal of the vibration velocity (outlet-side velocity signal) is input to the low-pass filter 30.

The low-pass filter 30 is a circuit for extracting, through a frequency filter, only a low-frequency left velocity signal (outlet-side velocity signal) from the left velocity signal (outlet-side velocity signal) output from the left velocity sensor 7 detecting the vibration velocity generated on the left side of the measurement tubes 2 and 3 in the case where the measurement tubes 2 and 3 are vibrated by the vibrator 6.

The low-pass filter 30 is connected to an A/D converter 31. The A/D converter 31 converts the left velocity signal (outlet-side velocity signal) which is the analog signal output from the low-pass filter 30 into a digital signal. The left velocity signal (outlet-side velocity signal) obtained as the digital signal by conversion by the A/D converter 31 is input to a signal processing apparatus 100.

On the other hand, a right pick-off (RPO) 8 (corresponding to right velocity sensor 8) is connected to a low-pass filter 34. That is, during vibration using the vibrator 6, when a detection signal of a vibration velocity (inlet-side velocity signal) which is generated on the right side of the measurement tubes 2 and 3 is detected by the right pick-off 8, the detection signal of the vibration velocity (inlet-side velocity signal) is input to the low-pass filter 34.

The low-pass filter 34 is a circuit for extracting, through a frequency filter, only a low-frequency right velocity signal (inlet-side velocity signal) from the right velocity signal (inlet-side velocity signal) output from the right velocity sensor 8 detecting the vibration velocity generated on the right side of the measurement tubes 2 and 3 in the case where the measurement tubes 2 and 3 are vibrated by the vibrator 6.

The low-pass filter 34 is connected to an A/D converter 35. The A/D converter 35 converts the right velocity signal (inlet-side velocity signal) which is the analog signal output from the low-pass filter 34 into a digital signal.

Further, the signal processing apparatus 100 is connected to the A/D converter 35. The signal processing apparatus 100 performs 1/N quadrature frequency conversion on each of the right velocity signal (inlet-side velocity signal) and the left velocity signal (outlet-side velocity signal) and performs the phase measurement after the frequency conversion, so as to reduce the input frequency band to 1/N and realize stable phase measurement.

In the signal processing apparatus 100, the signal from the A/D converter 31 is connected to a quadrature modulator 110.

The quadrature modulator 110 performs 1/N quadrature frequency conversion on the left velocity signal (outlet-side velocity signal).

Further, the signal from the A/D converter 31 is connected to a frequency measurement unit 120. The frequency measurement unit 120 measures a frequency of the left velocity signal (outlet-side velocity signal) obtained by converting, into a digital signal, by the A/D converter 31, the left velocity signal (outlet-side velocity signal) output from the left velocity sensor 7 detecting the vibration velocity generated on the left side of the measurement tubes 2 and 3 in the case where the measurement tubes 2 and 3 are vibrated by the vibrator 6.

Further, the signal from the A/D converter 35 is connected to a quadrature modulator 130. The quadrature modulator 130 performs 1/N quadrature frequency conversion on the right velocity signal (inlet-side velocity signal).

A frequency measurement value measured by the frequency measurement unit 120 is output to a transmitter 140. The transmitter 140 transmits a predetermined frequency signal based on the frequency measurement value output from the frequency measurement unit 120.

The output signal from the transmitter 140 is input to the quadrature modulator 110 and the quadrature modulator 130.

A carrier frequency is obtained through the frequency measurement unit 120, the transmitter 140, and the quadrature modulator 110. The input frequency of the left velocity signal (outlet-side velocity signal) input from the A/D converter 31 and the output frequency output from the transmitter 140 are modulated by the quadrature modulators 110. A result obtained by modulation, that is, one of a sum of or difference between the frequencies of both the input signals based on the addition theorem is used for frequency shifting. The output frequency of the transmitter 140 is controlled such that the modulation frequency becomes 1/N of the input frequency of the input left velocity signal (outlet-side velocity signal).

When the transmitter 140 is controlled as described above, as in the case of the quadrature modulator 110, also in the quadrature modulator 130, the frequency obtained after performing the frequency conversion is controlled to become 1/N of the input frequency of the right velocity signal (inlet-side velocity signal) input from the A/D converter 35, based on the output frequency output from the transmitter 140.

A phase difference measurement unit 150 is connected to the quadrature modulator 110 and the quadrature modulator 130. The phase difference measurement unit 150 performs phase measurement based on an output frequency signal corresponding to 1/N of the input frequency of the left velocity signal (outlet-side velocity signal) which is input from the A/D converter 31 and output from the quadrature modulator 110 and an output frequency signal corresponding to 1/N of the input frequency of the right velocity signal (inlet-side velocity signal) which is input from the A/D converter 35 and output from the quadrature modulator 130.

When such a structure is employed, according to this embodiment, the input frequencies (left velocity signal and right velocity signal) are converted into low frequency bands (1/N of the frequencies). Therefore, the input frequency bands (left velocity signal and right velocity signal) become 1/N and the number of filter tables is significantly reduced. In addition, the phase measurement processing may be more effectively performed.

A clock signal is input from a clock 160 to the A/D converter 31 and the A/D converter 35. The clock 160 synchronizes the outputs of the A/D converter 31 and the A/D converter 35, and synchronizes the digital signal of the left velocity signal output from the A/D converter 31 and the digital signal of the right velocity signal output from the A/D converter 35.

The quadrature modulator 110, the frequency measurement unit 120, the quadrature modulator 130, the transmitter 140, the phase difference measurement unit 150, and the clock 150 are included in the signal processing apparatus 100.

Next, a specific computing method of phase difference measurement computation in the signal processing apparatus 100 illustrated in FIG. 5 is described.

When the measurement tubes 2 and 3 are vibrated by the vibrator 6 of a Coriolis flowmeter 1, the output signals (left velocity signal and right velocity signal) from the vibration velocity sensor 80 (left pick-off 7 and right pick-off 8) provided in the measurement tubes 2 and 3 are obtained as input signals of the LPO and the RPO as illustrated in FIG. 2.

In this case, the input signals of the LPO and the RPO are defined as follows ($\delta\phi$: phase difference between LPO and RPO).

[Expression 1]

$$\text{Right pick-off: } \sin(\theta) \qquad (1)$$

[Expression 2]

$$\text{Left pick-off: } \sin(\theta + \delta\phi) \qquad (2)$$

The output signals (left velocity signal LPO and right velocity signal RPO) from the two sensors (left pick-off 7 and the right pick-off 8) are converted from the analog signals into the digital signals by the A/D converters 31 and 35 through the low-pass filters 30 and 34 provided in the converter of the Coriolis flowmeter 1, respectively, and then transferred to the signal processing apparatus 100.

As described above, the signal processing apparatus 100 is divided into four blocks including the quadrature modulators 110 and 130, the frequency measurement unit 120, the transmitter 140, and the phase difference measurement unit 150. A phase difference between the output signal LPO from the left pick-off 7 and the output signal RPO from the right pick-off 8 is computed, and then converted into a flow rate signal based on the frequency signal output from the frequency measurement unit 120 and temperature data detected by a temperature sensor 9.

The detection signal of the vibration velocity (outlet-side velocity signal) generated on the left side of the measurement tubes 2 and 3, which is detected by the left pick-off 7, is input to the low-pass filter 30 illustrated in FIG. 5. The low-pass filter 30 outputs a sine signal ($\sin\theta$) as illustrated in FIG. 6, from which a harmonic noise is removed to eliminate the influence of aliasing in A/D conversion.

The sine signal ($\sin\theta$) output from the low-pass filter 30 as illustrated in FIG. 6 is sampled for digital signal conversion at an arbitrary constant interval by the A/D converter 31 to obtain a sampling signal ($\sin\theta$) as illustrated in FIG. 7, and then output from the A/D converter 31.

The signal ($\sin\theta$) as illustrated in FIG. 7, which is output from the low-pass filter 30 and sampled for digital signal conversion by the A/D converter 31, is input to the quadrature modulator 110 and the frequency measurement unit 120 of the signal processing apparatus 100 illustrated in FIG. 5. Further, a transmitter output signal output from the transmitter 140 is also input to the quadrature modulator 110.

When the measurement value of the output signal frequency output from the frequency measurement section 120 is input to the transmitter 140, the transmission frequency signal ($\theta Xn$) of the transmitter 140 is transmitted at a desired frequency based on the measurement value of the output signal frequency, and a cosine signal ($\cos\theta Xn$) as illustrated in FIG. 8 is output at the same transmission output rate as the sampling interval of the input signal in the A/D converter 31.

When the signal (sin θ) as illustrated in FIG. 7, which is obtained as the digital signal by sampling by the A/D converter 31, is input to the quadrature modulator 110, the input signal (sin θ) from the A/D converter 31 is subjected to 90-degree shifting in the inner portion of the quadrature modulator 110 to generate a signal (cos θ) as illustrated in FIG. 9. When the signal (cos θXn) as illustrated in FIG. 8, which is output from the transmitter 140, is input to the quadrature modulator 110, the input signal (cos θXn) from the transmitter 140 is subjected to 90-degree shifting in the inner portion of the quadrature modulator 110 to generate a signal (sin θXn) as illustrated in FIG. 10.

In the quadrature modulator 110, quadrature frequency conversion is performed for modulation shifting based on a 0-degree signal and 90-degree signal of the input signal (sin θ) from the A/D converter 31 and a 0-degree signal and 90-degree signal of the input signal (cos θXn) from the transmitter 140, so as to generate a 1/N-signal (sin θ cos θXn−cos θ sin θXn) of the input signal (sin θ) from the A/D converter 31 as illustrated in FIG. 11. The generated signal is output from the quadrature modulator 110 of the signal processing apparatus 100 illustrated in FIG. 5.

The phase difference between the output signals (left velocity signal and right velocity signal) from the vibration velocity sensor 80 (left pick-off 7 and right pick-off 8) provided in the measurement tubes 2 and 3 in the case where the measurement tubes 2 and 3 are vibrated by the vibrator 6 of the Coriolis flowmeter 1 is computed by the four blocks including the quadrature modulators 110 and 130, the transmitter 140, the phase difference measurement unit 150, and the frequency measurement unit 120, included in the signal processing apparatus 100 illustrated in FIG. 5. Then, the computed phase difference is converted into the flow rate signal based on the frequency signal output from the frequency measurement unit 120 and the temperature data detected by the temperature sensor 9.

Next, an operation of the signal processing apparatus 100 illustrated in FIG. 5 is described with reference to time charts illustrated in FIG. 12 and FIG. 13.

First, in the low-pass filter 30 illustrated in FIG. 5, when a harmonic noise is removed to eliminate the influence of aliasing in A/D conversion, a sine signal (sin θ) as illustrated in FIG. 6 is output.

When the sine signal (sin θ) illustrated in FIG. 6 is output, the sine signal (sin θ) illustrated in FIG. 6 is input to the A/D converter 31. Then, the signal is sampled for digital signal conversion at an arbitrary constant interval by the A/D converter 31 to obtain a sampling signal (Y1=sin θ) as illustrated in FIG. 12(A) and output from the A/D converter 31.

The sampling signal (sin θ) illustrated in FIG. 12(A), which is output from the A/D converter 31, is input to the quadrature modulator 110 and the frequency measurement section 120 of the signal processing apparatus 100 illustrated in FIG. 5.

The frequency measurement section 120 of the signal processing apparatus 100 measures the frequency of the left velocity signal (outlet-side velocity signal) which is obtained as the digital signal by conversion by the A/D converter 31.

When the left velocity signal (outlet-side velocity signal) which is obtained as the digital signal by conversion by the A/D converter 31 is input to the quadrature modulator 110 of the signal processing apparatus 100 illustrated in FIG. 5, the input signal (sin θ) from the A/D converter 31 is subjected to 90-degree shifting in the inner portion to generate a signal (cos θ) as illustrated in FIG. 12(B).

A frequency signal measured based on the digital signal output from the A/D converter 31 is output from the frequency measurement section 120 of the signal processing apparatus 100.

A measurement value of the output signal frequency output from the frequency measurement section 120 is input to the transmitter 120. The transmitter 120 to which the output signal frequency is input generates the transmission frequency signal (θXn) satisfying the following expression $$\theta Xn = \theta \times (1 - 1/N)$$

based on the output signal frequency, and outputs a cosine signal (Y3=cos θXn) as illustrated in FIG. 12(C) at the same transmission output rate as the sampling interval of the input signal in the A/D converter 31.

The cosine signal (Y3=cos θXn) as illustrated in FIG. 12(C), which is output from the transmitter 120, is input to the quadrature modulator 110. When the cosine signal (Y3=cos θXn) as illustrated in FIG. 12(C) is input to the quadrature modulator 110, the cosine signal (Y3=cos θXn) as illustrated in FIG. 12(C), which is input from the transmitter 140, is subjected to 90-degree shifting to generate a sine signal (Y4=sin θXn) as illustrated in FIG. 12(D).

In the quadrature modulator 110, quadrature frequency conversion is performed for modulation shifting based on the 0-degree signal and 90-degree signal of the input signal (sin θ) from the A/D converter 31 and the 0-degree signal and 90-degree signal of the input signal (cos θXn) from the transmitter 140, so as to generate, as the 1/N-signal (sin θ cos θXn−cos θ sin θXn) of the input signal (sin θ) from the A/D converter 31, a sine signal (Y5=sin θ cos θXn−cos θ sin θXn=sin(θ/N)) as illustrated in FIG. 13(E). The sine signal (Y5=sin θ cos θXn−cos θ sin θXn=sin(θ/N)) as illustrated in FIG. 13(E), which is generated by the quadrature modulator 110 is output from the quadrature modulator 110 of the signal processing apparatus 100 illustrated in FIG. 5 and input to the phase difference measurement unit 150.

Further, in the low-pass filter 34 illustrated in FIG. 5, when a harmonic noise is removed to eliminate the influence of aliasing in A/D conversion, a sine signal (sin(θ+δφ)) is output.

When the sine signal (sin(θ+δφ)) is output from the low-pass filter 34, the sine signal (sin(θ+δφ)) is input to the A/D converter 35. Then, the signal is sampled for digital signal conversion at an arbitrary constant interval by the A/D converter 35.

The sampling signal (sin(θ+δφ)) output from the A/D converter 35 is subjected to 90-degree shifting in the inner portion of the quadrature modulator 130 to generate a cosine signal (cos(θ+δφ)).

The cosine signal (Y3=cos θXn) as illustrated in FIG. 12(C), which is output from the transmitter 120, is input to the quadrature modulator 130. When the cosine signal (Y3=cos θXn) as illustrated in FIG. 12(C) is input to the quadrature modulator 130, the cosine signal (Y3=cos θXn) as illustrated in FIG. 12(C), which is input from the transmitter 140, is subjected to 90-degree shifting to generate a sine signal (Y4=sin θXn) as illustrated in FIG. 12(D).

In the quadrature modulator 130, quadrature frequency conversion is performed for modulation shifting based on the 0-degree signal and 90-degree signal of the input signal (sin (θ+δφ)) from the A/D converter 35 and the 0-degree signal and 90-degree signal of the input signal (cos θXn) from the transmitter 140, so as to generate, as the 1/N-signal of the input signal (sin θ) from the A/D converter 35, a sine signal (Y6=(sin(θ+δφ-θXn)=sin(θ/N+δφ)) as illustrated in FIG. 13(F). The sine signal (Y6=(sin(θ+δφ-θXn)=sin(θ/N+δφ)) as illustrated in FIG. 13(F), which is generated by the quadrature modulator 130 is output from the quadrature modulator 130 of the signal processing apparatus 100 illustrated in FIG. 5 and input to the phase difference measurement unit 150.

As described above, both the sine signal (Y5=sin(θ/N)) as illustrated in FIG. 13(E), which is output from the quadrature modulator 110, and the sine signal (Y6=sin(θ/N+δφ)) as illustrated in FIG. 13(F), which is output from the quadrature modulator 130, are input to the phase difference measurement unit 150.

In the phase difference measurement unit 150, a signal (Y7=δφ) illustrated in FIG. 13(G) is output as a phase difference δφ based on the sine signal (Y5=sin(θ/N)) illustrated in FIG. 13(E), which is output from the quadrature modulator 110 and input to the phase difference measurement unit 150, and the sine signal (Y6 sin(θ/N+δφ)) illustrated in FIG. 13(F), which is output from the quadrature modulator 130 and input to the phase difference measurement unit 150.

When the computing interval is synchronized with the sampling time as described above, the real time performance for phase measurement may be improved.

Further, each of the set of vibration velocity signals (sin θ and sin(θ+δφ)) is subjected to the same processing for phase calculation, and hence there is almost no computing error. Therefore, accurate phase calculation may be achieved.

Embodiment 2

Hereinafter, Embodiment 2 of a mode for carrying out the present invention is described with reference to FIGS. 14 and 15.

Figure 14:
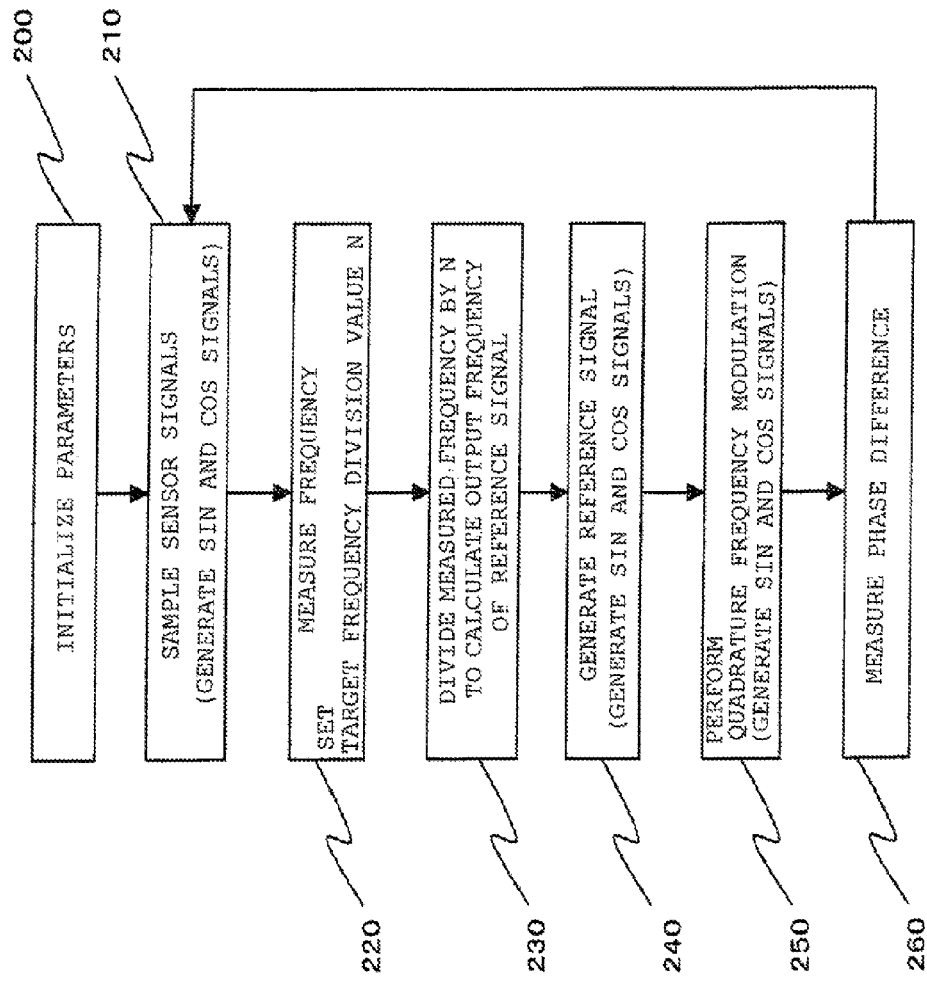
FIG. 14 An operational flow chart for the specific structure of the signal processing apparatus illustrated in FIG. 5.
Figure 15:
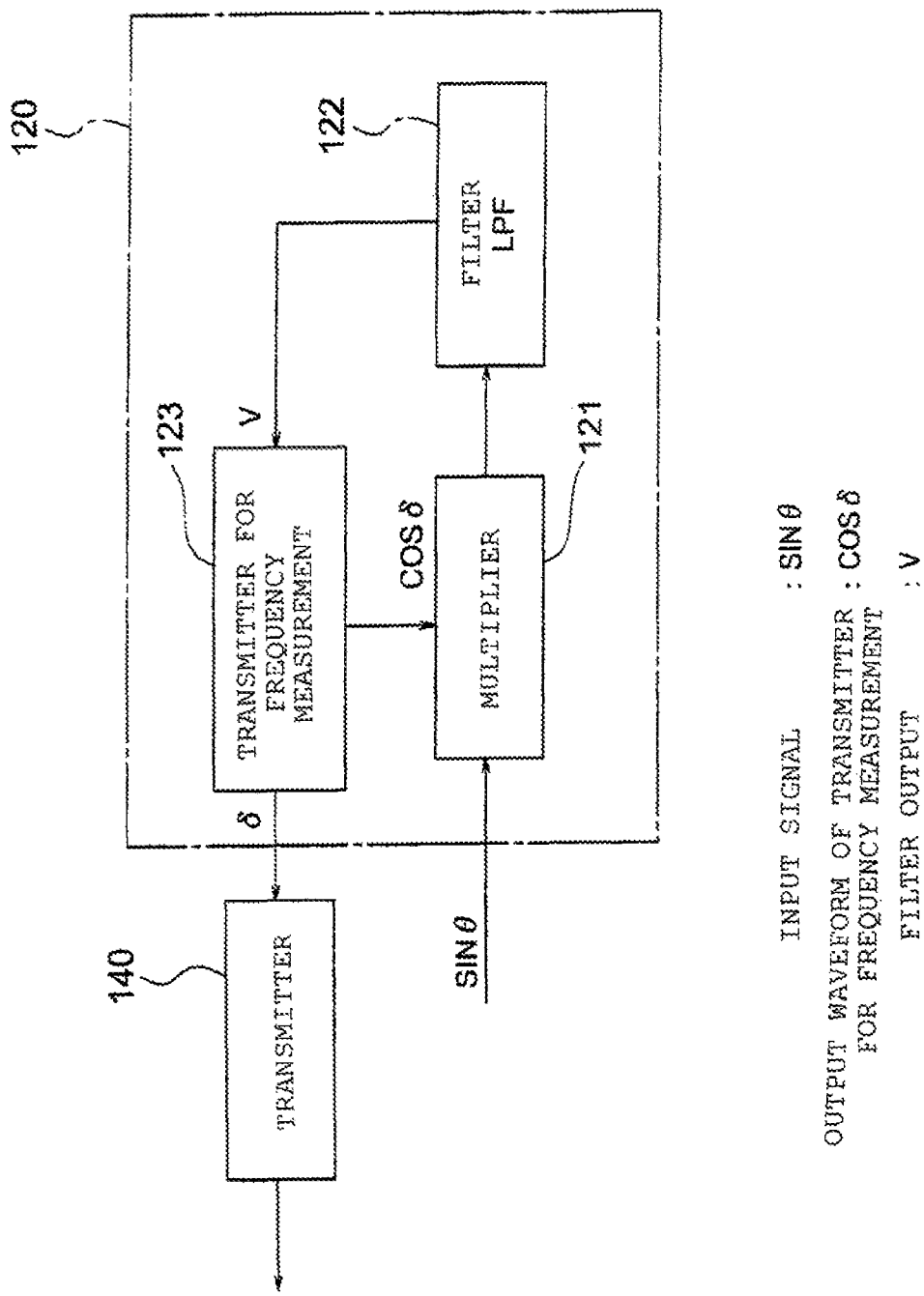
FIG. 15 A block diagram illustrating a frequency measurement unit illustrated in FIG. 5.

FIG. 14 is an operational flowchart for the specific structure of the signal processing apparatus illustrated in FIG. 5 and FIG. 15 is a block diagram illustrating the frequency measurement unit of the signal processing apparatus illustrated in FIG. 5.

FIG. 14 is the flow chart illustrating quadrature frequency modulation and phase measurement in phase difference measurement computation of the vibration velocity signal computing device 90 illustrated in FIG. 1, which is used for the signal processing apparatus 100 illustrated in FIG. 5.

In FIG. 14, in Step 200, parameters of the vibration velocity signal computing device 90 illustrated in FIG. 1 are initialized. When the parameters of the vibration velocity signal computing device 90 are initialized in Step 200, in Step 210, the phase and velocity signals from the two sensors (left pick-off 7 and right pick-off 8) are sampled at arbitrary sampling intervals by the A/D converter 31 and the A/D converter 35 to generate a sine waveform and a cosine waveform, respectively, based on the sampled data.

When the sine waveform and the cosine waveform are generated in Step 210, in Step 220, the frequency of the sampled data is measured by the frequency measurement unit 120 and an N-value is determined based on the measured frequency.

When the N-value is determined in Step 220, in Step 230, the measured frequency is divided by a set target frequency division value "N" to determine a frequency after quadrature frequency conversion.

When the frequency after quadrature frequency conversion is determined in Step 230, in Step 240, a sine reference signal waveform and a cosine reference signal waveform are generated by the reference signal transmitter 140 and the quadrature frequency conversion is performed by the quadrature modulators 110 and 130 based on the reference waveforms. As a result, each frequency-modulated signal has a value equal to 1/N of the input frequency.

When the quadrature frequency conversion is performed in Step 240, in Step 250, the quadrature modulators 110 and 130 send, to the phase difference measurement unit 150, the sine signal and the cosine signal which are generated as the sine waveform and the cosine waveform each having a frequency equal to 1/N of the input frequency by quadrature frequency conversion, based on the reference waveforms, on the signals obtained by sampling the phase and velocity signals at the arbitrary sampling intervals by the A/D converter 31 and the A/D converter 35.

When the sine signal and the cosine signal are sent to the phase difference measurement unit 150 in Step 250, in Step 260, the phase difference measurement unit 150 calculates the phase difference based on the sine signal and the cosine signal which are the phase and velocity signals having the 1/N frequency which are obtained by the frequency modulation and output from the quadrature frequency modulators 110 and 130. The phase and velocity signals obtained by the frequency conversion is used for phase measurement.

(1) Frequency Measurement Unit

In this embodiment, a method using the principle of phase-locked loop (PLL) is used for the frequency measurement method. The PLL is an electronic circuit in which a signal which is equal in frequency to an input alternating current signal and locked in phase therewith is output from another oscillator by feedback control.

Therefore, the PLL is fundamentally a phase-lock circuit and may produce a signal locked in phase with an input signal.

The PLL is an oscillation circuit for feedback-controlling an oscillator in a loop for oscillation so that a phase difference between a reference signal input from an outside and an output from the oscillator in the loop is constant. Therefore, the PLL may be relatively easily constructed using a computing device and may perform high-speed computation.

The frequency measurement unit 120 has the structure as illustrated in FIG. 15.

That is, the A/D converter 31 is connected to a multiplier 121. An output from the A/D converter 31 is a left velocity signal (outlet-side velocity signal) sin θ obtained in a case where a detection signal of a vibration velocity (outlet-side velocity signal) having a phase difference and/or a vibration frequency proportional to a Coriolis force, which is generated on the left side of the pair of measurement tubes 2 and 3 when the measurement tubes 2 and 3 are alternately driven by the vibrator 6, is detected by the left pick-off 7, input to the low-pass filter 30 to extract only a low-frequency left velocity signal (outlet-side velocity signal), and converted into a digital signal.

The multiplier 121 compares the phase of the left velocity signal (outlet-side velocity signal) sin θ which is obtained as the digital signal by conversion by the A/D converter 31 with the phase of an output signal cos δ output from the transmitter 123 for frequency measurement and outputs the signals to the low-pass filter 122.

Therefore, an output end of the multiplier 121 is connected to the low-pass filter 122. The low-pass filter 122 extracts only a low-frequency signal from the output signal output from the multiplier 121 through a frequency filter.

Thus, in the multiplier 121, by the product of the left velocity signal sin θ by the output cos δ of the transmitter for frequency measurement, a sum signal and a difference signal of θ and δ are generated. However, in this case, only a difference component is extracted from the output signal output from the multiplier 121.

The low-pass filter 122 is connected to the transmitter 123 for frequency measurement. The transmitter 123 for frequency measurement generates phase data 5 based on the low-frequency signal output from the low-pass filter 122.

The transmitter 123 for frequency measurement outputs the output signal cos δ to the multiplier 121. In the multiplier 121, the phase of the input data (sin θ) obtained as the digital value by conversion by the A/D converter 31 is compared with the phase of the output signal cos δ and the difference signal and the sum signal thereof are output from the low-pass filter 122. A feedback loop is formed such that output data "V" (frequency computing function V) of only the difference component obtained by filtering by the low-pass filter 122 becomes 0.

When the structure as described above is described mathematically, as in the frequency measurement unit 120 illustrated in FIG. 15, the input signal is expressed by sin θ and the output signal of the transmitter 123 for frequency measurement is expressed by cos δ. When the two waveforms are multiplied by the multiplier 121, the following is obtained.

[Expression 3]

$$\sin\theta \cdot \cos\theta = \frac{1}{2}(\sin(\theta + \delta) + \sin(\theta - \delta)) \quad (3)$$

Input waveform: sin θ

Output waveform of transmitter for frequency measurement: cos δ

When the multiplied value (sin θ·cos δ) is filtered by the low-pass filter 122, a high-frequency component is removed by the low-pass filter 122. Therefore, the frequency computing function V output from the low-pass filter 122 is expressed as follows.

[Expression 4]

$$V = \sin(\theta - \delta) \quad (4)$$

When a value of (θ−δ) in Expression (4) is a sufficiently small value (V≈0), the frequency computing function V may be approximately expressed as follows.

[Expression 5]

$$V = \theta - \delta \approx 0 \quad (5)$$

When an output waveform of the output signal of the transmitter 123 for frequency measurement is controlled so that the frequency computing function V becomes 0, the phase θ of Expression (5) may be obtained.

When Ta indicates a measurement sampling interval, the phase θ before frequency conversion which is obtained by the method as described above is computed using the following Expression (6), Expression (7), and Expression (8), and as a result, a frequency "f" may be obtained.

[Expression 6]

$$\frac{\Delta\theta}{\Delta T} = \omega = 2 \cdot \pi \cdot f \quad (6)$$

ΔT indicates a change in time and is equal to the computing interval (sampling rate).

Therefore, the phase (θ) is expressed as follows.

[Expression 7]

$$\theta = 2 \cdot \pi \cdot f \cdot Ta \quad (7)$$

where

Ta: change in time (sampling interval) (sec.)
f: input frequency (Hz)
θ: change in phase (rad)

[Expression 8]

$$f = \frac{\theta}{2 \cdot \pi \cdot T} \quad (8)$$

T: Sampling interval
f: Input frequency
θ: Input phase

When such calculation is performed by the frequency measurement unit 120, high-speed frequency measurement may be achieved.

(2) Quadrature Frequency Modulator

In FIG. 5, the quadrature frequency modulators 110 and 130 have the same structure and each obtain a frequency difference between two input signals to output a frequency signal. Simultaneously, each of the quadrature frequency modulators generates and outputs a signal orthogonal to the frequency signal.

That is, the detection signal of the vibration velocity (outlet-side velocity signal) generated on the left side of the measurement tubes 2 and 3 vibrated by the vibrator 6 is detected by the left pick-off 7. The detection signal of the vibration velocity (outlet-side velocity signal) detected by the left pick-off 7 is input to the low-pass filter 30.

The analog signal of only the low-frequency left velocity signal (outlet-side velocity signal) is extracted by the low-pass filter 30 from the left velocity signal (outlet-side velocity signal) output from the left velocity sensor 7, converted into the digital signal by the A/D converter 31, and input to the quadrature frequency modulator 110.

In the quadrature frequency modulator 110, the frequency difference is obtained between the left velocity signal (outlet-side velocity signal) which is detected by the left velocity sensor 7, output from the A/D converter 31, and input to the quadrature frequency modulator 110, and the predetermined frequency signal transmitted and output from the transmitter 140 based on the frequency measurement value output from the frequency measurement unit 120. Simultaneously, the signal orthogonal to the frequency signal is generated and output.

Further, the detection signal of the vibration velocity (inlet-side velocity signal) generated on the right side of the measurement tubes 2 and 3 when the measurement tubes 2 and 3 are vibrated by the vibrator 6 is detected by the right pick-off 8. The detection signal of the vibration velocity (inlet-side velocity signal) detected by the right pick-off 8 is input to the low-pass filter 34.

The analog signal of only the low-frequency right velocity signal (inlet-side velocity signal) is extracted by the low-pass filter 34 from the right velocity signal (inlet-side velocity signal) output from the right velocity sensor 7, converted into the digital signal by the A/D converter 35, and input to the quadrature frequency modulator 130.

In the quadrature frequency modulator 130, the frequency difference is obtained between the right velocity signal (inlet-side velocity signal) which is detected by the right velocity sensor 8, output from the A/D converter 35, and input to the quadrature frequency modulator 130, and the predetermined frequency signal transmitted and output from the transmitter 140 based on the frequency measurement value output from the frequency measurement unit 120. Simultaneously, the signal orthogonal to the frequency signal is generated and output.

Assume that the output signal (left velocity signal LPO or right velocity signal RPO) from the vibration velocity sensor (left pick-off 7 or right pick-off 8) detecting the detection signal of the vibration velocity and the signal which is output from the transmitter 140 and input to the quadrature frequency modulator (more specifically, quadrature frequency modulator 110 or 130) are expressed as follows.

[Expression 9]

Vibration velocity sensor signal: $\sin(\theta)$

Transmitter output signal: $\cos(\theta X)$ (9)

Therefore, in the quadrature frequency modulator 110 or 130, 90°-shift signals with respect to the output signal (left velocity signal LPO or right velocity signal RPO) from the vibration velocity sensor (left pick-off 7 or right pick-off 8) and the signal input from the transmitter 140 to the quadrature frequency modulator (more specifically, quadrature frequency modulator 110 or 130) are obtained from Expression 10 and Expression 11.

[Expression 10]

Sensor signal: $\sin(\theta)$

Sensor signal 90°-shift signal: $\cos(\theta)$ (10)

[Expression 11]

Transmitter output signal: $\sin(\theta X)$

Transmitter 94°-shift signal: $\cos(\theta X)$ (11)

Further, frequency differences, that is, $(\theta-\theta X)$ components are calculated based on signals obtained by frequency conversion on the respective signals of Expression (10) and Expression (11) and 90°-shift signals after the frequency conversion.

[Expression 12]

$\sin\theta \cdot \cos\theta x - \cos\theta \cdot \sin\theta x = \sin(\theta-\theta x)$ (12)

[Expression 13]

$\cos\theta \cdot \cos\theta x - \sin\theta \cdot \sin\theta x = \cos(\theta-\theta x)$ (13)

Therefore, in the frequency modulators 110 and 130, IQ signals of frequency differences between the input signal frequencies from the A/D converters 31 and 35 and the output signal frequency from the transmitter 140 are generated and sent as respective quadrature modulation outputs.

(3) Transmitter

The transmitter 140 controls the frequency of the transmitter 140 based on the result 8 obtained by measurement by the frequency measurement unit 120.

That is, in the transmitter 140, the transmitter 140 output $\cos\theta xn$ is determined such that the output frequency of the quadrature modulator 110 becomes 1/N of the frequency $\theta$ of the detection signal of the vibration velocity (outlet-side velocity signal) which is generated on the left side of the measurement tubes 2 and 3, and detected by the left pick-off 7, and input to the frequency modulator 110 in the case where the measurement tubes 2 and 3 are vibrated by the vibrator 6.

The frequency modulator 110 and the frequency modulator 130 have the same structure. Therefore, as in the case of the frequency output from the frequency modulator 110, with respect to the frequency output from the frequency modulator 130, the output frequency of the quadrature modulator 130 becomes 1/N of the frequency $\theta$ of the detection signal of the vibration velocity (inlet-side velocity signal) which is generated on the right side of the measurement tubes 2 and 3, and detected by the right pick-off 8, and input to the frequency modulator 130 in the case where the measurement tubes 2 and 3 are vibrated by the vibrator 6.

The frequency modulator 110 and the frequency modulator 130 each are provided to obtain the difference between the two frequencies input to each of the frequency modulators based on Expression (12) or (13) and to have the condition in which the output frequency becomes 1/N of the left velocity signal frequency or the right velocity signal frequency, and hence the following expression (Expression 14) is held.

[Expression 14]

$$\frac{\theta}{N} = \theta - \theta_X \quad (14)$$

$\theta$: Input signal
$\theta X$: Transmitter output signal
N: Integer

As described above, the transmitter 140 output $\cos\theta X$ is desirably determined to control $\theta X$.

The output of each of the quadrature frequency modulators 110 and 130 becomes 1/N of the input signal. The results output from the quadrature frequency modulators 110 and 130 corresponding to the left pick-off 7 and the right pick-off 8, respectively, are expressed as follows.

[Expression 15]

$$\sin(\theta - \theta_x) = \sin\frac{\theta}{N} \quad (15)$$

$$\cos(\theta - \theta_x) = \cos\frac{\theta}{N}$$

[Expression 16]

$$\sin(\theta - \theta_x + \delta\phi) = \sin\left(\frac{\theta}{N} + \delta\phi\right) \quad (16)$$

$$\cos(\theta - \theta_x + \delta\phi) = \cos\left(\frac{\theta}{N} + \delta\phi\right)$$

The driving frequency of the left velocity sensor 7 and the driving frequency of the right velocity sensor 8 in the Coriolis flowmeter 1 are 1 kHz at maximum. Therefore, if the value of N is set to 32, the frequencies obtained by modulation by the quadrature frequency modulators 110 and 130 and output therefrom are approximately 30 Hz, and hence only a filter having a very low frequency and a narrow band is desirably prepared.

In Expression (15) and Expression (16), as described above, the N-value depends on a flowmeter type. Hereinafter, an example of the use of N is described below.

When the driving frequency of the sensors is set in a range of 50 Hz to 1,600 Hz and the filter frequency band of the converters is set to a range of 10 Hz to 40 Hz, the following table may be determined.

In the set conditions with respect to the N-value and the filter band, it is important to prevent the frequency after quadrature modulation from overlapping with the band of 50 Hz to 60 Hz (commercial frequencies).

| Driving frequency | N-value (frequency division value) | Frequency after quadrature modulation |
|---|---|---|
| 50 Hz-200 Hz | 5 | 10 Hz-40 Hz |
| 100 Hz-400 Hz | 10 | 10 Hz-40 Hz |

-continued

| Driving frequency | N-value (frequency division value) | Frequency after quadrature modulation |
|---|---|---|
| 200 Hz–800 Hz | 20 | 10 Hz–40 Hz |
| 400 Hz–1,600 Hz | 40 | 10 Hz–40 Hz |

When the N-value is selected as described above, the filtering band used for phase measurement is held, and hence filtering may be performed without being affected by the driving frequency (input frequency).

The example of the use of the N-value is specifically described here, but needless to say, the actual use of the N-value depends on the set conditions such as the filter bands used for the adapted sensor and converter.

(4) Phase Measurement Unit

The results output from the quadrature frequency modulators are substituted for calculation into the following relational expression.

[Expression 17]

$$\tan(\alpha - \beta) = \frac{\sin\alpha \cdot \cos\beta - \cos\alpha \cdot \sin\beta}{\cos\alpha \cdot \cos\beta + \sin\alpha \cdot \sin\beta} \quad (17)$$

When the following expression is assumed,

[Expression 18]

$$\alpha = \frac{\theta}{N} + \delta\phi,$$
$$\beta = \frac{\theta}{N} \quad (18)$$

the following expression is obtained.

[Expression 19]

$$\tan\left(\frac{\theta}{N} + \delta\phi - \frac{\theta}{N}\right) = \frac{\sin\left(\frac{\theta}{N} + \delta\phi\right) \cdot \cos\left(\frac{\theta}{N}\right) - \cos\left(\frac{\theta}{N} + \delta\phi\right) \cdot \sin\left(\frac{\theta}{N}\right)}{\cos\left(\frac{\theta}{N} + \delta\phi\right) \cdot \cos\left(\frac{\theta}{N}\right) + \sin\left(\frac{\theta}{N} + \delta\phi\right) \cdot \sin\left(\frac{\theta}{N}\right)} \quad (19)$$
$$= \tan(\delta\phi)$$

Therefore, the phase difference may be obtained.

In another calculation method, the following expressions are used to calculate arc tangents.

[Expression 20]

$$\tan\frac{\theta}{N} = \frac{\sin\frac{\theta}{N}}{\cos\frac{\theta}{N}} \quad (20)$$

[Expression 21]

$$\tan\left(\frac{\theta}{N} + \delta\phi\right) = \frac{\sin\left(\frac{\theta}{N} + \delta\phi\right)}{\cos\left(\frac{\theta}{N} + \delta\phi\right)} \quad (21)$$

When a difference between the arc tangents is obtained, the phase difference may be calculated.

<<Feature of Phase Measurement Method Using Frequency Conversion>>

According to a feature of the phase measurement system in the present invention, the output signals (left velocity signal LPO and right velocity signal RPO) from the vibration velocity sensors (left pick-off 7 and right pick-off 8) may be sampled at the sampling interval unrelated to the frequency of the output signals (left velocity signal LPO and right velocity signal RPO) from the vibration velocity sensors (left pick-off 7 and right pick-off 8) detecting the detection signals of the vibration velocities which are input to the quadrature frequency modulators (more specifically, quadrature frequency modulators 110 and 130). Therefore, the structure may be very simple, the number of filter tables may be significantly reduced, and computation may be achieved with a small error.

There is little limitation on the phase measurement band by the input frequency. Therefore, coupling with sensors having various driving frequencies may be realized and there is an advantage that the system described above may be applied to various types. Further, the computing precision is not affected by the input frequency, and hence high-precision phase measurement may be always achieved.

Embodiment 3

The measurement tubes 2 and 3 including at least one flow tube or a pair of flow tubes, serving as measurement flow tubes, are operated by a driving device using the vibrator 6. The measurement tubes 2 and 3 including the at least one flow tube or the pair of flow tubes are alternately driven by the vibrator to vibrate the flow tubes.

In a Coriolis flowmeter, a phase difference and/or a vibration frequency proportional to a Coriolis force acting on the measurement tubes 2 and 3 including the at least one flow tube or the pair of flow tubes are/is detected by a pair of velocity sensors or a pair of acceleration sensors corresponding to vibration detection sensors including the left pick-off (LPO) 7 and the right pick-off (RPO) 8, which are provided on a right side and a left side of the flow tubes 2 and 3, to thereby obtain a mass flow rate and/or density of a fluid to be measured.

The Coriolis flowmeter includes the frequency measurement unit 120 for measuring a frequency based on an input signal frequency of a digital input signal (outlet-side velocity signal) digital converted by the A/D converter 31 and output from at least one sensor (for example, left pick-off 7), of two flow rate signals obtained by conversion, into digital signals, on two analog input signals of the phase difference and/or the vibration frequency proportional to the Coriolis force acting on the measurement tubes 2 and 3 including the pair of flow tubes, which are detected by the velocity sensors or the acceleration sensors.

Further, the transmitter 140 is provided to generate, transmit, and output a frequency signal of θ(1−1/N) of the digital frequency signal output from the frequency measurement unit 120.

Further, each of velocity sensor signals (for example, input signal (outlet-side velocity signal) input from left pick-off 7) from the pair of vibration detection sensors (left pick-off 7 and right pick-off 8) is converted into a digital signal by the two A/D converters 31 and 35. The pair of quadrature modulators 110 and 130 are provided for performing frequency quadrature modulation by performing addition (or subtraction) on the frequency θ of the input signal based on the output frequency θXn output from the transmitter 140.

The phase difference measurement section 150 is provided to measure the phase difference between the frequency signals sin θ and sin(θ+δφ) obtained as the constant frequency signals by conversion by the pair of quadrature frequency modulators 110 and 130.

The signal processing apparatus 100 is provided to obtain the phase difference based on the output frequency signal corresponding to 1/N of the input frequency of the left velocity signal (outlet-side velocity signal) which is output from the quadrature modulator 110, that is, input from the A/D converter 31 and the output frequency signal corresponding to 1/N of the input frequency of the right velocity signal (inlet-side velocity signal) which is output from the quadrature modulator 130, that is, input from the A/D converter 35, to thereby serve as the Coriolis flowmeter.

It is an object of the present invention to be able to always perform measurement with constant precision, to realize phase measurement with high filtering performance, and to be able to reduce a computing processing amount to an extremely small amount. Even when a temperature of a fluid to be measured changes, even when air bubbles are mixed into the fluid to be measured, or even when the fluid to be measured rapidly changes from a gas to a liquid, the object may be realized.

Embodiment 4

Hereinafter, Embodiment 4 of a mode for carrying out the present invention is described with reference to FIGS. 16 and 17.

Figure 16:
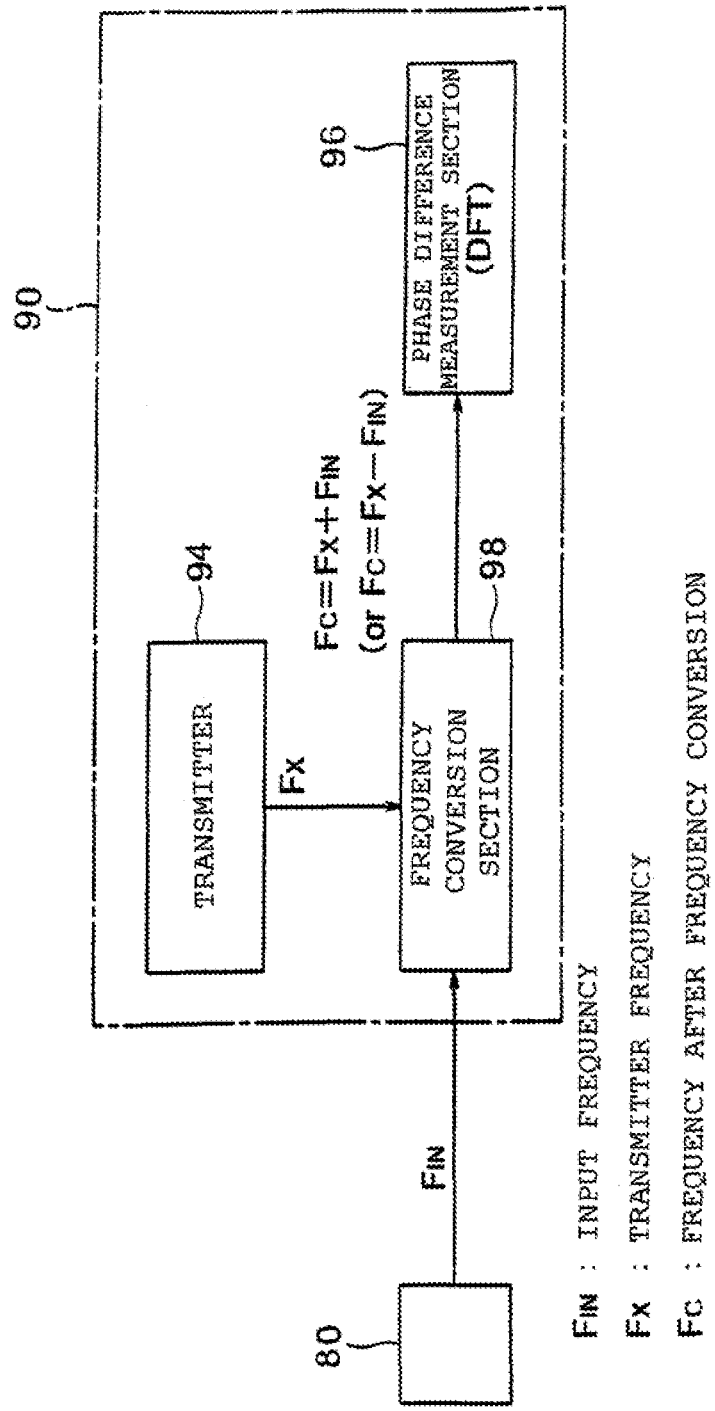
FIG. 16 A block diagram illustrating a principle of a signal processing apparatus according to the present invention in Embodiment 4.

FIG. 16 is a block diagram illustrating a principle of a signal processing method and apparatus according to the present invention. FIG. 17 is a detailed circuit block diagram illustrating a specific structure of the signal processing apparatus illustrated in FIG. 16.

FIG. 16 is the block diagram illustrating the principle of the signal processing method and apparatus according to the present invention.

In FIG. 16, when measurement tubes 2 and 3 are vibrated by a vibrator (for example, electromagnetic oscillator) 6, vibration velocities generated in the measurement tubes 2 and 3 are detected by a vibration detection sensor (for example, velocity sensor or acceleration sensor) 80. The detected vibration velocities are computed and processed by a vibration velocity signal computing device 90. The vibration detection sensor 80 corresponds to the left velocity sensor 7 and the right velocity sensor 8 of FIG. 28.

The vibration velocity signal computing device 90 includes a frequency conversion section 98, a transmitter 94, and a phase difference measurement section 96.

The frequency conversion section 98 performs frequency conversion on the vibration velocities which are generated in the measurement tubes 2 and 3 and detected by the vibration detection sensor 80 when the measurement tubes 2 and 3 are vibrated by the vibrator 6. A signal from the transmitter 94 is input to the frequency conversion section 98.

Then, signals obtained by frequency conversion by the frequency conversion section 98 are input to the phase difference measurement section 96 provided in a subsequent stage of the frequency conversion section 98. The phase difference measurement section 96 performs A/D conversion on respective right and left velocity signals detected by the vibration detection sensor 80 (left velocity sensor 7 and right velocity sensor 8), to thereby perform digital conversion processing, and then obtains a phase difference between the two velocity signals.

In the signal processing method and apparatus illustrated in FIG. 16, the input signals are subjected to the frequency conversion to control the frequencies after the frequency conversion to constant values, and the phase measurement is performed after the frequency conversion. Therefore, a filter processing apparatus capable of performing high-speed, constant, and high-precision phase measurement even when the frequencies of the input signals change is realized.

That is, in the signal processing method and the apparatus 90 as illustrated in FIG. 16, input frequencies FIN of the signals output from the vibration detection sensor 80 and an output frequency FX of the transmitter 94 are multiplied by the frequency conversion section 98 to add (or subtract) phase differences of both the signals, and the transmitter 94 is controlled so that the frequencies after the frequency conversion are constant, so as to control the frequencies input to the phase measurement section 96 to a constant value, to thereby perform the phase measurement based on the signals after the frequency conversion.

When such a structure is employed, constant, substantially error-free, and high-speed computation may be realized without providing a large number of filters corresponding to input frequencies and performing any complicated processing such as changing of a computing method.

[Expression 22]

$$Fc=FX+FIN \text{ (or } Fc=FX-FIN) \tag{22}$$

Figure 17:
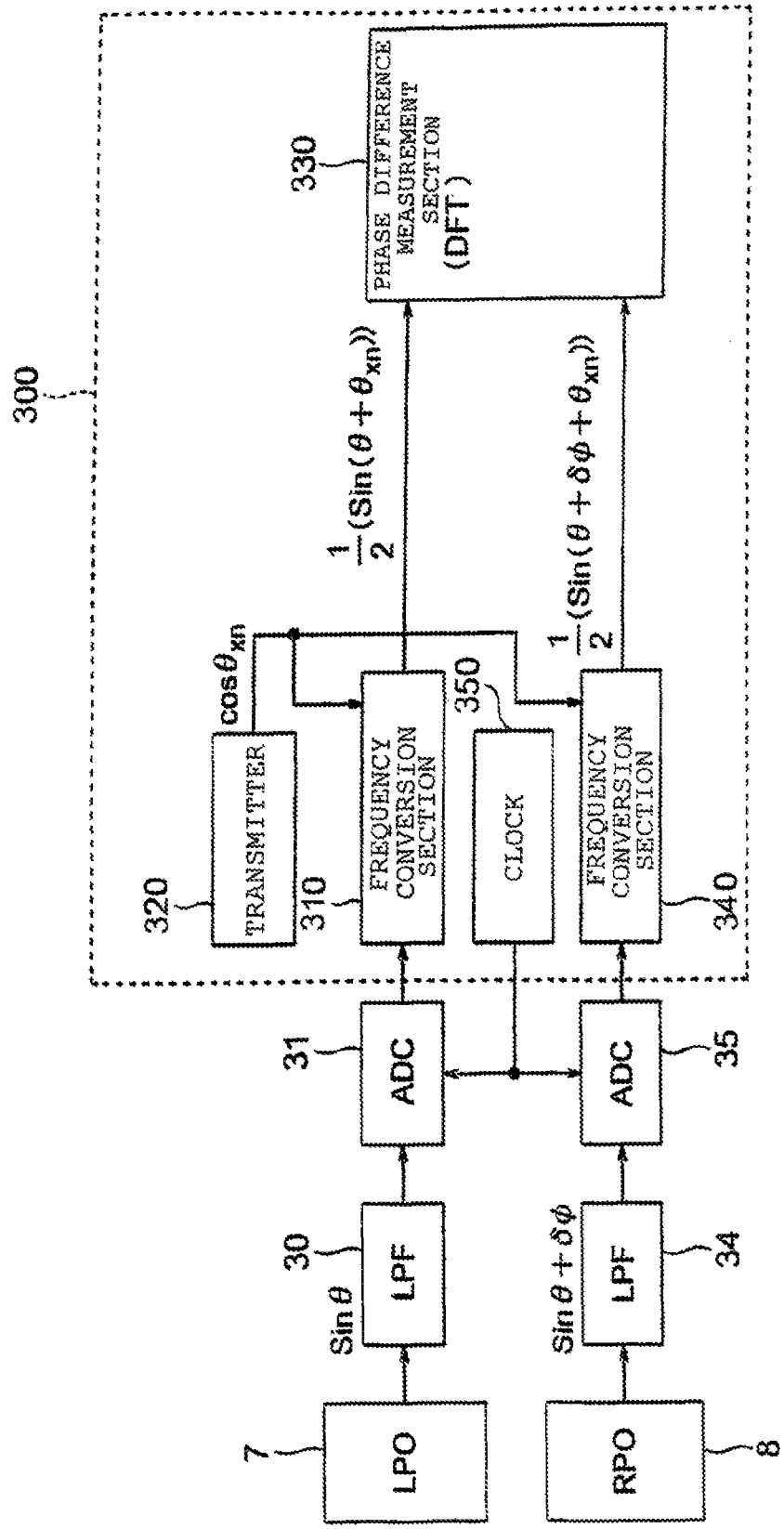
FIG. 17 A block diagram illustrating a specific structure of the signal processing apparatus illustrated in FIG. 16.

FIG. 17 illustrates the specific structure of the signal processing apparatus illustrated in FIG. 16.

In FIG. 17, a left pick-off (LPO) 7 (corresponding to left velocity sensor 7) is connected to a low-pass filter 30. That is, during vibration using the vibrator (for example, electromagnetic oscillator) 6, when a detection signal of a vibration velocity (outlet-side velocity signal) which is generated on the left side of the measurement tubes 2 and 3 is detected by the velocity sensor (vibration detection sensor) 7 located on an outlet side of a fluid to be measured, the detection signal of the vibration velocity (outlet-side velocity signal) is input to the low-pass filter 30.

The low-pass filter 30 is a circuit for extracting, through a frequency filter, only a low-frequency left velocity signal (outlet-side velocity signal) from the left velocity signal (outlet-side velocity signal) output from the left velocity sensor 7 detecting the vibration velocity generated on the left side of the measurement tubes 2 and 3 in the case where the measurement tubes 2 and 3 are vibrated by the vibrator 6.

The low-pass filter 30 is connected to an A/D converter 31. The A/D converter 31 converts the left velocity signal (outlet-side velocity signal) which is the analog signal output from the low-pass filter 30 into a digital signal. The left velocity signal (outlet-side velocity signal) obtained as the digital signal by the A/D converter 31 is input to a signal processing apparatus 300.

Further, the signal processing apparatus 300 is connected to the A/D converter 31. The signal processing apparatus 300 frequency-converts the input signal (outlet-side velocity signal) into a desired frequency processed by a phase measurement unit located in a subsequent stage and performs the phase measurement after the frequency conversion, so as to shift the input frequency band and realize stable phase measurement.

On the other hand, a right pick-off (RPO) 8 (corresponding to right velocity sensor 8) is connected to a low-pass filter 34. That is, during vibration using the vibrator (for example, electromagnetic oscillator) 6, when a detection signal of a vibration velocity (inlet-side velocity signal) which is generated on the right side of the measurement tubes 2 and 3 is detected by the velocity sensor (vibration detection sensor) 8 located on an inlet side of the fluid to be measured, the detection signal of the vibration velocity (inlet-side velocity signal) is input to the low-pass filter 34.

The low-pass filter 34 is a circuit for extracting, through a frequency filter, only a low-frequency right velocity signal (inlet-side velocity signal) from the right velocity signal (inlet-side velocity signal) output from the right velocity sensor 8 detecting the vibration velocity generated on the right side of the measurement tubes 2 and 3 in the case where the measurement tubes 2 and 3 are vibrated by the vibrator 6.

The low-pass filter 34 is connected to an A/D converter 35. The A/D converter 35 converts the right velocity signal (inlet-side velocity signal) which is the analog signal output from the low-pass filter 34 into a digital signal. Further, the signal processing apparatus 300 is connected to the A/D converter 35. The signal processing apparatus 300 frequency-converts the input signal (inlet-side velocity signal) into a desired frequency processed by the phase measurement unit located in the subsequent stage and performs the phase measurement after the frequency conversion, so as to shift the input frequency band and realize stable phase measurement.

The A/D converter 31 is connected to a frequency conversion section 310. The frequency conversion section 310 frequency-converts the digital signal of the left velocity signal (outlet-side velocity signal) output from the A/D converter 31 and then input thereto, into the desired frequency processed by the phase measurement unit located in the subsequent stage.

Further, the A/D converter 35 is connected to a frequency conversion section 340. The frequency conversion section 340 frequency-converts the digital signal of the right velocity signal (inlet-side velocity signal) output from the A/D converter 35 and then input thereto, into the desired frequency in the same manner as described above.

Further, a signal from a transmitter 320 is input to the frequency conversion section 310. When the signal output from the transmitter 320 is input to the frequency conversion section 310, the frequency conversion section 310 frequency-converts the input signal (outlet-side velocity signal) input from the left pick-off (LPO) 7 based on the signal output from the transmitter 320.

A signal obtained by frequency conversion by the frequency conversion section 310 is converted into a desired frequency signal based on the output signal from the transmitter 320.

Further, a signal from the transmitter 320 is also input to the frequency conversion section 340. When the signal output from the transmitter 320 is input to the frequency conversion section 340, the frequency conversion section 340 frequency-converts the input signal (inlet-side velocity signal) input from the right pick-off (RPO) 8 based on the signal output from the transmitter 320.

A signal obtained by frequency conversion by the frequency conversion section 340 is converted into a desired frequency signal based on the output signal from the transmitter 320.

When the transmitter 320 is controlled as described above, as in the case of the frequency conversion section 310, also in the frequency conversion section 340, the frequency obtained after performing the frequency conversion, of the right velocity signal (inlet-side velocity signal) input from the A/D converter 35 is controlled to a desired frequency to be processed by a phase difference measurement unit 330 located in a subsequent stage, based on the output frequency output from the transmitter 320.

The left velocity signal (outlet-side velocity signal) which is output from the A/D converter 31 and input to the frequency conversion section 310 is simultaneously frequency-converted and input to the phase difference measurement unit 330 to perform phase difference measurement.

When such a structure is employed, according to this embodiment, the input frequencies (left velocity signal and right velocity signal) are simultaneously converted into the desired frequency bands. Therefore, even when the input frequencies (left velocity signal and right velocity signal) change, the phase measurement processing frequency is always set to a constant value to significantly reduce the number of filter tables. In addition, the phase measurement processing may be more effectively performed.

According to an effect of the present invention, constant, substantially error-free, and high-speed computation may be realized without providing a large number of filters corresponding to input frequencies and performing any complicated processing such as the change of the computing method. Needless to say, the processing of the phase measurement sect ion may be realized even using a discrete Fourier transform (DFT) or a fast Fourier transform (FFT).

A clock signal is input from a clock 350 to the A/D converter 31 and the A/D converter 35. The clock 350 synchronizes the digital signal of the left velocity signal output from the A/D converter 31 and the digital signal of the right velocity signal output from the A/D converter 35 to realize simultaneous sampling.

The frequency conversion section 310, the transmitter 320, the phase difference measurement unit 330, the frequency conversion section 340, and the clock 350 are included in the signal processing apparatus 300.

The respective input signals (left velocity signal and right velocity signal) which are the digital signals obtained by conversion by the A/D converters 31 and 35 as described above are subjected to the frequency conversion by the frequency conversion sections 310 and 340 based on the output signal from the transmitter 320.

Next, a specific computing method of phase difference measurement computation in the signal processing apparatus 300 illustrated in FIG. 17 is described.

When the measurement tubes 2 and 3 are vibrated by the vibrator 6 of a Coriolis flowmeter 1, the output signals (left velocity signal and right velocity signal) from the vibration detection sensor 80 (left pick-off 7 and right pick-off 8) provided in the measurement tubes 2 and 3 are obtained as input signals of the LPO (left pick-off 7) and the RPO (right pick-off 8) as illustrated in FIG. 17.

In this case, the input signals of the LPO and the RPO are defined as follows ($\delta\phi$: phase difference between LPO and RPO).

[Expression 23]

$$\text{Right pick-off: } \sin(\theta) \quad (23)$$

[Expression 24]

$$\text{Left pick-off: } \sin(\theta+\delta\phi) \quad (24)$$

The output signals (left velocity signal LPO and right velocity signal RPO) from the two vibration detection sensors (left pick-off 7 and the right pick-off 8) are converted from the analog signals into the digital signals by the A/D converters 31 and 35 through the low-pass filters 30 and 34 provided in the converter of the Coriolis flowmeter 1, respectively, and then transferred to the signal processing apparatus 300.

As described above, the signal processing apparatus 300 is divided into four blocks including the frequency conversion section 310, the transmitter 320, the phase difference measurement section 330, and the frequency conversion section 340. A phase difference between the output signal LPO from the left pick-off 7 and the output signal RPO from the right pick-off 8 is computed, and then converted into a flow rate signal based on the frequencies output from the vibration velocity sensors and temperature data detected by a temperature sensor 9.

Note that the temperature measurement is not described in the drawing.

The conversion frequency output from the frequency conversion section 310 is obtained by adding (or subtracting) an output frequency θXn output from the transmitter 320 to (or from) an input signal frequency θ output in a case where the left velocity signal (outlet-side velocity signal) which is detected by the left pick-off (left velocity sensor) 7 and extracted as a low-frequency signal by the low-pass filter 30 is converted into the digital signal by the A/D converter 31.

As described above, with respect to the input signal frequency which is output from the frequency conversion section 310 and input to the phase measurement section 330, the input signal frequency θ which is the low-frequency left velocity signal (outlet-side velocity signal) of the digital signal output from the A/D converter 31 is shifted in frequency to another frequency band based on the output frequency Can output from the transmitter 320 in the frequency conversion section 310.

Therefore, the signal which is shifted in frequency and output by the frequency conversion section 310 and the signal which is shifted in frequency and output by the frequency conversion section 340 having the same processing are subjected to the phase calculation by the phase measurement section 330.

A frequency measurement value (θ+θXn) output from the frequency conversion section 310 is controlled so as to finally become a phase measurement frequency set value θC which is arbitrarily set.

[Expression 25]

$$\theta C = \theta + \theta Xn \tag{25}$$

When the transmitter 320 is controlled so that the frequency measurement value (θ+θXn) input to the phase measurement section 330 always becomes the constant frequency θC as described above, high-speed processing of subsequent phase measurement may be achieved.

The frequency control method according to the present invention includes a method for adjusting the frequency of the transmitter 320 so that the output frequencies of the frequency conversion sections (310 and 340) all become equal to θc in the condition of Expression (25), that is, a feed-forward control method.

Hereinafter, the signal processing method and the signal processing apparatus according to the embodiment of the present invention are described.

Figure 18:
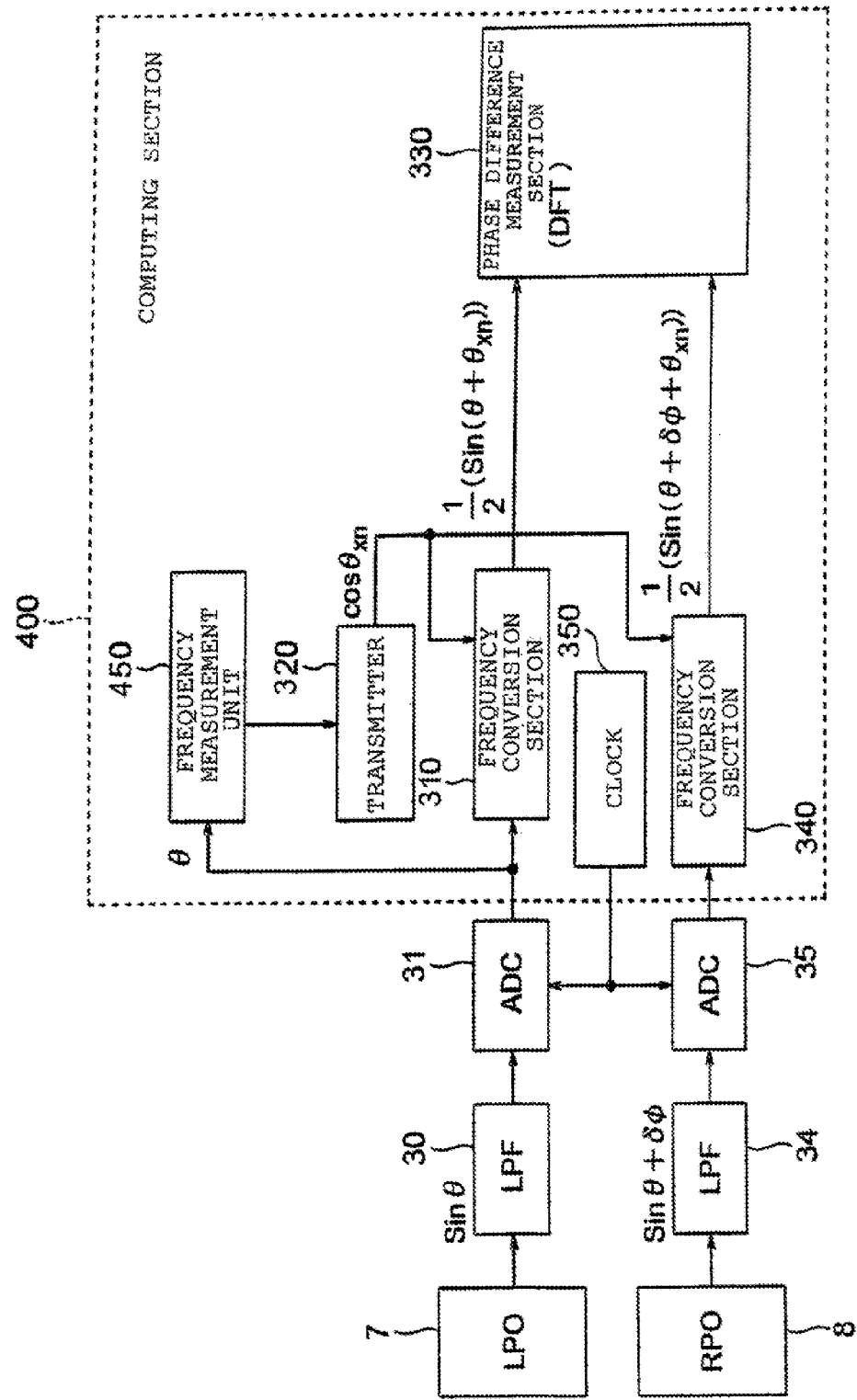
FIG. 18 A block diagram illustrating a specific structure of the signal processing apparatus illustrated in FIG. 17 using a feed-forward control method.

FIG. 18 illustrates a specific structure of the signal processing apparatus illustrated in FIG. 17 using the feed-forward control method.

The signal processing apparatus 400 illustrated in FIG. 18 performs desired frequency conversion on the input signals (inlet- and outlet-side velocity signals) and performs phase measurement after the frequency conversion, and hence stable phase measurement may be achieved without taking input frequency bands into account.

In FIG. 18, the A/D converter 31 is connected to a frequency measurement unit 450. The frequency measurement unit 450 measures the input signal frequency θ (measurement frequency θ) which is the digital signal which is obtained by conversion by the A/D converter 31 and output therefrom.

Further, the A/D converter 35 is connected to the frequency conversion section 340. The frequency conversion section 340 performs frequency conversion on the digital signal of the right velocity signal (inlet-side velocity signal) output from the A/D converter 35 and then input thereto.

The frequency measurement unit 450 is connected to the transmitter 320. The transmitter 320 has the transmission frequency θC which is arbitrarily set. The transmission frequency θC is the phase measurement frequency set value. In the transmitter 320, the phase measurement frequency set value θC is compared with the measurement frequency θ and the frequency θXn corresponding to the difference is output.

[Expression 26]

$$\theta Xn = \theta C - \theta \text{ (or } \theta Xn = \theta C + \theta) \tag{26}$$

That is, cos(θXn) is output from the transmitter 320.

The frequency measurement value θ measured by the frequency measurement unit 450 is output to the transmitter 320. When the signal frequency θ measured by the frequency measurement unit 450 is input to the transmitter 320, the predetermined frequency signal θXn is transmitted based on Expression (26) and output from the transmitter 320 to the frequency conversion section 310 and the frequency conversion section 340.

Similarly, the conversion frequency output from the frequency conversion section 310 is obtained by adding (or subtracting) an output frequency θXn output from the transmitter 320 to (or from) an input signal frequency θ output in a case where the left velocity signal (outlet-side velocity signal) which is detected by the left pick-off (left velocity sensor) 7 and extracted as a low-frequency signal by the low-pass filter 30 is converted into the digital signal by the A/D converter 31.

Further, the conversion frequency output from the frequency conversion section 340 is obtained by adding (or subtracting) an output frequency θXn output from the transmitter 320 to (or from) an input signal frequency (θ+δφ) output in a case where the right velocity signal (inlet-side velocity signal) which is detected by the right pick-off (right velocity sensor) 8 and extracted as a low-frequency signal by the low-pass filter 34 is converted into the digital signal by the A/D converter 35.

As described above, with respect to the input signal frequency which is output from the frequency conversion section 340 and input to the phase measurement section 330, the input signal frequency (θ+δφ) which is the low-frequency right velocity signal (inlet-side velocity signal) of the digital signal output from the A/D converter 35 is shifted in frequency to another frequency band based on the output frequency θXn output from the transmitter 320 in the frequency conversion section 340.

As described above, the transmitter 320 is connected to the frequency conversion section 310 and the frequency conversion section 340. The frequency signal θXn output from the transmitter 320 is input to the frequency conversion section 310 and the frequency conversion section 340.

When the frequency signal θXn output from the transmitter 320 is input to the frequency conversion section 310 and the frequency conversion section 340, the output frequency θc of each of the frequency conversion section 310 and the frequency conversion section 340 is expressed as follows.

[Expression 27]

$$\theta Xn + \theta = \theta C \tag{27}$$

Therefore, when the frequency signal θXn output from the transmitter 320 is input to the frequency conversion section 310, the frequency conversion section 310 outputs a signal expressed as follows.

[Expression 28]

$$\frac{1}{2}(\sin(\theta + \theta_{xn})) \qquad (28)$$

Further, when the frequency signal θXn output from the transmitter 320 is input to the frequency conversion section 340, the frequency conversion section 340 outputs a signal expressed as follows.

[Expression 29]

$$\frac{1}{2}(\sin(\theta + \delta\phi + \theta_{xn})) \qquad (29)$$

Further, the frequency conversion section 310 is configured so that the signal from the transmitter 320 is input thereto. When signal output from the transmitter 320 is input to the frequency conversion section 310, the frequency conversion section 310 performs the frequency conversion on the input signal (outlet-side velocity signal) input from the left pick-off 7 based on the signal output from the transmitter 320.

The signal obtained by frequency conversion by the frequency conversion section 310 is converted into the constant frequency signal based on the output signal from the transmitter 320.

Further, the frequency conversion section 340 is also configured so that the signal from the transmitter 320 is input thereto. When signal output from the transmitter 320 is input to the frequency conversion section 340, the frequency conversion section 340 performs the frequency conversion on the input signal (inlet-side velocity signal) input from the right pick-off 8 based on the signal output from the transmitter 320.

The signal obtained by frequency conversion by the frequency conversion section 340 is converted into the constant frequency signal based on the output signal from the transmitter 320.

When the control is made by the modulatable transmitter 320 as described above, as in the case of the frequency conversion section 310, the frequency conversion section 340 also performs the frequency conversion based on the output frequency output from the transmitter 320.

The conversion frequency output from the frequency conversion section 340 is obtained by adding (or subtracting) the output frequency θXn output from the transmitter 320 to (or from) the input signal frequency (θ+δφ) output in a case where the right velocity signal (inlet-side velocity signal) which is detected by the right pick-off (right velocity sensor) 8 and extracted as a low-frequency signal by the low-pass filter 34 is converted into the digital signal by the A/D converter 35.

As described above, with respect to the input signal frequency which is output from the frequency conversion section 340 and input to the phase measurement section 330, the input signal frequency (θ+δφ) which is the low-frequency right velocity signal (inlet-side velocity signal) of the digital signal output from the A/D converter 35 is shifted in frequency to another frequency band based on the output frequency θXn output from the transmitter 320 in the frequency conversion section 340.

When the transmitter 320 is controlled as described above, as in the case of the frequency conversion section 310, also in the frequency conversion section 340, the frequency conversion is performed based on the output frequency θXn output from the transmitter 320.

The modulatable transmitter 320 is controlled in frequency using the very-simple calculation expression as described above.

Further, the frequency conversion section 310 is connected to the phase difference measurement unit 330. Further, the frequency conversion section 340 is connected to the phase difference measurement unit 330.

In the phase difference measurement unit 330, each of the frequency θ of the left velocity signal (outlet-side velocity signal) which is output from the A/D converter 31 and input to the frequency conversion section 310 and the frequency (θ+δφ) of the right velocity signal (inlet-side velocity signal) which is output from the A/D converter 35 and input to the frequency conversion section 340 is converted into the same constant desired frequency, to perform phase difference measurement.

When such a structure is employed, according to this embodiment, the input frequencies (left velocity signal and right velocity signal) are converted into the desired frequency bands. Therefore, the frequency bands of the input frequencies (left velocity signal and right velocity signal) are shifted, and the number of filter tables is significantly reduced. In addition, the phase measurement processing may be more effectively performed.

According to an effect of the present invention, constant, substantially error-free, and high-speed computation may be realized without providing a large number of filters corresponding to input frequencies and performing any complicated processing such as the change of the computing method. Needless to say, the processing of the phase measurement section may be realized even using a discrete Fourier transform (DFT) or a fast Fourier transform (FFT).

The clock signal is input from the clock 350 to the A/D converter 31 and the A/D converter 35. The clock 350 synchronizes the outputs of the A/D converter 31 and the A/D converter 35 and thus has an important function for eliminating a sampling error between the digital signal of the left velocity signal output from the A/D converter 31 and the digital signal of the right velocity signal output from the A/D converter 35.

The respective input signals (left velocity signal and right velocity signal) which are the digital signals obtained by conversion by the A/D converters 31 and 35 as described above are subjected to the frequency conversion by the frequency conversion sections 310 and 340 based on the output signal from the transmitter 320.

Figure 19:
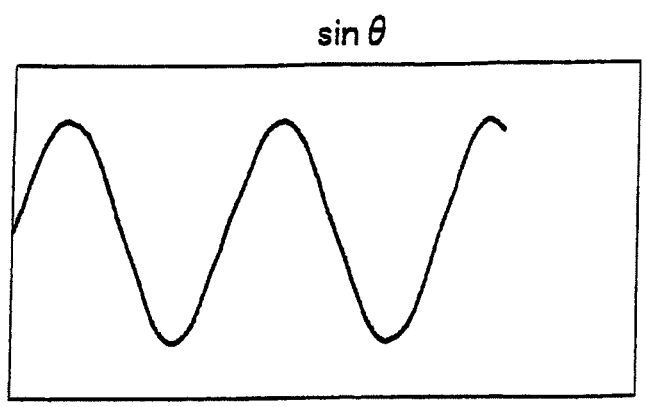
FIG. 19 A diagram illustrating an output signal from an LPF illustrated in FIG. 18.

In the low-pass filter 30 illustrated in FIG. 18, when a harmonic noise is removed to eliminate the influence of aliasing in A/D conversion, a sine signal (sin θ) as illustrated in FIG. 19 is output.

Figure 20:
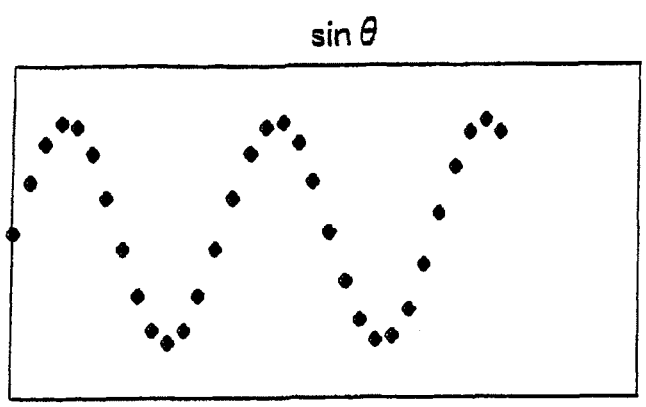
FIG. 20 A diagram illustrating an output signal from an A/D converter illustrated in FIG. 18.

The sine signal (sin θ) output from the low-pass filter 30 as illustrated in FIG. 19 is sampled for digital signal conversion at an arbitrary constant interval by the A/D converter 31 to obtain a sampling signal (sin θ) as illustrated in FIG. 20, and then output from the A/D converter 31.

The signal (sin θ) as illustrated in FIG. 20, which is output from the low-pass filter 30 and sampled for digital signal conversion by the A/D converter 31, is input to the frequency conversion section 310 of the signal processing apparatus 400 illustrated in FIG. 18. Further, a transmitter output signal output from the transmitter 320 is also input to the frequency conversion section 310.

When the signal frequency θ measured by the frequency measurement section 450 is input to the transmitter 320, the transmission frequency signal θXn is transmitted at a desired frequency by the transmitter 320 based on Expression (26) and a cosine signal (cos θXn) as illustrated in FIG. 21 is output at the same transmission output rate as the sampling interval of the input signal in the A/D converter 31.

Figure 22:
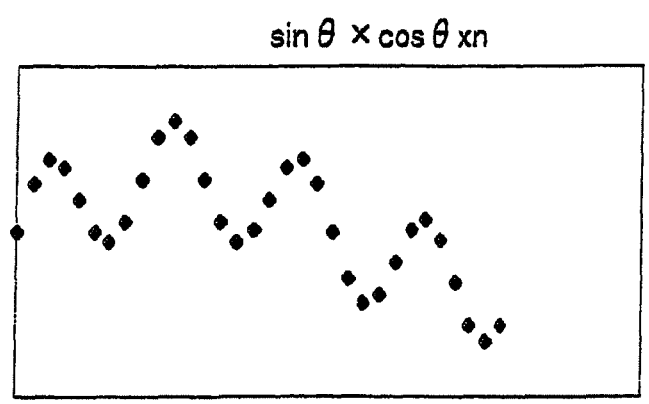
FIG. 22 A diagram illustrating an output signal in a multiplier of a frequency conversion section illustrated in FIG. 18.

When the output signal (cos θXn) from the transmitter 320 is input to the frequency conversion section 310, in the frequency conversion section 310, the signal (sin θ) as illustrated in FIG. 20, which is sampled for digital signal conversion by the A/D converter 31, is multiplied by the output signal (cos θXn) output from the transmitter 320 as illustrated in FIG. 21 (sin θ×cos θXn) by a multiplier provided in the frequency conversion section 310, to thereby obtain a signal (sin θ×cos θXn) as illustrated in FIG. 22.

Figure 23:
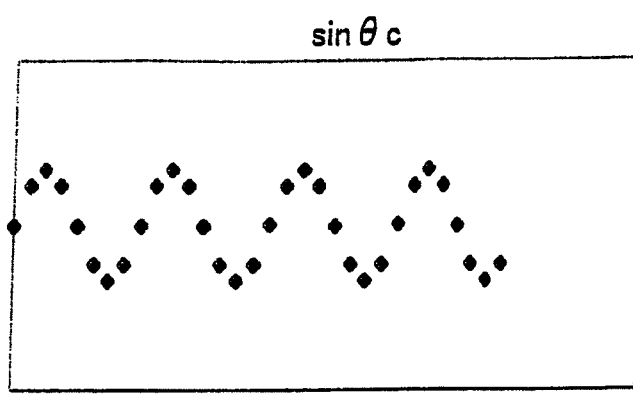
FIG. 23 A diagram illustrating an output signal from the frequency conversion section illustrated in FIG. 18.

The signal (sin θ×cos θXn) as illustrated in FIG. 22, which is obtained by multiplication (sin θ×cos θXn) by the multiplier provided in the frequency conversion section 310, passes through a high-pass filter (HPF) provided in the frequency conversion section 310 to remove a low-frequency component, to thereby obtain a signal (sin θC) as illustrated in FIG. 23. The signal (sin θC) as illustrated in FIG. 23 is output from the frequency conversion section 310 and input to the phase difference measurement unit 330.

The phase difference between the output signals (left velocity signal and right velocity signal) from the vibration velocity sensor 70 (left pick-off 7 and right pick-off 8) provided in the measurement tubes 2 and 3 in the case where the measurement tubes 2 and 3 are vibrated by the vibrator 6 of the Coriolis flowmeter 1 is computed by the four blocks including the frequency conversion sections 310 and 340, the transmitter 320, the phase difference measurement unit 330, and the frequency measurement section 450, included in the signal processing apparatus 400 illustrated in FIG. 18. Then, the computed phase difference is converted into the flow rate signal based on the frequency signal output from the frequency measurement section 450 and the temperature data detected by the temperature sensor 9.

Figure 24:
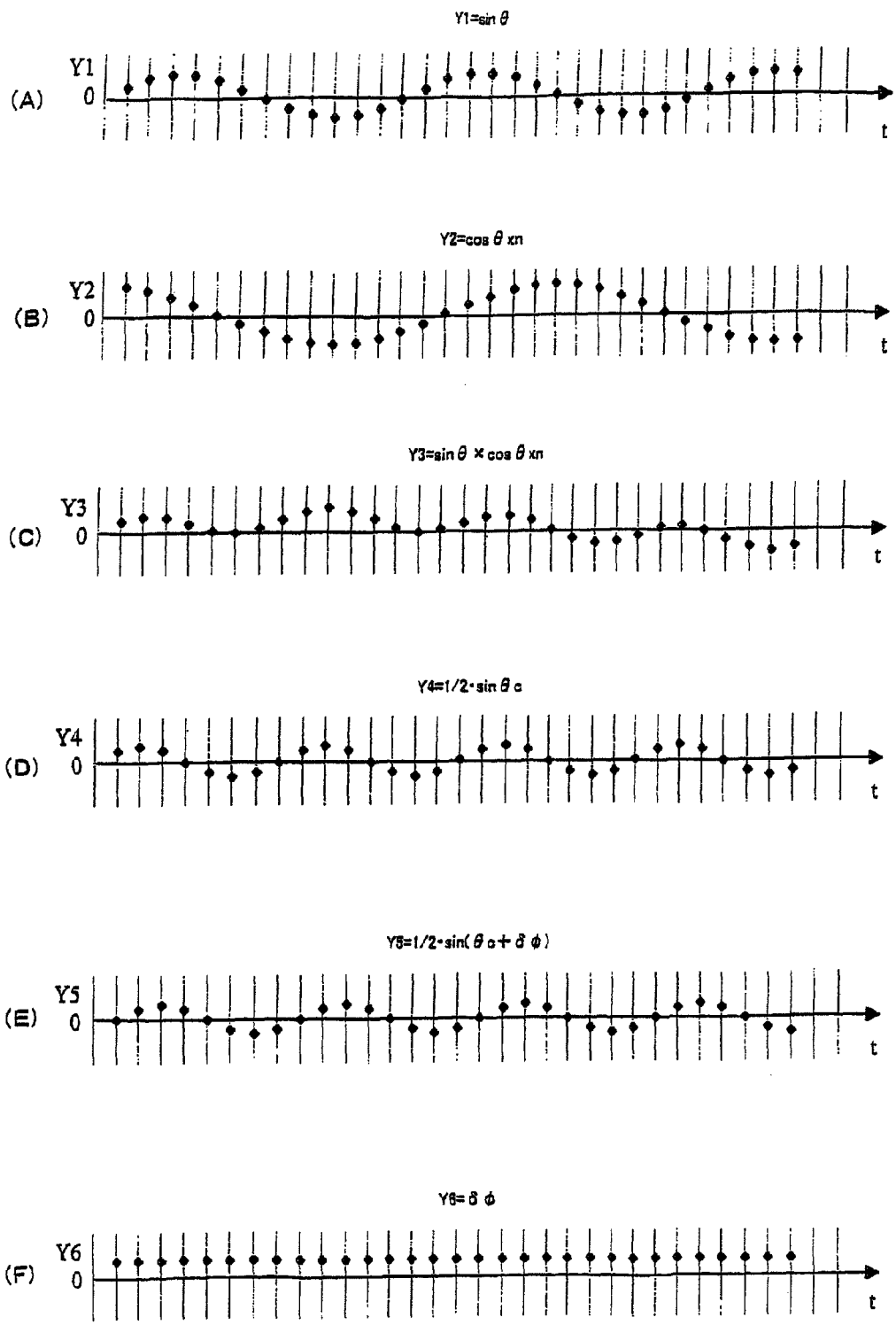
FIG. 24 Diagrams illustrating time charts for the specific structure of the signal processing apparatus illustrated in FIG. 18.

Next, an operation of the signal processing apparatus 400 illustrated in FIG. 18 is described with reference to time charts illustrated in FIG. 24.

First, in the low-pass filter 30 illustrated in FIG. 18, when a harmonic noise is removed to eliminate the influence of aliasing in A/D conversion, a sine signal (sin θ) as illustrated in FIG. 20 is output.

When the sine signal (sin θ) illustrated in FIG. 20 is output, the sine signal (sin θ) illustrated in FIG. 20 is input to the A/D converter 31. Then, the signal is sampled for digital signal conversion at an arbitrary constant interval by the A/D converter 31 to obtain a sampling signal (Y1=sin θ) as illustrated in FIG. 24(A) and output from the A/D converter 31.

The sampling signal (sin θ) illustrated in FIG. 24(A), which is output from the A/D converter 31, is input to the frequency conversion section 310 of the signal processing apparatus 400 illustrated in FIG. 18 and input to the frequency measurement section 450 of the signal processing apparatus 400.

In the frequency measurement section 450 and the transmitter 320 of the signal processing apparatus 400, the desired transmission frequency signal θXn is transmitted based on the sampling signal (sin θ) illustrated in FIG. 24(A), which is output from the A/D converter 31. A cosine signal (Y2=cos θXn) as illustrated in FIG. 24(B) is output to the frequency conversion section 310 of the signal processing apparatus 400 illustrated in FIG. 18 at the same transmission output rate as the sampling interval of the input signal in the A/D converter 31.

When the cosine signal (Y2=cos θXn) illustrated in FIG. 24(B) is output from the transmitter 320 and the cosine signal (Y2=cos θXn) is input to the frequency conversion section 310, the cosine signal is multiplied by the sampling signal (Y1=sin θ) illustrated in FIG. 24(A), which is output from the A/D converter 31, (sin θ×cos θXn) by the multiplier provided in the frequency conversion section 310 to obtain a signal (Y3=sin θ×cos θXn) as illustrated in FIG. 24(C).

The signal (Y3=sin θ×cos θXn) as illustrated in FIG. 24(C), which is obtained by multiplication (sin θ×cos θXn) by the multiplier provided in the frequency conversion section 310, passes through a high-pass filter (HPF) provided in the frequency conversion section 310 to remove a low-frequency component, to thereby obtain a signal (Y4=½·sin θC) as illustrated in FIG. 24(D). The signal (Y4=½·sin θC) as illustrated in FIG. 24(D) is output from the frequency conversion section 310 and input to the phase difference measurement unit 330.

Further, in the low-pass filter 34 illustrated in FIG. 18, when a harmonic noise is removed to eliminate the influence of aliasing in A/D conversion, a sine signal (sin(θ+δφ)) is output.

When the sine signal (sin(θ+δφ)) is output, the sine signal (sin(θ+δφ)) is input to the A/D converter 35. Then, the signal is sampled for digital signal conversion at an arbitrary constant interval by the A/D converter 35.

The signal output from the A/D converter 35 is multiplied by the sampling signal output from the A/D converter 35 by a multiplier provided in the frequency conversion section 340 to obtain a signal.

The signal obtained by multiplication by the multiplier provided in the frequency conversion section 340 passes through a high-pass filter (HPF) provided in the frequency conversion section 340 to remove a low-frequency component, to thereby obtain a signal (Y5=½·sin(θC+δφ)) as illustrated in FIG. 24(E). The signal (Y5=½·sin(θC+δφ)) illustrated in FIG. 24(E) is output from the frequency conversion section 340 and input to the phase difference measurement unit 330.

In the phase difference measurement unit 330, a signal (Y6=δφ) illustrated in FIG. 24(F) is output as a phase difference op based on the signal (Y4=½·sin θC) illustrated in FIG. 24(D), which is output from the frequency conversion section 310 and input to the phase difference measurement unit 330, and the signal (Y5=½·sin(θC+δφ)) illustrated in FIG. 24(E), which is output from the frequency conversion section 340 and input to the phase difference measurement unit 330.

When the computing interval is synchronized with the sampling time as described above, the real time performance for phase measurement may be improved.

Further, each of the set of vibration velocity signals (sin θ and sin(θ+δφ)) is subjected to the same processing for phase calculation, and hence there is almost no computing error. Therefore, accurate phase calculation may be achieved.

Embodiment 5

Next, the signal processing method for the specific structure of the signal processing apparatus 400 illustrated in FIG. 18 is described with reference to the operational flow chart illustrated in FIG. 25.

Figure 25:
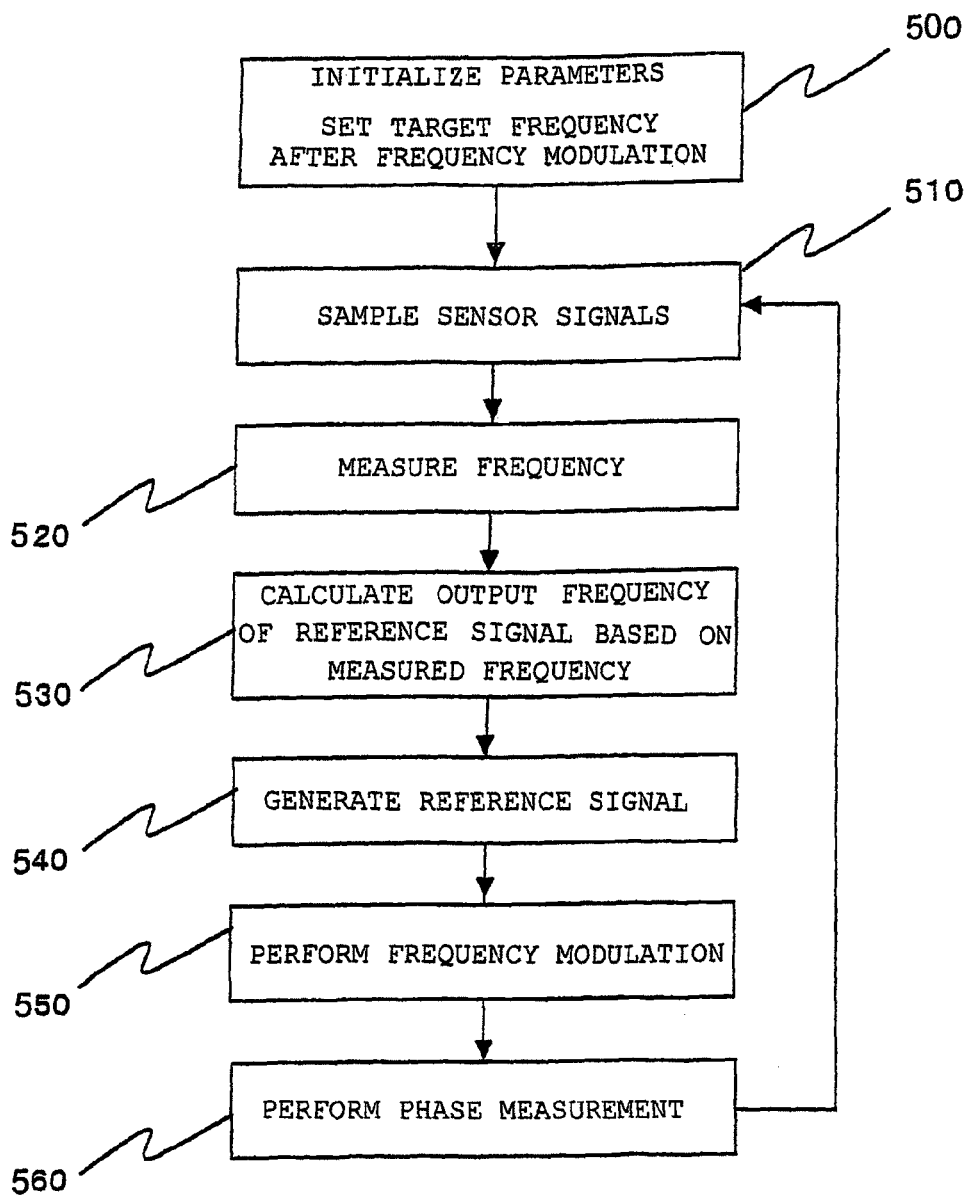
FIG. 25 An operational flow chart for the specific structure of the signal processing apparatus illustrated in FIG. 18.

FIG. 25 is a flow chart illustrating frequency modulation and phase measurement in a case where the feed-forward is used.

In FIG. 25, in Step 500, parameters of the signal processing apparatus 400 which is the computing device are initialized. When the parameters of the signal processing apparatus 400 are initialized, a target frequency for frequency modulation, that is, a target frequency after frequency modulation is set in Step 500.

When the parameters of the signal processing apparatus 400 which is the computing device are initialized and the target frequency after frequency modulation is set in Step 500, in Step 510, a phase and velocity signal output from the left pick-off (LPO) 7 (left velocity sensor 7) is sampled for digital signal conversion at an arbitrary sampling interval by the A/D converter 31, and a phase and velocity signal output from the right pick-off (RPO) 8 (right velocity sensor 8) is sampled for digital signal conversion at an arbitrary sampling interval by the A/D converter 35.

The phase and velocity signal sampled for digital signal conversion at the arbitrary sampling interval by the A/D converter 31 is input to the frequency measurement unit 450 and the frequency conversion section 310. The phase and velocity signal sampled for digital signal conversion at the arbitrary sampling interval by the A/D converter 35 is input to the frequency converter 340.

When the signal is sampled for digital signal conversion at the arbitrary sampling interval in Step 510, the frequency is measured in Step 520. That is, when the phase and velocity signal sampled for digital signal conversion at the arbitrary sampling interval by the A/D converter 31 is input, the frequency measurement unit 450 measures the frequency based on the phase and velocity signal.

When the frequency is measured in Step 520, an output frequency of a reference signal is calculated in Step 530. That is, in Step 530, the frequency measured by the frequency measurement unit 450 is compared with the initially set target frequency.

When the measured frequency is compared with the initially set target frequency in Step 530, in Step 540, the output frequency is set for the transmitter 320 for reference signal based on the result obtained by comparison, to thereby generate the reference signal. When the reference signal is generated, the reference signal having the set frequency is output from the transmitter 320 and input to the frequency converters 310 and 340.

When the reference signal is generated in the transmitter 320 in Step 540, the processing of the frequency converters 310 and 340, that is, the frequency conversion is performed in Step 550.

Therefore, the frequency converter 310 to which the reference frequency signal output from the transmitter 320 is input converts the phase and velocity signal output from the A/D converter 31 into a phase and velocity signal having an arbitrary frequency based on the reference signal output from the transmitter 320.

The frequency converter 340 to which the reference frequency signal output from the transmitter 320 is input converts the phase and velocity signal output from the A/D converter 35 into a phase and velocity signal having an arbitrary frequency based on the reference signal output from the transmitter 320.

As a result, the signal obtained by frequency conversion is converted into an arbitrary constant frequency and transferred to the phase difference measurement section 330.

When the conversion into the phase and velocity signal having the arbitrary frequency is performed in Step 550, phase measurement is performed in Step 560.

That is, in Step 560, the phase and velocity signal obtained by the arbitrary constant frequency conversion based on the transmission frequency of the reference signal output from the transmitter 320 is input to the phase measurement unit 330. The phase measurement unit 330 performs the phase measurement using a FFT or the like based on the phase and velocity signal obtained by the arbitrary constant frequency conversion, which is output from the frequency converter 310. When the phase measurement is performed using the FFT as described above, high-precision phase difference measurement may be always performed at the same computing interval.

Hereinafter, the four blocks including the frequency conversion sections 310 and 340, the transmitter 320, the phase difference measurement unit 330, and the frequency measurement unit 450, included in the signal processing apparatus 400 are described.

(1) Frequency Conversion Section

Figure 26:
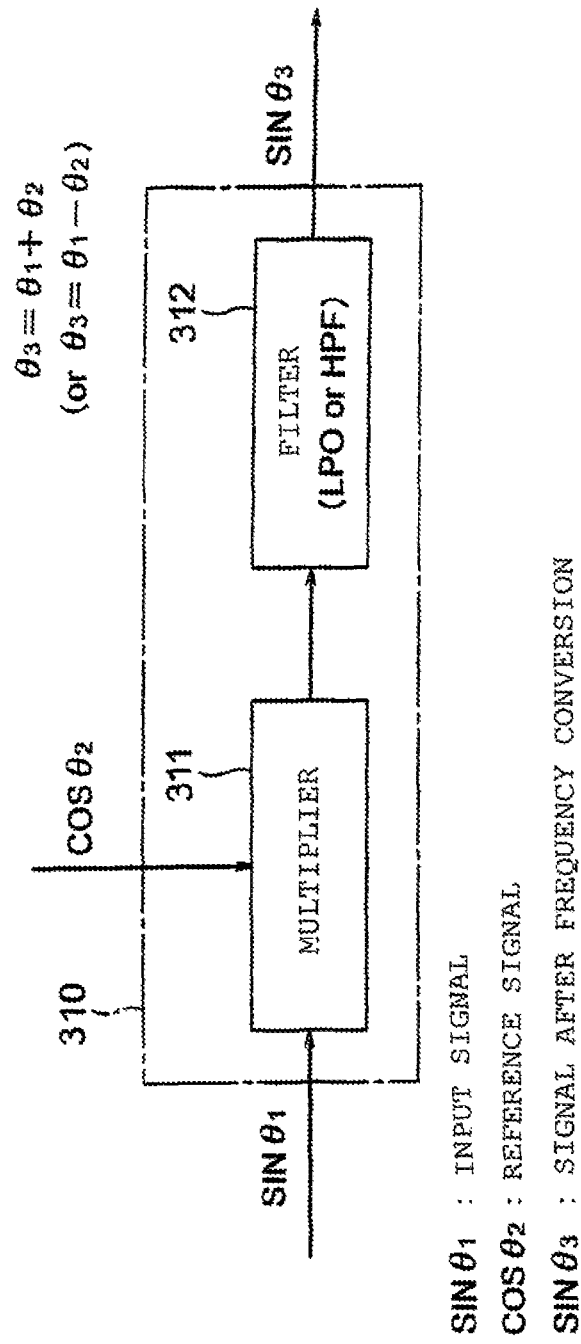
FIG. 26 A block structural diagram illustrating the frequency conversion section of the signal processing apparatus illustrated in FIG. 18.

The frequency conversion section 310 of the signal processing apparatus 400 has a structure as illustrated in FIG. 26.

In FIG. 26, the frequency conversion section 310 includes a multiplier 311, a low-pass filter (LPF) 312 (or high-pass filter (HPF)).

A reference signal $\cos\theta 2$ from the transmitter 320 and an input signal $\text{SIN}\,\theta 1$ from the A/D converter 31 are multiplied by each other and then subjected to filter processing by the low-pass filter 312.

The reference signal $\cos\theta 2$ from the transmitter 320 is multiplied by an input signal $\sin\theta 1$ obtained by converting, into a digital signal, by the A/D converter 31, the low-frequency left velocity signal (outlet-side velocity signal) which is detected by the left pick-off (left velocity sensor) 7 and extracted by the low-pass filter 30 and then output therefrom, to thereby combine sum and difference frequency signals.

[Expression 30]

$$\sin\theta 1 \cdot \cos\theta 2 = \frac{1}{2}(\sin(\theta 1 + \theta 2) + \sin(\theta 1 - \theta 2)) \tag{30}$$

The sum and difference frequency signals are filtered by the low-pass filter (or high-pass filter) 132 to extract only the difference signal (or sum signal).

In this case, for specific description, the sum signal is extracted. However, even when the difference signal is extracted, there is no problem, and hence the filter processing method is applied as appropriate according to the frequency conversion method.

The output from the low-pass filter (or high-pass filter) 312 is expressed as follows.

[Expression 31]

$$\frac{1}{2}(\sin(\theta 1 + \theta 2)) \tag{31}$$

In this case, an output signal frequency $\theta 3$ from the low-pass filter (or high-pass filter) 312 is always controlled to a constant value.

Therefore, the same filter may be always used without depending on the input signal.

Thus, the phase measurement in the phase difference measurement unit 130 located in the subsequent stage of the frequency conversion section 310 may be highly uniformed and simplified.

(2) Frequency Measurement Section

In this embodiment, the principle of phase-locked loop (PLL) is used for the frequency measurement method. The PLL is a known electronic circuit in which a signal which is equal in frequency to an input alternating current signal and locked in phase therewith is output from another oscillator by feedback control.

Therefore, the PLL is fundamentally a phase-lock circuit and may produce a signal locked in phase with an input signal.

The PLL is an oscillation circuit for feedback-controlling an oscillator in a loop for oscillation so that a phase difference between a reference signal input from an outside and an output from the oscillator in the loop is constant. Therefore, the PLL may be relatively easily constructed using a computing device and may perform high-speed computation.

Figure 27:
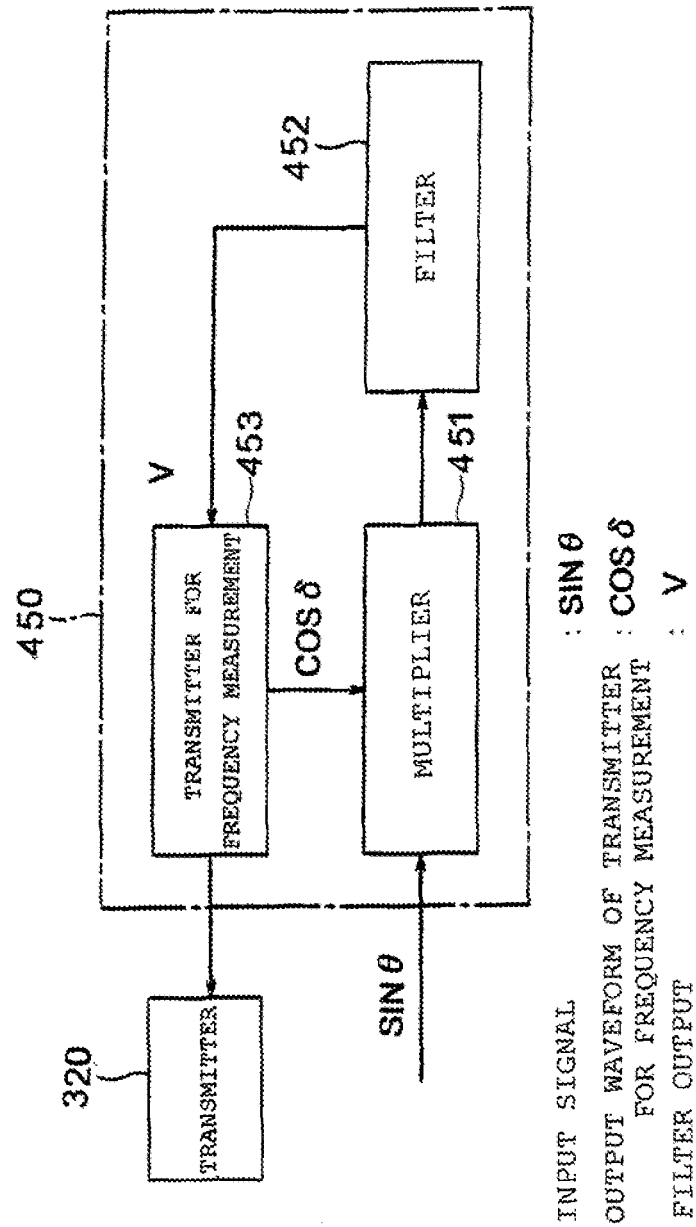
FIG. 27 A block structural diagram illustrating a frequency measurement section of the signal processing apparatus illustrated in FIG. 18.

The frequency measurement section 450 of the signal processing apparatus 400 has a structure as illustrated in FIG. 27.

In FIG. 27, the frequency measurement section 450 includes a multiplier 451, a low-pass filter (LPF) 452, and a transmitter 453 for frequency measurement.

The multiplier 451 compares the phase of the left velocity signal (outlet-side velocity signal) sin θ which is obtained as the digital signal by conversion by the A/D converter 31 with the phase of an output signal cos δ output from the transmitter 453 for frequency measurement and outputs the signals as a difference signal and a sum signal to the low-pass filter 452.

Therefore, an output end of the multiplier 451 is connected to the low-pass filter 452. The low-pass filter 452 extracts only a low-frequency signal from the output signal output from the multiplier 451 through a frequency filter.

Thus, in this case, only a difference component is extracted from the output signal output from the multiplier 451.

The low-pass filter 452 is connected to the transmitter 453 for frequency measurement. The transmitter 453 for frequency measurement generates phase data 6 based on the low-frequency signal output from the low-pass filter 452.

The transmitter 453 for frequency measurement outputs the output signal cos δ to the multiplier 451. In the multiplier 451, the phase of the input signal frequency θ obtained by converting, into a digital signal, by the A/D converter 31, the low-frequency left velocity signal (outlet-side velocity signal) which is detected by the left pick-off (left velocity sensor) 7 and extracted by the low-pass filter 30 and output therefrom is compared with the phase of the output signal cos δ, and the signals are output as the difference signal and the sum signal to the low-pass filter 452.

A feedback loop is formed so that output data "V" (frequency computing function V) of only the difference component obtained by filtering by the low-pass filter 452 becomes 0.

As illustrated in FIG. 27, the ADC-31-output sin θ is input to the multiplier 451. When the output signal output from the transmitter 453 for frequency measurement in the frequency measurement unit 450 is expressed by cos δ, both the signals are multiplied by the multiplier 451 as follows.

[Expression 32]

$$\sin\theta \cdot \cos\delta = \frac{1}{2}(\sin(\theta + \delta) + \sin(\theta - \delta)) \quad (32)$$

Input waveform: sin θ
Output waveform of transmitter for frequency measurement: cos δ

When a result obtained by multiplication by the multiplier 151 as expressed by Expression (32) is filtered by the low-pass filter 452, a high-frequency component is removed to obtain the following expression.

[Expression 33]

$$V = \sin(\theta - \delta) \quad (33)$$

When a value of (θ−δ) in Expression (33) is a sufficiently small value (V≈0), the frequency computing function V indicating the result obtained by multiplication by the multiplier 451 may be approximately expressed as follows.

[Expression 34]

$$V = \theta - \delta \quad (34)$$

When an output waveform of the transmitter 453 for frequency measurement is controlled so that the frequency computing function V becomes 0, the preceding phase θ obtained by frequency conversion by the frequency conversion section 310 may be obtained.

When the phase θ of the ADC-31-output sin θ which is obtained as described above is computed using the following Expressions (35) and (36), a frequency "f" may be obtained.

[Expression 35]

$$\frac{\Delta\theta}{\Delta T} = \omega = 2 \cdot \pi \cdot f \quad (35)$$

ω: Angular velocity (rad/s)

Note that ΔT indicates a change in time and is equal to the computing interval (sampling rate).

Therefore, a change in phase (θ) is as follows.

[Expression 36]

$$\theta = 2 \cdot \pi \cdot f \cdot Ta \quad (36)$$

where
Ta: change in time (sampling interval) (sec.)
f: input frequency (Hz)
θ: change in phase (rad)
The input frequency "f" is as follows.

[Expression 37]

$$f = \frac{\theta}{2 \cdot \pi \cdot T} \quad (37)$$

When such calculation is performed by the frequency measurement unit 450, high-speed frequency measurement may be achieved.

(3) Transmitter

In FIG. 18, the output frequency of the modulatable transmitter 320 is controlled based on the result (θ) obtained by measurement by the frequency measurement section 450.

That is, in the transmitter 320, the frequency θ of the detection signal of the vibration velocity (outlet-side velocity signal) generated on the left side of the measurement tubes 2 and 3, which is detected by the left pick-off 7 and input to the frequency conversion section 310 in the case where the measurement tubes 2 and 3 are vibrated by the vibrator 6, is controlled to a desired frequency to be processed by the phase difference measurement unit 330.

The frequency conversion section 310 and the frequency conversion section 340 have the same structure. Therefore, as in the case of the frequency output from the frequency conversion section 310, the frequency output from the frequency conversion section 340, more specifically, the frequency (θ+δφ) of the detection signal of the vibration velocity (inlet-side velocity signal) generated on the right side of the measurement tubes 2 and 3, which is detected by the right pick-off 8 and input to the frequency conversion section 340 in the case where the measurement tubes 2 and 3 are vibrated by the vibrator 6, is converted into a desired frequency.

(4) Phase Difference Measurement Unit

There are various phase measurement methods. In a case of phase measurement using a Fourier transform, a frequency is fixed, and hence very-high-speed computation may be achieved.

Hereinafter, an example of a discrete Fourier transform (DFT) is described. The discrete Fourier transform is a Fourier transform on a discrete group, often used for frequency analysis of discrete digital signals in signal processing, and also used to efficiently calculate a partial differential equation or a convolution integral. The discrete Fourier transform may be calculated with high speed (by a computer) using a fast-Fourier transform (FFT).

When the input signal sampled in the phase difference measurement section 330 is expressed by g(n), DFT-G(k) is defined as follows.

[Expression 38]

$$G(k) = \sum_{n=0}^{N-1} g(n)\exp\left(\frac{-j \cdot 2 \cdot \pi \cdot n \cdot k}{N}\right)$$
$$= \sum_{n=0}^{N-1} g(n)\left(\cos\left(\frac{2 \cdot \pi \cdot n \cdot k}{N}\right) - j\sin\left(\frac{2 \cdot \pi \cdot n \cdot k}{N}\right)\right)$$
$$k = 0, 1, \ldots, N-1$$
(38)

For simpler expression, when a complex exponential function part is expressed by the following substitution,

[Expression 39]

$$W_N = \exp\left(\frac{-j \cdot 2\pi}{N}\right)$$
$$= \cos\left(\frac{2\pi}{N}\right) - j\sin\left(\frac{2\pi}{N}\right)$$
(39)

Expression (38) is expressed as follows.

[Expression 40]

$$G(k) = \sum_{n=0}^{N-1} g(n) \cdot W_N^{nk}$$
(40)

Assume that attention is focused on a complex exponential function $W_N^{nk}$, and N is expressed by N=2M (M: integer), and, for example, N=8. When the input frequency is ¼ of the sampling frequency, a real part function and an imaginary part function may be expressed as follows by 0.1, and −1 because of the periodicity of trigonometric functions.

[Expression 41]

|  | Real | Imaginary |  |
| --- | --- | --- | --- |
| $W_8^0$ | 1 | 0 |  |
| $W_8^2$ | 0 | −1 |  |
| $W_8^4$ | −1 | 0 |  |
| $W_8^6$ | 0 | 1 | (20) |

Therefore, the input signals LPO and RPO obtained by frequency conversion into ¼ of the sampling frequency may be very simply subjected to the Fourier transform. In normal phase measurement, only a single frequency (vibration frequency) is desirably subjected to the Fourier transform and conversion for another frequency band is not performed, and hence computation may be performed by only addition and subtraction.

In fact, when the input signal input to the phase difference measurement section 330 is expressed by g(n), the input signal g(n) is a frequency of ¼ of the sampling rate, and N is expressed by N=2M (M: integer), DFT-G(n) may be computed as follows.

[Expression 42]

$$\begin{array}{ll}
\text{Calculation of real part (Re)} & \text{Calculation of imaginary part (Im)} \\
g_n \times 1 & g_n \times 0 \\
g_{n+1} \times 0 & g_{n+1} \times -1 \\
g_{n+2} \times -1 & g_{n+2} \times 0 \\
\vdots & \vdots \\
g_{n+N-2} \times -1 & g_{n+N-2} \times 0 \\
+)\, g_{n+N-1} \times 0 & g_{n+N-1} \times 1 \\
\hline
\text{Re} = g_n - g_{n+2} \cdots - g_{n+N-2} & \text{Im} = -g_{n+1} \cdots + g_{n+N-1}
\end{array}$$
(42)

Even when the value of M increases, fundamental computation does not completely change. Therefore, when M increases, calculation may be performed with very high precision and a computing load almost does not change.

When two input signals are subjected to the discrete Fourier transform (DFT) in the procedure described above, the RPO signal may be substituted as follows,

[Expression 43]

RPO signal:

$$\frac{1}{2}(\sin(\theta + \theta_x)) = \frac{1}{2}(\sin(\theta_c))\frac{1}{2}\exp(j\theta_c) = \text{Re}_1 + j\text{Im}_1$$
(43)

and the LPO signal may be substituted as follows.

[Expression 44]

LPO signal: (44)

$$\frac{1}{2}(\sin(\theta + \delta\phi + \theta_x)) = \frac{1}{2}(\sin(\theta_c + \delta\phi))$$
$$= \frac{1}{2}\exp(j(\theta_c + \delta\phi))$$
$$= Re_2 + jIm_2$$

In this case, a phase angle tan δφ of the input signal is expressed as follows.

[Expression 45]

$$\tan\delta\phi = \frac{Im_2 Re_2 - Re_2 Im_1}{Re_2 Re_1 + Im_2 Im_1} \quad (45)$$

After the phase angle tan δφ of the input signal is obtained using Expression (45), when tan δφ is computed, the phase difference signal by may be obtained.

A mass flow rate Q of the fluid to be measured is proportional to the phase angle and inversely proportional to a driving frequency F, and thus is expressed as follows.

[Expression 46]

$$Q = S(t)\cdot\delta\phi/F \quad (46)$$

where S(t) indicates a correction coefficient associated with a temperature of the measured fluid.

When the measured phase angle δφ and the driving frequency F are substituted into Expression (28), the mass flow rate Q may be calculated.

The mass flow rate Q obtained as described above is subjected to suitable scaling and unit conversion and may be output to an outside in various forms by adding subsequent processing such as analog output, pulse output, or serial communication.

<<Feature of Phase Measurement Method Using Frequency Conversion>>

According to a feature of the phase measurement system in the present invention, the signals may be sampled at the sampling interval unrelated to the frequency A of the input signals which are obtained by converting, into the digital signals, by the A/D converters 31 and 35, the low-frequency velocity signals which are detected by the vibration detection sensors (left pick-off 7 and right pick-off 8) and extracted by the low-pass filters 30 and 34 and output therefrom, and which are input to the frequency conversion sections 310 and 340. Therefore, the structure is very simple, no filter table is required, and very-high-speed computation may be achieved with a small computing error.

Further, according to the phase measurement system in the present invention, even when a rapid change in frequency occurs in the input signals which are obtained by converting, into the digital signals, by the A/D converters 31 and 35, the low-frequency velocity signals which are detected by the vibration detection sensors (left pick-off 7 and right pick-off 8) and extracted by the low-pass filters 30 and 34 and output therefrom, and which are input to the frequency conversion sections 310 and 340, the frequency before frequency conversion is measured and then frequency conversion is performed. Therefore, even when the input frequency rapidly changes, a variation in frequency after frequency conversion is minimized, and hence the system is very suitable for phase measurement in a case where the driving frequency of the measurement tubes continuously changes.

Further, according to the phase measurement system in the present invention, there is little limitation on the phase measurement band by the input frequency of the input signals input to the frequency conversion sections 310 and 340. Therefore, coupling with sensors having various driving frequencies may be realized and computing precision is not affected by the input frequency, and hence high-precision phase measurement may be always achieved.

Embodiment 6

The measurement tubes 2 and 3 including at least one flow tube or a pair of flow tubes, serving as measurement flow tubes, are operated by a driving device using the vibrator 6. The measurement tubes 2 and 3 including the one flow tube or the pair of flow tubes are alternately driven to vibrate the flow tubes. In a Coriolis flowmeter, a phase difference and/or a vibration frequency proportional to a Coriolis force acting on the measurement tubes 2 and 3 including the one flow tube or the pair of flow tubes are/is detected by a pair of velocity sensors or acceleration sensors corresponding to vibration detection sensors including the left pick-off (LPO) 7 and the right pick-off (RPO) 8, to thereby obtain a mass flow rate and/or density of a fluid to be measured.

The Coriolis flowmeter includes: the frequency measurement unit 450 for measuring a frequency based on an input signal frequency of at least one sensor (for example, input signal (outlet-side velocity signal) input from left pick-off 7) of two flow rate signals obtained by A/D conversion on two input signals of the phase difference and/or the vibration frequency proportional to the Coriolis force acting on the measurement tubes 2 and 3 including the pair of flow tubes, which are detected by the velocity sensors or the acceleration sensors; and the transmitter 320 for transmitting and outputting a desired frequency signal based on the frequency measured by the frequency measurement unit.

A velocity sensor signal (for example, input signal (outlet-side velocity signal) input from left pick-off 7) from one of the pair of vibration detection sensors (left pick-off 7 and right pick-off 8) is converted into a digital signal by the first A/D converter 31. The first frequency conversion section 310 is provided for frequency conversion to perform addition (or subtraction) on the frequency θ of the input signal based on the output frequency θXn output from the transmitter 320.

Further, a velocity sensor signal (for example, input signal (inlet-side velocity signal) input from right pick-off 8) from the other of the pair of vibration detection sensors (left pick-off 7 and right pick-off 8) is converted into a digital signal by the second A/D converter 35 to obtain an input signal frequency (θ+δφ). The second frequency conversion section 340 is provided for frequency conversion to perform addition (or subtraction) on the input signal frequency (θ+δφ) based on the output frequency θXn output from the transmitter 320.

The phase difference measurement section 330 is provided to measure a phase difference between a first frequency modulation signal obtained by conversion as a constant frequency signal by the first frequency conversion section 310 and a second frequency modulation signal output as a converted constant frequency signal from the second frequency conversion section 340.

Further, the signal processing apparatus 400 is provided to obtain the phase difference between the first frequency modulation signal output as the converted constant frequency signal from the first frequency conversion section 310 and the second frequency modulation signal output as the converted constant frequency signal from the second frequency conversion section 340, to thereby serve as the Coriolis flowmeter.

DESCRIPTION OF SYMBOLS

1 Coriolis flowmeter
2, 3 measurement tube
4 detector
5 converter
6 vibrator
7 left velocity sensor
8 right velocity sensor
9 temperature sensor
10 drive control section
11 phase measurement section
12 temperature measurement section
30, 34 low-pass filter
31, 35 A/D converter
80 vibration detection sensor
90 vibration velocity signal computing device
92 quadrature modulator
94 transmitter
96 phase measurement unit
98 frequency conversion section
100 signal processing apparatus
110 quadrature modulator
120 frequency measurement unit
121 multiplier
122 low-pass filter
123 transmitter for frequency measurement
130 quadrature modulator
140 transmitter
150 phase difference measurement unit
160 clock
300 signal processing apparatus
310 frequency conversion section
311 multiplier
312 low-pass filter
320 transmitter
330 phase difference measurement section
340 frequency conversion section
350 clock
450 frequency measurement unit
451 multiplier
452 low-pass filter
453 transmitter for frequency measurement

The invention claimed is:

1. A signal processing method for a Coriolis flowmeter in which at least one flow tube or a pair of flow tubes which is included in a measurement flow tube is alternately driven by causing a vibrator to be actuated by a driving device and vibrate the at least one flow tube or the pair of flow tubes, and at least one of a phase difference and a vibration frequency proportional to a Coriolis force acting on the at least one flow tube or the pair of flow tubes is detected by velocity sensors or acceleration sensors which are a pair of vibration detection sensors provided on a left-hand side and a right-hand side of the at least one flow tube or the pair of flow tubes, the Coriolis force being proportional to and thereby being used to obtain at least one of a mass flow rate and the vibration frequency used to obtain a density of a fluid to be measured, the signal processing method comprising:

converting, using an A/D converter, an analog signal, which is output from each of the pair of vibration detection sensors, to a digital vibration frequency signal;
measuring the vibration frequency of the at least one flow tube or the pair of flow tubes;
generating a control signal for controlling a frequency of the digital vibration frequency signal obtained through the conversion of the analog signal to be 1/N of the frequency thereof, based on the digital vibration frequency signal output from one of the pair of vibration detection sensors and measured in the measuring of the vibration frequency; and
subjecting the digital vibration frequency signal obtained through the conversion of the analog signal to orthogonal conversion by using the control signal generated, to thereby obtain a frequency signal that has a frequency thereof set to 1/N of the frequency of the digital vibration frequency signal obtained through the conversion of the analog signal,
wherein a phase difference between detection signals from the pair of vibration detection sensors is detected by using the frequency signal obtained through the orthogonal conversion, which has the frequency thereof set to 1/N of the frequency of the digital vibration frequency signal.

2. A signal processing method for a Coriolis flowmeter in which at least one flow tube or a pair of flow tubes which is included in a measurement flow tube is alternately driven by causing a vibrator to be actuated by a driving device and vibrate the at least one flow tube or the pair of flow tubes, and at least one of a phase difference and a vibration frequency that is proportional to a Coriolis force acting on the at least one flow tube or the pair of flow tubes is detected by a pair of velocity sensors or a pair of acceleration sensors which are vibration detection sensors, the Coriolis force being proportional to and thereby being used to obtain at least one of a mass flow rate and the vibration frequency used to obtain a density of a fluid to be measured, the signal processing method comprising:

measuring, using frequency measuring device, the vibration frequency of the at least one flow tube or the pair of flow tubes;
transmitting a control signal based on the measured vibration frequency;
performing composite frequency conversion based on the transmitted control signal on each of two flow rate signals obtained through A/D conversion on input signals having the at least one of the phase difference and the vibration frequency proportional to the Coriolis force acting on the at least one flow tube or the pair of flow tubes, which are detected by the pair of velocity sensors or the pair of acceleration sensors, so that resultant signals have a constant frequency; and
measuring a phase from each of converted composite frequency signals obtained through the composite frequency conversion, to thereby obtain a phase difference signal component.

3. A signal processing apparatus for a Coriolis flowmeter in which at least one flow tube or a pair of flow tubes which is included in a measurement flow tube is alternately driven by causing a vibrator to be actuated by a driving device and vibrate the at least one flow tube or the pair of flow tubes, and at least one of a phase difference and a vibration frequency that is proportional to a Coriolis force acting on the at least one flow tube or the pair of flow tubes is detected by velocity sensors or acceleration sensors which are a pair of vibration detection sensors provided on a left-hand side and a right-hand side of the at least one flow tube or the pair of flow tubes, the Coriolis force being proportional to and thereby being used to obtain at least one of a mass flow rate and the vibration frequency used to obtain a density of a fluid to be measured, the signal processing apparatus comprising:

A/D converters for converting analog signals, which are output from the pair of vibration detection sensors, to digital signals, respectively;

a frequency measurement unit for measuring a vibration frequency angle θ of the at least one flow tube or the pair of flow tubes;

a transmitter for generating a frequency signal having a frequency thereof set to θ(1−1/N) of a frequency of a digital frequency signal output from the frequency measurement unit; and a pair of orthogonal frequency converters for converting, based on the frequency signal generated by the transmitter, frequencies of two of the digital signals corresponding to the pair of vibration detection sensors, which are output from the A/D converters, respectively, and generating digital signals having frequencies thereof set to 1/N of frequencies of the two of the digital signals, respectively, wherein the phase difference is obtained by using the digital signals generated by the pair of orthogonal frequency converters.

4. A signal processing apparatus for a Coriolis flowmeter in which at least one flow tube or a pair of flow tubes which is included in a measurement flow tube is alternately driven by causing a vibrator to be actuated by a driving device and vibrate the at least one flow tube or the pair of flow tubes, and at least one of a phase difference and a vibration frequency proportional to a Coriolis force acting on the at least one flow tube or the pair of flow tubes is detected by velocity sensors or acceleration sensors which are vibration detection sensors, the Coriolis force being proportional to and thereby being used to obtain at least one of a mass flow rate and the vibration frequency used to obtain a density of a fluid to be measured, the signal processing apparatus comprising:

a frequency measurement unit for measuring a frequency of the at least one flow tube or the pair of flow tubes;

a transmitter for outputting and transmitting a desired frequency signal based on the frequency measured by the frequency measurement unit;

frequency conversion sections for performing frequency conversion by conducting one of addition and subtraction between an output frequency of the transmitter and respective input signals having the at least one of the phase difference and the vibration frequency proportional to the Coriolis force acting on the at least one flow tube or the pair of flow tubes, which are detected by the velocity sensors or the acceleration sensors, to thereby always obtain constant frequency values; and a phase difference measurement section for measuring the phase difference between frequency signals detected by the velocity sensors or the acceleration sensors, which are obtained through the frequency conversion by the frequency conversion sections.

5. A signal processing apparatus for a Coriolis flowmeter in which at least one flow tube or a pair of flow tubes which is included in a measurement flow tube is alternately driven by causing a vibrator to be actuated by a driving device and vibrate the at least one flow tube or the pair of flow tubes, and at least one of a phase difference and a vibration frequency that is proportional to a Coriolis force acting on the at least one flow tube or the pair of flow tubes is detected by velocity sensors or acceleration sensors which are vibration detection sensors, the Coriolis force being proportional to and thereby being used to obtain at least one of a mass flow rate and the vibration frequency used to obtain a density of a fluid to be measured, the signal processing apparatus comprising:

a frequency measurement unit for measuring a frequency of the at least one flow tube or the pair of flow tubes;

a transmitter for outputting and transmitting a desired frequency signal based on the frequency measured by the frequency measurement unit;

a first frequency conversion section for performing frequency conversion by conducting one of addition and subtraction between an output frequency output from the transmitter and an input signal frequency obtained by converting a signal of one sensor of a pair of the vibration detection sensors into a digital signal by a first A/D converter, to thereby always obtain a constant frequency value;

a second frequency conversion section for performing frequency conversion by conducting one of addition and subtraction between the output frequency output from the transmitter and an input signal frequency obtained by converting a signal output from another sensor of the pair of the vibration detection sensors to a digital signal by a second A/D converter, to thereby always obtain a constant frequency value; and a phase difference measurement section for measuring the phase difference between a first frequency signal, which is obtained through the frequency conversion by and output from the first frequency conversion section, and a second frequency signal, which is obtained through the frequency conversion by and output from the second frequency conversion section.

6. A signal processing apparatus for a Coriolis flowmeter in which at least one flow tube or a pair of flow tubes which is included in a measurement flow tube is alternately driven by causing a vibrator to be actuated by a driving device and vibrate the at least one flow tube or the pair of flow tubes, and at least one of a phase difference and a vibration frequency that is proportional to a Coriolis force acting on the at least one flow tube or the pair of flow tubes is detected by a pair of velocity sensors or a pair of acceleration sensors which are vibration detection sensors, the Coriolis force being proportional to and thereby being used to obtain at least one of a mass flow rate and the vibration frequency used to obtain a density of a fluid to be measured, the signal processing apparatus comprising:

a frequency measurement unit for measuring a frequency of the at least one flow tube or the pair of flow tubes;

a transmitter for outputting and transmitting a desired frequency signal based on the frequency measured by the frequency measurement unit;

a first frequency conversion section for shifting in frequency, to a constant frequency signal, an input signal frequency obtained by converting a signal of one velocity sensor of a pair of the vibration detection sensors into a digital signal by a first A/D converter and output from the first A/D converter, based on an output frequency output from the transmitter to move the input signal frequency to another frequency band;

a second frequency conversion section for shifting in frequency, to a constant frequency signal, an input signal frequency obtained by converting a signal of another velocity sensor of the pair of the vibration detection sensors into a digital signal by a second A/D converter and output from the second A/D converter, based on the output frequency output from the transmitter to move the input signal frequency to another frequency band; and a phase difference measurement section for measuring the phase difference between a first frequency signal, which is obtained as the constant frequency signal through the shifting by and output from the first frequency conversion section, and a second frequency signal, which is obtained as the constant frequency signal through the shifting by and output from the second frequency conversion section.

7. A Coriolis flowmeter in which at least one flow tube or a pair of flow tubes which is included in a measurement flow tube is alternately driven by causing a vibrator to be actuated by a driving device and vibrate the at least one flow tube or the pair of flow tubes, and at least one of a phase difference and a vibration frequency that is proportional to a Coriolis force acting on the at least one flow tube or the pair of flow tubes is detected by vibration detection sensors, the Coriolis force being proportional to and thereby being used to obtain at least one of a mass flow rate and the vibration frequency used to obtain a density of a fluid to be measured, the Coriolis flowmeter comprising a signal processing apparatus comprising:
- A/D converters for converting analog signals, which are output from a pair of the vibration detection sensors, to digital signals, respectively;
- a frequency measurement unit for measuring a vibration frequency angle $\theta$ of the at least one flow tube or the pair of flow tubes;
- a transmitter for generating a frequency signal having a frequency thereof set to $\theta(1-1/N)$ of a frequency of a digital frequency signal output from the frequency measurement unit; and
- a pair of orthogonal frequency converters for converting, based on the frequency signal generated by the transmitter, frequencies of two of the digital signals corresponding to the pair of the vibration detection sensors, which are output from the A/D converters, respectively, and generating digital signals having frequencies thereof set to 1/N of frequencies of the two of the digital signals, respectively,
- wherein the phase difference is obtained by using the digital signals generated by the pair of orthogonal frequency converters.

8. A Coriolis flowmeter in which at least one flow tube or a pair of flow tubes which is included in a measurement flow tube is alternately driven by causing a vibrator to be actuated by a driving device and vibrate the at least one flow tube or the pair of flow tubes, and at least one of a phase difference and a vibration frequency that is proportional to a Coriolis force acting on the at least one flow tube or the pair of flow tubes is detected by velocity sensors or acceleration sensors which are vibration detection sensors, the Coriolis force being proportional to and thereby being used to obtain at least one of a mass flow rate and the vibration frequency used to obtain a density of a fluid to be measured, the Coriolis flowmeter comprising a signal processing apparatus comprising:
- a frequency measurement unit for measuring a frequency of the at least one flow tube or the pair of flow tubes;
- a transmitter for transmitting and outputting a desired frequency signal based on the frequency measured by the frequency measurement unit;
- a first frequency conversion section for shifting in frequency, to a constant frequency signal, an input signal frequency obtained by converting a signal of one velocity sensor of a pair of the vibration detection sensors into a digital signal by a first A/D converter and output from the first A/D converter, based on an output frequency output from the transmitter to move the input signal frequency to another frequency band;
- a second frequency conversion section for shifting in frequency, to a constant frequency signal, an input signal frequency obtained by converting a signal of another velocity sensor of the pair of the vibration detection sensors into a digital signal by a second A/D converter and output from the second A/D converter, based on the output frequency output from the transmitter to move the input signal frequency to another frequency band; and
- a phase difference measurement section for measuring the phase difference between a first frequency signal, which is obtained as the constant frequency signal through the shifting by and output from the first frequency conversion section, and a second frequency signal, which is obtained as the constant frequency signal through the shifting by and output from the second frequency conversion section,
- wherein the phase difference between the first frequency signal, which is obtained as the constant frequency signal through the shifting by and output from the first frequency conversion section, and the second frequency signal, which is obtained as the constant frequency signal through the shifting by and output from the second frequency conversion section, is obtained.

* * * * *